(12) United States Patent
Murata et al.

(10) Patent No.: US 7,010,479 B2
(45) Date of Patent: Mar. 7, 2006

(54) APPARATUS AND METHOD FOR NATURAL LANGUAGE PROCESSING

(75) Inventors: Toshiki Murata, Nara (JP); Mihoko Kitamura, Kyoto (JP); Sayori Shimohata, Osaka (JP); Miki Sasaki, Osaka (JP); Tsuyoshi Fukui, Osaka (JP); Masachika Fuchigami, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 882 days.

(21) Appl. No.: 09/909,901

(22) Filed: Jul. 23, 2001

(65) Prior Publication Data

US 2002/0013694 A1 Jan. 31, 2002

(30) Foreign Application Priority Data

Jul. 26, 2000 (JP) ............................ 2000-225911
Jul. 27, 2000 (JP) ............................ 2000-227096

(51) Int. Cl.
*G06F 17/27* (2006.01)

(52) U.S. Cl. .................... 704/9; 704/2; 704/10; 52/775
(58) Field of Classification Search .................. 704/9, 704/2, 10; 52/775
See application file for complete search history.

(56) References Cited

U.S. PATENT DOCUMENTS 5,101,349 A * 3/1992 Tokuume et al. ............. 704/9
5,151,857 A * 9/1992 Matsui ......................... 704/9
5,418,716 A * 5/1995 Suematsu ..................... 704/9
5,418,717 A * 5/1995 Su et al. ....................... 704/9
5,644,774 A * 7/1997 Fukumochi et al. .......... 704/4
5,678,383 A * 10/1997 Danielewicz ............... 52/775
5,903,858 A * 5/1999 Saraki ........................... 704/4
6,778,949 B1 * 8/2004 Duan et al. .................... 704/2

OTHER PUBLICATIONS

Patent Abstracts of Japan, Publication No. 05-290082; Nov. 5, 1993.

* cited by examiner

*Primary Examiner*—Richemond Dorvil
*Assistant Examiner*—Qi Han
(74) *Attorney, Agent, or Firm*—Venable LLP; Michael A. Sartori; Catherine M. Voorhees

(57) ABSTRACT

The present invention provides an apparatus and method for natural language processing capable of providing an appropriate result of natural language processing. More specifically, the present invention provides a natural language processing apparatus for achieving a syntax analysis and/or a syntax generation by using natural language patterns with, at least, pattern name and pattern component. The natural language processing apparatus comprises dictionary reference means for picking up one or more natural language patterns applicable for the syntax analysis and/or the syntax generation among the natural language patterns prepared in a pattern dictionary in advance, pattern inspection means for inspecting whether the applicable natural language patterns meet a tree structure or not, and pattern application means for applying the natural language patterns to the tree structure if the natural language patterns meet the tree structure.

30 Claims, 35 Drawing Sheets

FIG.3

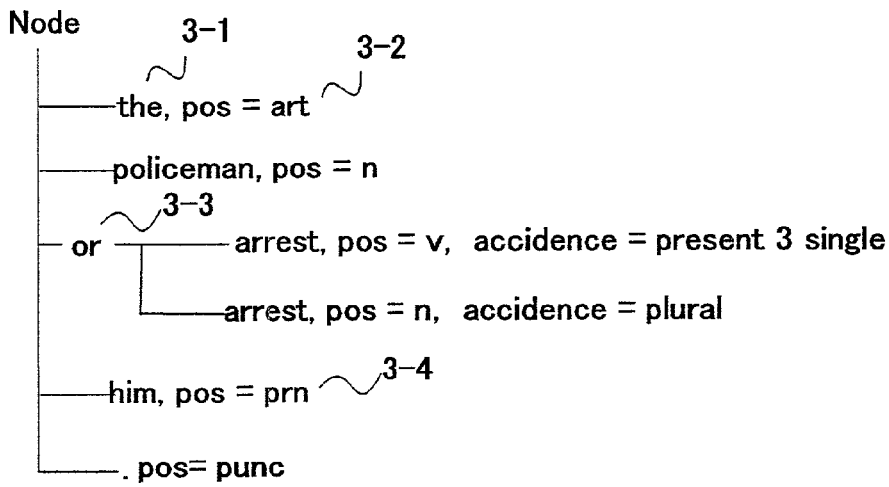

```
Node    3-1          3-2
  |─────the, pos = art
  |─────policeman, pos = n
  |      3-3
  |    ∽
  |─ or ─┬─────arrest, pos = v,  accidence = present 3 single
  |      └─────arrest, pos = n,  accidence = plural
  |                         3-4
  |─────him, pos = prn ∽
  |
  └─────. pos= punc
```

FIG.4

4-1  [en: VP arrest: pos    4-1a        4-1b          [ja:VP [1:NP]wo taihosuru]
           = v [1: NP: meaning = person]]

4-2  [en: VP arrest: pos                               [ja:VP [1:NP]wo sosisuru]
           = v [1: NP: = person]]

4-3  [en: N: meaning = person                          [ja:N keisatukan]
         policeman : pos = n]

4-4  [en: NP: meaning = person                         [ja:NP kare]
           him: pos =prn]

4-5  [en: Art the: pos = art]                          [ja:Art]

4-6  [en: NP: meaning = {1}[1: Art]                    [ja:NP [1:N]]
           [1: N: meaning = {1}]]
                                           4-7a
4-7  [en: S[1: NP: case = subjective                   [ja:S [1:NP]ga[2:VP]]
           case: meaning = {meaning}]
         [2: VP:subjective case meaning = {meaning}]]
                                           4-7b
4-8  [en: N: meaning = state                           [ja:N akka]
         deterioration: pos = n]

(a) VP
   ├─ arrest; pos = v
   └─ NP: meaning = person (b) VP
   ├─ arrest; pos = v
   └─ NP: meaning! = person (C)    [en: NP him: pos =prn: meaning = person]

FIG.12

12-1 [en: VP arrest: pos                                      [ja:VP [1:NP wo taihosuru]
        = v [1: NP: meaning = person]]
12-2 [en: VP arrest: pos                                      [ja:VP [1:NP] wo sosisuru]
        = v [1: NP:meaning! = person]]
12-3 [en: VP: arrest: pos                                     [ja:VP kyoumi wo hiku]
        = v a attention]
12-4 [en: NP: meaning = thing                                 [ja:NP it]
        it: pos =prn]
12-5 [en: Art the: pos = art]                                 [ja:Art]
12-6 [en: N: meaning = st                                     [ja:Ms akka]
        ate deterioration: pos = n]
12-7 [en: N present pos = n]                                  [ja:Ms genzai]
12-8 [en: A present pos = adj]                                [ja:Ks genzai no]
12-9 ![en: NP: meaning = {1}[1: Art][2: A]                    [ja:NP [2:A][3:N]]
        [3: N: meaning = {1}]]
12-10 [en: NP: meaning = {1}[1: Art][2: N]                    [ja:NP [2:A][3:N]]
        [3: N: meaning = {1}]]
12-11 [en: S[1: NP: meaning = {meaning}]                      [ja:S [1:NP]ga[2:VP]]
        [2: VP: subjective meaning = {meaning}]]
12-12 *[en: S[1: NP][2: VP]]                                  [ja:S [1:NP]ga[2:VP]]

FIG.13

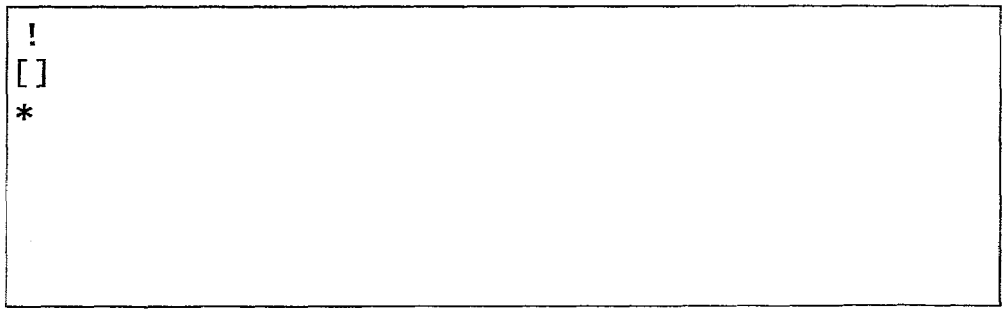

|     | 221 | 222 | 223 |
|-----|-----|-----|-----|
|     | 261a |    |     |
| 224 | user | child | 100000000 |
| 225 | terminal | total | 100000000 – 10000000N |
| 226 | ! | child | 10000000 |
| 227 | * | total | 100000 – 100000N |
| 228 | node | total | 1000 – 100N |
| 229 | ! | total | 10N |
| 230 | + | total | 1N |

FIG.31

[language name 1: left side 1 right side list 1]
[language name 2: left side 2 right side list 2]
[language name 3: left side 3 right side list 3]
       :
[language name n: left side n right side list n] ;

[ en : S:type = normal  [1 :NP:num = sg:pos = n] [2 : VP:*:num = sg ] ]
[ ja : S               [1 :NP] ha [2 : VP ] ] ;

```
/* standard form */
string              baseForm ;
/* pos */
word                pos = { n    adj   } ;
/* number */
word                num = { sg   pl   } ;
```

FIG.36
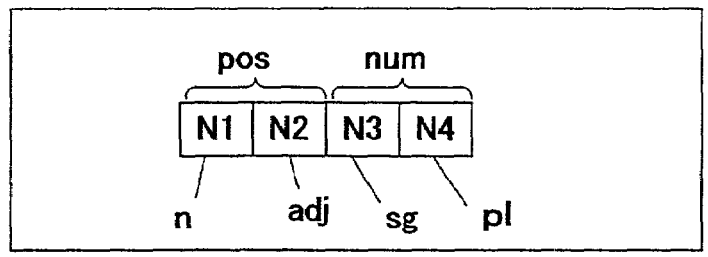
FIG.37
```
feature name = feature value
feature name ! = feature value
feature name = feature value 1 |feature value 2 |···|feature value x
feature name ! = feature value 1 |feature value 2 |···|feature value x
```
FIG.38
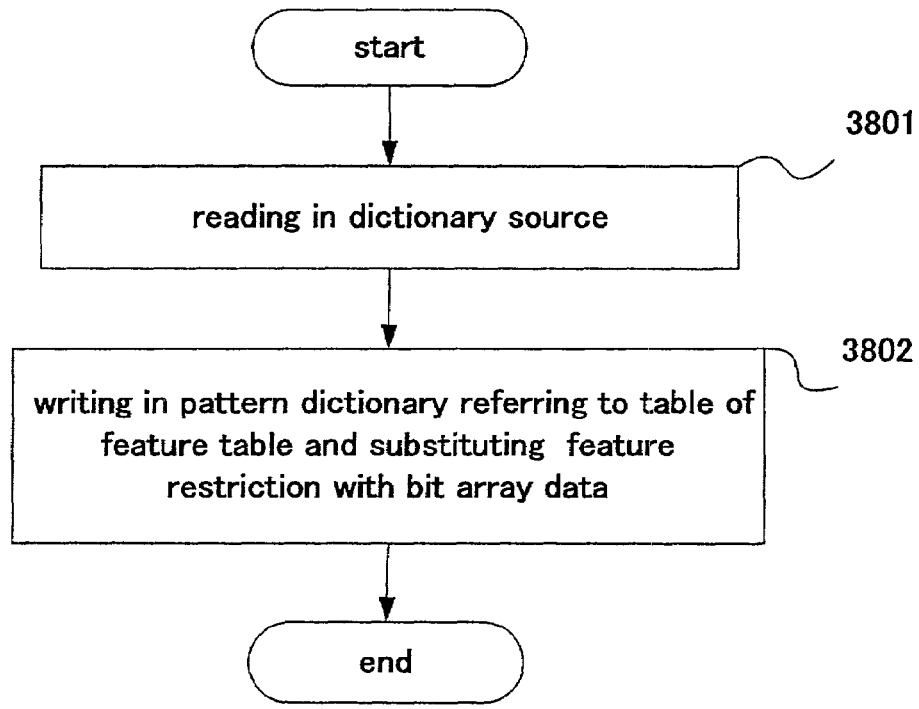

```
category   * = { baseForm surfaceForm  pos } ;
category   "" = { inf } ;
category   NP = { num sem } ;
category   VP = { num sem } ;
category   S = { num type } ;
```

```
[ en :S:type = normal  [1 :NP:num = {NUM}:pos = n] [2 : VP:*:num = {NUM}]]
[ ja :S               [1 :P] ha [2 : VP ] ] ;
```

```
/* number */
word num = sNum = oNum = {sg  pl } ;
```

APPARATUS AND METHOD FOR NATURAL LANGUAGE PROCESSING

BACKGROUND OF THE INVENTION

The present invention relates to a natural language processing apparatus, a natural language processing method, a natural language pattern dictionary creation apparatus and a natural language pattern dictionary creation method, and more particularly to a natural language processing apparatus, a natural language processing method, a natural language pattern dictionary creation apparatus and a natural language pattern dictionary creation method, which are applicable for a machine translation apparatus, a machine translation method and the like carrying out machine translation by using translation patterns.

DESCRIPTION OF THE RELATED ART

In a conventional machine translation apparatus, translation knowledge involves a system dictionary and an user dictionary. The system and an user dictionary is restricted to such expressions that the machine translation apparatus determine in advance. These expressions include as a word, an idiom consisting of plural words. Even in systems with high performance, which are able to register such a co-occurrence expression consisting of a verb and a noun (such as "have difficulties"), the system and the user dictionary can register only by the form according to a system grammar. This is because the conventional machine translation apparatus analyzes an original source language text syntactically, translates the language with a translation dictionary and generates a target language text with the grammar and dictionary of target language.

Further, since the original language and the target language are analyzed and generated individually even the dictionary based on the pattern configured by a pair (P1) of an original language and a target language expressed by;

"[NP] wo tsugi ni simesimasu."

"Following is [NP]." ([NP] is variable), which fits the sense of user as the translation knowledge cannot be registered.

To overcome the problem mentioned above, there is a translation method and apparatus based on a translation pattern disclosed in Japanese laid-open publication No. JP5-290082, in which the translation knowledge is represented within a range of context-free grammar and a grammatical rule is configured by a pair of an original language pattern and a target language pattern. Also, the grammatical rule is stored in a trie-type dictionary to allow the speed of syntax analysis to be a level of practical use. Further, since the grammatical rule is configured by the pair of the original language pattern and the target language pattern, a synchronous derivation is enabled and a language translation and a syntax generation can be achieved only by a simple process.

Hereby the dictionary based on the pattern configured by a pair (P1) of an original language and a target language which fits the sense of user as the translation knowledge cannot be registered. And optional translation knowledge can be registered within the range of context-free grammar and the translation process can be executed.

However, there is only a description in the official gazette that a solution with minimum number of configuration (number of pattern) is selected as an appropriate solution among plural solutions, for example, the result of syntax analysis. In this case, since the number of configuration is set as parameter, an appropriate translation considering a feature of component and a relation between plural components cannot be achieved. In addition, the number of configuration (number of pattern) is set to determine the priority, which is not always right due to a simple parameter.

There is also a description in the official gazette mentioned above that the pattern may be prioritized. However, the specific method is not indicated therein and how to prioritize the pattern to reach the appropriate solution is not disclosed therein.

Further, in the art of the official gazette, it is necessary for all the translation knowledge to be described with context-free grammar, in which each variable (nonterminal symbol) cannot be restricted and, to restrict the variable, a nonterminal symbol has to be allocated to each restriction and the grammar in which this configuration is used has to be listed to achieve the maintenance with a great degree of difficulty due to a huge number of the grammar.

SUMMARY OF THE INVENTION

The present invention has been achieved in view of the aforementioned problems possessed by the prior art, and an object of the present invention is to provide a novel and improved apparatus and method for natural language processing capable of selecting an appropriate result of natural language processing.

Another object of the present invention is to provide an apparatus and a method for natural language processing that is capable of restricting natural language pattern according to a grammatical rule, and that avoids a dictionary to be mass storage even if the natural language patterns are restricted. The apparatus and method according to the invention is capable of achieving a syntax analysis, a syntax generation and the like by using the natural language patterns. In addition, the invention provides an apparatus and a method for creating a natural language pattern dictionary preferable for the apparatus and method for natural language processing.

To achieve the above object, according to a first aspect of the present invention, there is provided a natural language processing apparatus for achieving a syntax analysis and/or a syntax generation by using natural language patterns with, at least, pattern name and pattern component. The natural language processing apparatus comprises: (1) dictionary reference means for picking up one or more natural language patterns applicable for the syntax analysis and/or the syntax generation among the natural language patterns prepared in a pattern dictionary in advance; (2) pattern inspection means for inspecting whether the applicable natural language patterns meet a tree structure or not; and (3) pattern application means for applying the natural language patterns to the tree structure if the natural language patterns meet the tree structure.

According to a second aspect of the present invention, there is provided a natural language processing apparatus for achieving a syntax analysis and/or a syntax generation by using natural language patterns with, at least, pattern name and pattern component. The natural language processing apparatus comprises: (1) dictionary reference step for picking up one or more natural language patterns applicable for the syntax analysis and/or the syntax generation among the natural language patterns prepared in a pattern dictionary in advance; (2) pattern inspection step for inspecting whether the applicable natural language patterns meet a tree structure or not; and (3) pattern application step for applying the natural language patterns to the tree structure if the natural language patterns meet the tree structure.

According to a third aspect of the present invention, there is provided a natural language processing apparatus for achieving a syntax analysis and/or a syntax generation by using natural language patterns with language name, left side and right sidle list. The natural language processing apparatus comprises: all or some of the natural language patterns prepared in a pattern dictionary in advance having a central element information prescribing a central pattern element in a feature restriction or a feature propagation on the left and/or the right side; pattern inspection means for inspecting also in terms of the feature restriction whether the natural language patterns picked up as the ones applicable for the process of syntax analysis and/or the syntax generation among the natural language patterns prepared in a pattern dictionary in advance meet a tree structure or not; and pattern application means for applying the natural language patterns to the tree structure if the natural language patterns meet the tree structure and for propagating the feature restriction if the natural language patterns have the central element information.

According to a fourth aspect of the present invention, there is provided a natural language processing apparatus for achieving a syntax analysis and/or a syntax generation by using natural language patterns with language name, left side and right side list. The natural language processing apparatus comprises: all or some of the natural language patterns prepared in a pattern dictionary in advance having a central element information prescribing a central pattern element in a feature restriction or a feature propagation on the left and/or the right side; pattern inspection means for inspecting also in terms of the feature restriction whether the natural language patterns picked up as the ones applicable for the process of syntax analysis and/or the syntax generation among the natural language patterns prepared in a pattern dictionary in advance meet a tree structure or not; and pattern application means for applying the natural language patterns to the tree structure if the natural language patterns meet the tree structure and for propagating the feature restriction if the natural language patterns have the central element information.

According to a fifth aspect of the present invention, there is provided a natural language pattern dictionary creation apparatus for creating pattern dictionary adopted to a natural language processing apparatus for achieving a syntax analysis and/or a syntax generation by using natural language patterns with language name, left side and right side list. The natural language pattern dictionary creation apparatus comprises: a source dictionary which stores the natural language patterns all of which described in a text data and has in some cases a central element information prescribing a central pattern element in a feature restriction or a feature propagation on the left and/or the right side; and a restriction information form conversion means for storing a feature restriction information of the natural language pattern read out from the source dictionary in the pattern dictionary after converting feature restriction data formed to achieve logical operation smoothly.

According to a sixth aspect of the present invention, there is provided a natural language pattern dictionary creation method for creating pattern dictionary adopted to a natural language processing method for achieving a syntax analysis and/or a syntax generation by using natural language patterns with language name, left side and right side list. The natural language pattern dictionary creation method comprises a restriction information form conversion means for storing a feature restriction information of the natural language pattern read out from the source dictionary, which stores the natural language patterns all of which described in a text data and has in some cases a central element information prescribing a central pattern element in a feature restriction or a feature propagation on the left and/or the right side, in the pattern dictionary after converting feature restriction data formed to achieve logical operation smoothly.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings:

FIG. 3 is an explanatory diagram showing an example of a morpheme analysis result of first embodiment.

FIG. 4 is an explanatory diagram showing an example of storage contents of a translation pattern dictionary 33 of first embodiment.

FIG. 12 is an explanatory diagram showing an example of storage contents of a translation pattern dictionary 33 of second embodiment.

FIG. 13 is an explanatory diagram showing a priority symbol file of a pattern of second embodiment.

FIG. 31 is an explanatory diagram showing an example of a configuration of translation pattern in principle.

FIG. 32 is an explanatory diagram showing an example of a translation pattern to which a feature restriction is not added.

FIG. 33 is an explanatory diagram showing an example of a translation pattern to which a feature restriction of sixth embodiment is added.

FIG. 36 is an explanatory diagram showing an example of numbering a pair of feature name and feature value of sixth embodiment.

FIG. 37 is an explanatory diagram showing examples of kinds of feature restriction of sixth embodiment.

FIG. 38 is a flow chart showing a process of dictionary creation part 3011 of sixth embodiment.

DETAILED DESCRIPTION OF THE PREFERRED EMBODIMENTS (A) First Embodiment

Hereafter, first embodiment, in which apparatus and method for natural language processing of the present invention are applied to a machine translation apparatus and a machine translation method, will be described in reference to the accompanying drawings.

(A-1) Structure of First Embodiment

Figure 1:
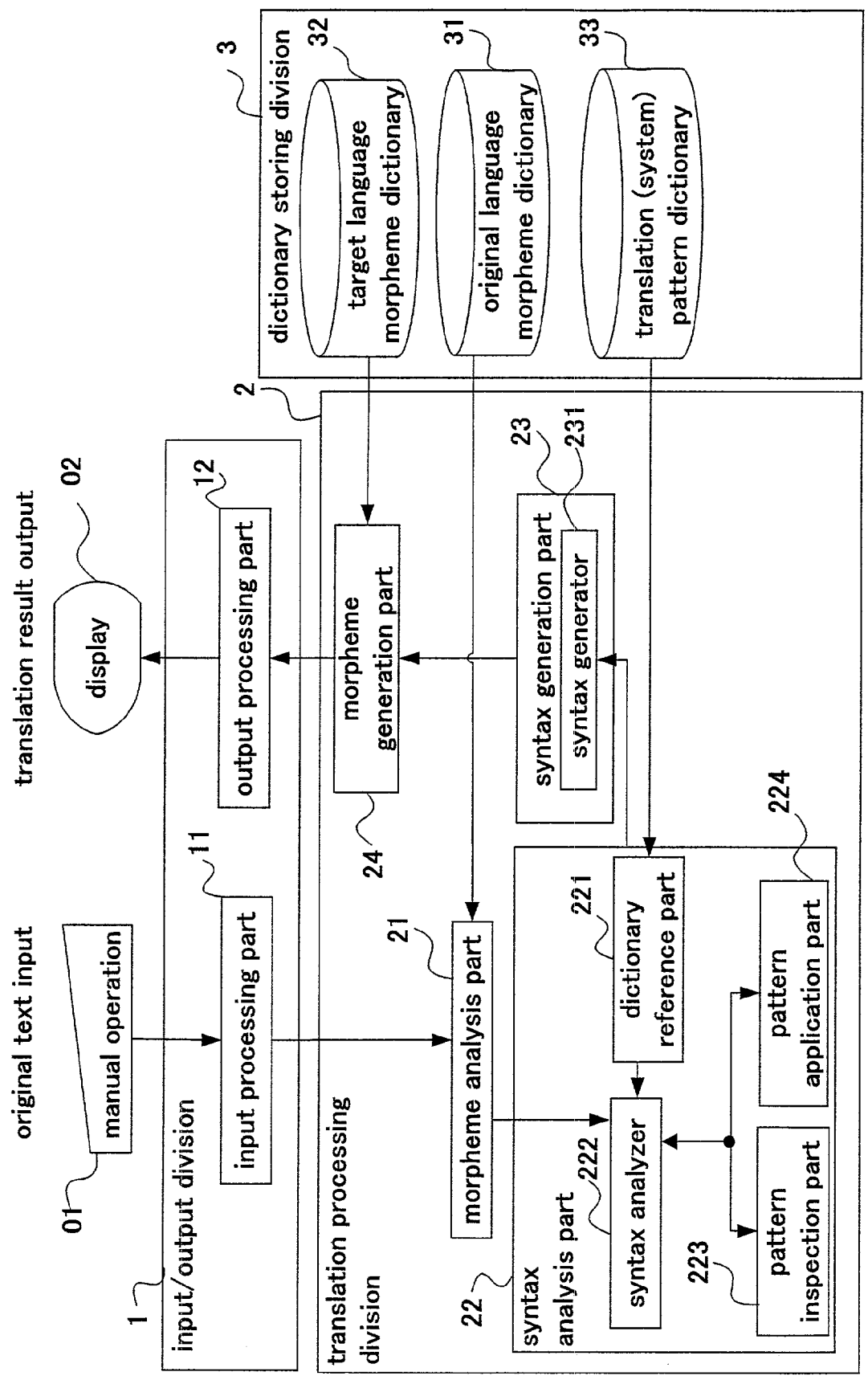
FIG. 1 is a block diagram showing a functional configuration of a machine translation apparatus of first embodiment.

FIG. 1 is a block diagram showing a functional configuration of a machine translation apparatus of first embodiment. It is to be noted that, for example, the machine translation apparatus of the first embodiment is constructed by loading processing program, fixed data and the like on such an information processing apparatus as a personal computer actually.

In FIG. 1, the machine translation apparatus of first embodiment is roughly configured by input/output division 1, a translation processing division 2 and a dictionary storing division 3.

The input/output division 1 comprises: an input processing part 11 for receiving an input text (original language text) to be translated from an input part 01, for example, keyboards, file loading apparatus, and the like; and an output processing part 12 for outputting the translation result (target language text) to an output part 02, for example, display screens, printers, file storage apparatus, and the like.

The translation processing division 2 comprises: a morpheme analysis part 21 for analyzing the morpheme of input text; a syntax analysis part 22 for analyzing the syntax of original language by using translation patterns; a syntax generation part 23 for generating the syntax in the target language based on the syntax analysis result; and a morpheme generation part 24 for generating the morpheme of target language based on the morpheme generation result.

The syntax analysis part 22 comprises: a dictionary reference part 221 for referring to a pattern dictionary; a pattern inspection part 223 for inspecting whether the referred pattern meets a tree structure under construction; a pattern application part 224 for applying the pattern to the tree structure under construction according to the inspection result; and a syntax analyzer 222 for constructing the tree structure by invoking these processing parts.

The dictionary storing division 3 comprises: an original language morpheme dictionary 31 in which the morpheme information of original language is stored; a target language morpheme dictionary 32 in which the morpheme information of target language is stored; and a translation pattern dictionary (system pattern dictionary) 33 in which translation patterns each consisting of a pair of an original language pattern and a target language pattern are stored.

(A-2) Process of First Embodiment

Figure 2:
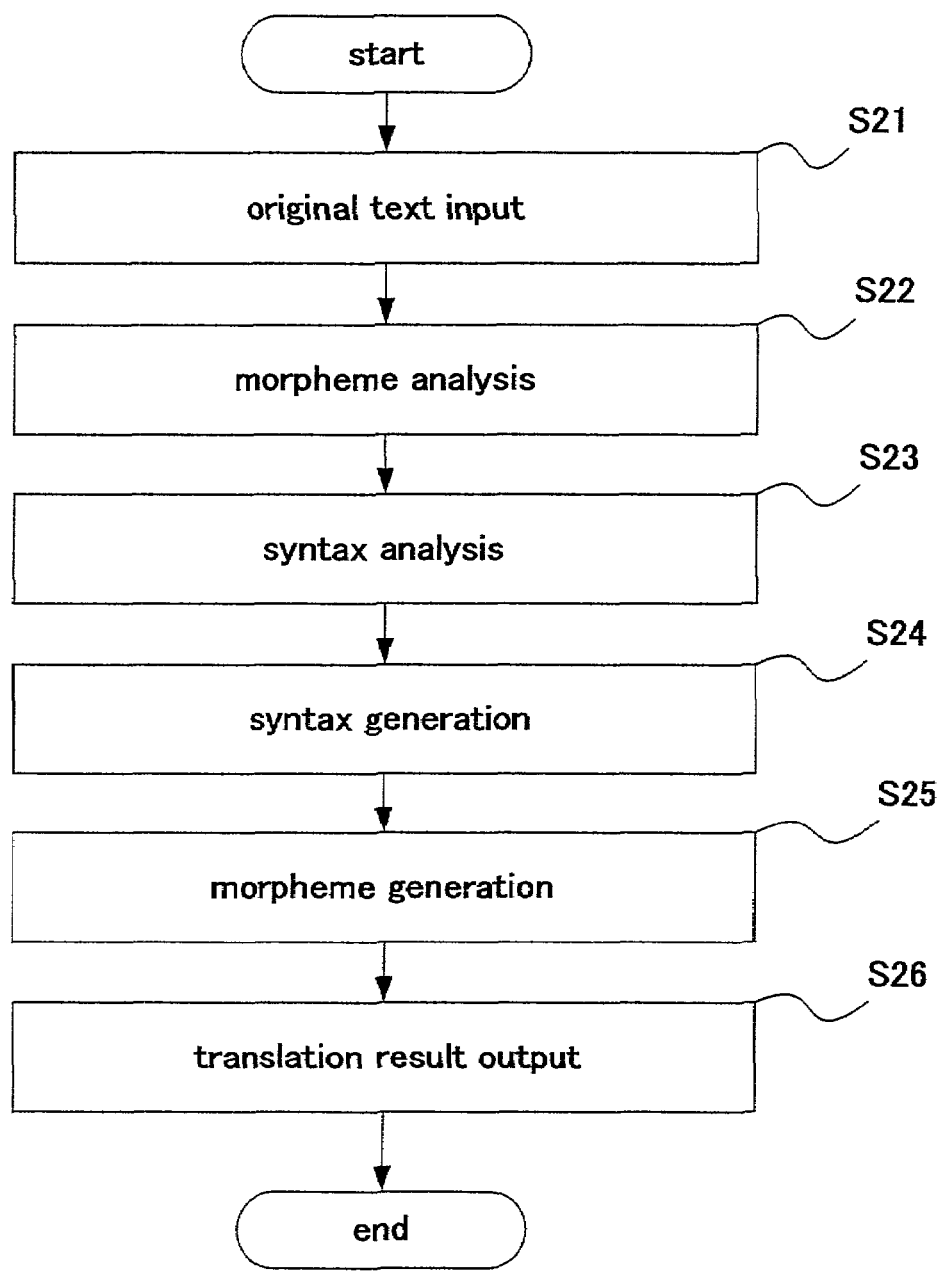
FIG. 2 is a flow chart showing a translation process of a machine translation apparatus of first embodiment.

Next, the translation process of a machine translation apparatus of first embodiment (machine translation method) will be described. FIG. 2 is a flow chart showing a translation process of a machine translation apparatus of first embodiment.

It is to be noted that the machine translation apparatus of first embodiment receives one sentence at-a-time. The process of the first embodiment will be described by referring an example in which a sentence "The policeman arrests him" is input.

When an user inputs the above sentence to the input part 01, the input processing part 11 receives and forwards it to the morpheme analysis part 21 in the translation processing division 2 (step S21). The morpheme analysis part 21 analyzes the morpheme by using the information of original language morpheme dictionary 31 (step S22).

The morpheme analysis result is shown by a tree structure on which the root-node is expressed by "Node" as shown in FIG. 3. In the case of a morpheme with no other one to be applied, the each morpheme base form 3-1 and the morpheme information 3-2, for example, parts of speech, accidence forms and the like, are attached right under the root-node. On the other hand, in the case of a morpheme with other ones to be applied, the information on each applicable morpheme is given as a child-node of or-node 3-3. For example, since a word "arrests" can be set as a verb and a noun, it is a morpheme with other ones to be applied and the information on each applicable morpheme is given as shown in FIG. 3.

The syntax analysis part 22, to which the morpheme analysis result is forwarded, analyzes the syntax by using the translation pattern dictionary 33 (step S23).

FIG. 4 is an explanatory diagram showing a part of storage contents of the translation pattern dictionary 33.

In FIG. 4, left side of the diagram represents English pattern and the right side represents Japanese pattern. The two patterns are paired up and consist of;

[language name: pattern name pattern component].

English (en) or Japanese (ja) is selected in the language name part.

In the pattern name part following the language name, such a grammatical marker on a phrase structure rule as VP (verb phrase), NP (noun phrase), N (noun) and the like is applied.

The pattern component part consists of a word, which may be variable or more than two lists of a word and variable. The variable is expressed by; [any number: pattern name (corresponding to the lower node on tree structure)]. The any number part shows the correspondence between the pair of original language pattern and target language pattern. In the syntax analysis, the pattern can be constructed as a nested structure, that is, the variable will be canceled by applying another pattern to the variable. In addition,the word and the pattern name can hold such a detailed information as a meaning information, as the part with numerals 4-1a and 4-1b attached shows. Further, the word and the pattern name can change the detailed information to the variable form (e.g., {meaning}) for reference to the information as the part with numeral 4-7a attached shows.

Figures 5, 6:
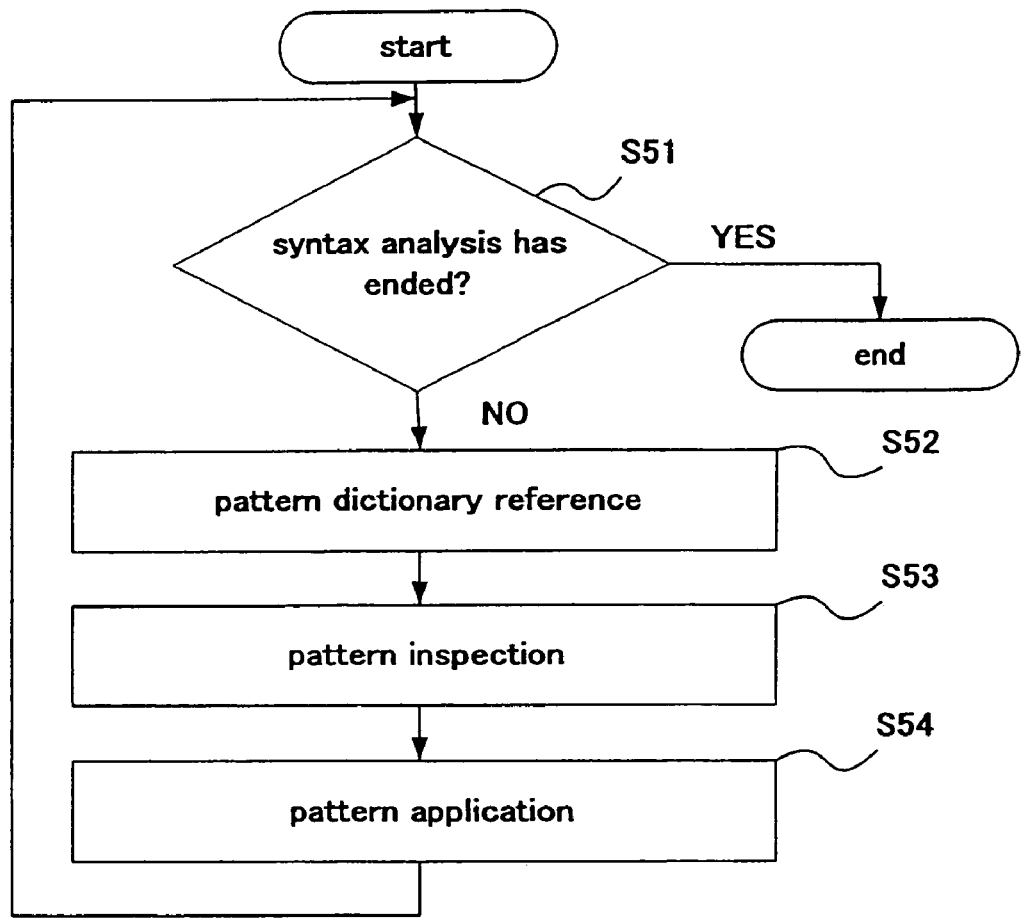
FIG. 5 is a flow chart showing a syntax analysis detail of first embodiment.
FIG. 6 is an explanatory diagram showing examples of pattern inspection and pattern application in syntax analysis of first embodiment.

The syntax analysis of first embodiment, in which the translation pattern (original language pattern) is utilized, is mainly configured by three processes and constructs the tree structure from the bottom as shown in a flow chart of FIG. 5.

In other words, the following three processes are repeated; confirming that the syntax analysis has not ended (step S51); pattern dictionary reference (step S52); pattern inspection (step S53); and pattern application (step S54).

The first process, the pattern dictionary reference (step S52), is a process in which the next applicable pattern is referred to the translation pattern dictionary 33, based on the results of morpheme analysis and pattern application. For example, the translation pattern (original language pattern) with numeral 4-4 in FIG. 4 attached is referred to the translation pattern dictionary 33, based on the result of morpheme analysis, "him: part of speech=prn" (numeral 3-4) in FIG. 3.

The second process, the pattern inspection (step S53), is a process of inspecting on each tree structure whether the translation pattern brought by the dictionary reference meets the tree structure under construction or not.

The third process, the pattern application (step S54), is a process of applying the translation pattern to the tree structure, based on the tree structure and the pattern which are judged to meet.

Figure 7:
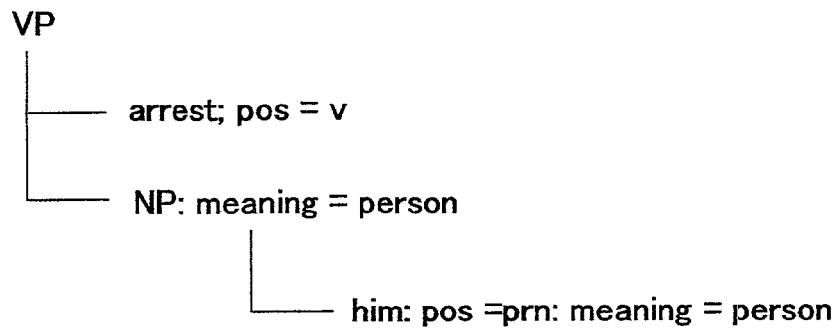
FIG. 7 is an explanatory diagram showing a tree structure after the pattern application of FIG. 6.

The pattern inspection and the pattern application are to be detailed in reference to FIGS. 6 and 7.

Assuming that FIG. 6(a) shows the tree structure under construction and that FIG. 6(c) shows the translation pattern desired to be inspected, each "NP" has the same pattern name and the same detailed information, "meaning=person". Consequently, the translation pattern shown in FIG. 6(c) is judged to meet the tree structure shown in FIG. 6(a) in the pattern inspection and is applied by the pattern application, and the tree structure shown in FIG. 7 is constructed.

On the other hand, assuming that FIG. 6(b) shows the tree structure under construction and that FIG. 6(c) shows the translation pattern desired to be inspected, the translation pattern is judged not to meet the tree structure shown in FIG. 6(b) in the pattern inspection since each "NP" has the different detailed information even though having the same pattern name. As a result, justifiably, the pattern application is not executed. It is to be noted that "meaning!=person" represents "meaning is not person". In other words, "!" represents negation.

Figure 8:
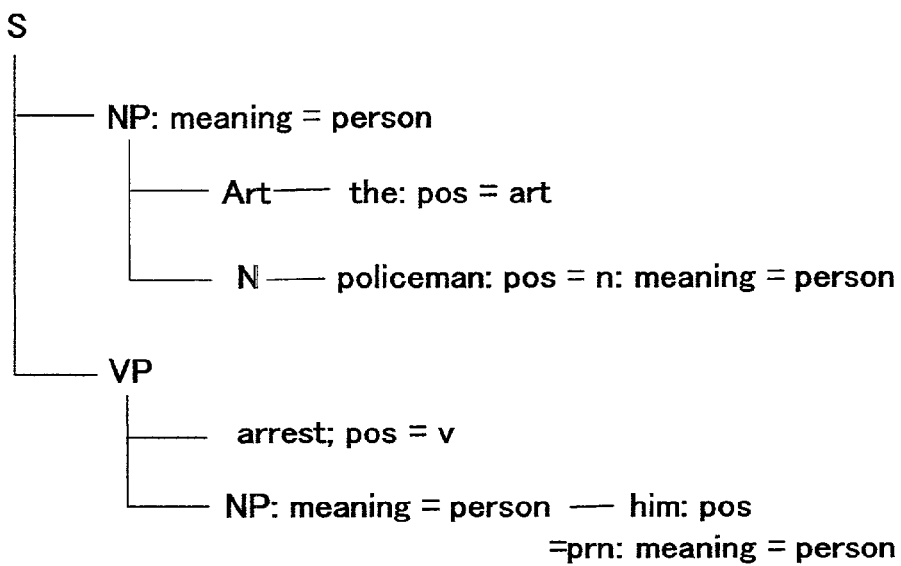
FIG. 8 is an explanatory diagram showing a syntax analysis result on an example of input text of first embodiment.

FIG. 8 shows the syntax analysis result from that the translation pattern shown in FIG. 4 is applied to the input text "The policeman arrests him". It is to be noted that the translation patterns 4-1, and from 4-3 to 4-7 in FIG. 4 are applied to this input text.

Figure 9:
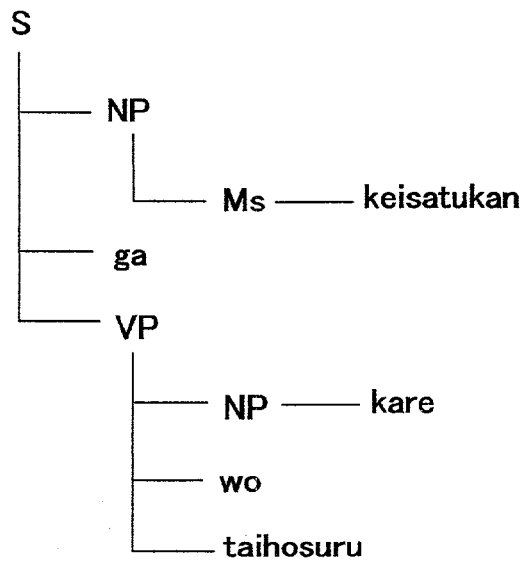
FIG. 9 is an explanatory diagram showing a syntax generation result on the syntax analysis result of FIG. 8.

The syntax analysis result is forwarded to the syntax generation part 23, by which the syntax generation is executed (step S24 in FIG. 2). In the syntax generation, a tree structure in Japanese corresponding to the syntax analysis result is achieved by referring to the translation pattern dictionary 33 and by using the target language (Japanese) pattern paired up with the original language (English) pattern. FIG. 9 shows the syntax generation result on the syntax analysis result of FIG. 8 described above.

It is to be noted that since the translation pattern is configured by a pair of the original language pattern and the translation pattern and since the correspondence of which is unique, the syntax analysis and the syntax generation are actually executed almost concurrently. Also, the syntax generation may be executed on the syntax analysis result in a conventional manner without using patterns.

The tree structure generated by the syntax generation part 23 is forwarded to the morpheme generation part 24, which generates the morpheme (step S25). In the syntax generation, forms of each word on the syntax generation result are adjusted by arranging the Japanese words on the terminal numeral from the left and adjusting the conjugations of each words with the target language morpheme dictionary 32. The output processing part 12 receives the morpheme generation result (translation), which is displayed, output and stored in a file by the output part 12 (step S26).

The input text "The policeman arrests him" described above is translated into "keisatukan ha kare wo taihosuru."

Now, a case in which a sentence "The policeman arrests the deterioration", in which only an object is different from that in the text described above, is input will be described.

In this case, since the meaning of noun as the object is other than person, the input text "The policeman arrests the deterioration" described above is translated into "keisatukan ha akka wo sosisuru."

It is to be noted that the translation patterns 4-2, 4-3 and from 4-5 to 4-8 in FIG. 4 are applied to the syntax analysis on this input text.

In other words, FIG. 6(b) is judged to meet the input text among the tree structure under construction of FIGS. 6(a) and (b) on the judgement that the object (NP) with a nested structure of patterns 4-8 and 4-6 meet the pattern 4-2 with the meaning of other than person. As a result, the tree structure with the information on pattern 4-2 can be achieved in the syntax analysis, and hereby "wo sosisuru" will be adopted as the translation of "arrest".

As described above, different translations can be achieved on sentences with a same verb, and the like by including such a pattern application condition as "meaning=person" and "meaning!=person" in the patterns.

(A-3) Effect of First Embodiment Following effects can be achieved by the machine translation apparatus and method.

(a) Translations can be changed according to the pattern application condition which is given the variables and the words as meanings and the like, as well as a translation pattern with a nested structure of the variables.

In the official gazette mentioned in prior art, each information corresponding to the condition is set as the level of expression in English, for example, "claims $ and $"and "claim $". However, it is not necessary to do this in this embodiment. This example is expressed instead as "claims [NP: number information=plural]" and "claim [NP: number information=single]" in this embodiment.

(b) Such pattern application condition as "=" and "!="can be described simply to create the translation pattern easily with the description form fitting the sense of person. For example; if the meaning of object is "person", the translation is "A", while the translation is "B" if the meaning of object is not "person".

(c) The translation of sentence "I give these books" syntactically corresponds to the two ways, "watasi ga korera ni hon wo ataeru" and "watasi ga korera no hon wo ataeru". However, the former way cannot exist by registering the pattern with condition [en: VP give[1: NP: meaning=person] [2: NP]]. The ambiguity of syntax can be reduced by describing the pattern application condition according to meaning in the pattern.

(A-4) Changed Form of First Embodiment

The explanation has been provided above by referring to an illustrative sentence with no ambiguity in the syntax analysis result, however, first embodiment can be also adopted to an illustrative sentence with ambiguity in the syntax analysis result (an illustrative sentence with or-node in the syntax analysis result, see second embodiment). For example, one translation result may be output by generating the syntax in which one of the child-nodes of or-node is selected and in which the syntax analysis result with ambiguity is created, or plural translation results may be output by generating the syntax with ambiguity.

The technical philosophy of first embodiment can be adopted to translations between any pairs of languages, as well as specific two languages.

The explanation has been provided above by referring to an example in which a verb is translated into different meanings according to the difference of meaning of noun in objective case, however, first embodiment can be also adopted to the case of translating a noun differently according to the difference of meaning of verb. In addition, different translations can be achieved by a subjective case as well as an objective case, and such different translations of words other than verb and noun, as the different translations of preposition according to the difference of meaning of a qualified word and a noun phrase in a preposition phrase can be achieved. Further, such different translations according to the pattern application condition other than meaning, as a noun is translated differently according to a noun being singular form or plural form.

Such pattern processing parts as a pattern inspection part can be set outside of the syntax analysis part (see fourth embodiment).

(B) Second Embodiment

Next, second embodiment, in which apparatus and method for natural language processing of the present invention are applied to a machine translation apparatus and a machine translation method, will be described in reference to the accompanying drawings.

(B-1) Structure of Second Embodiment

Figure 10:
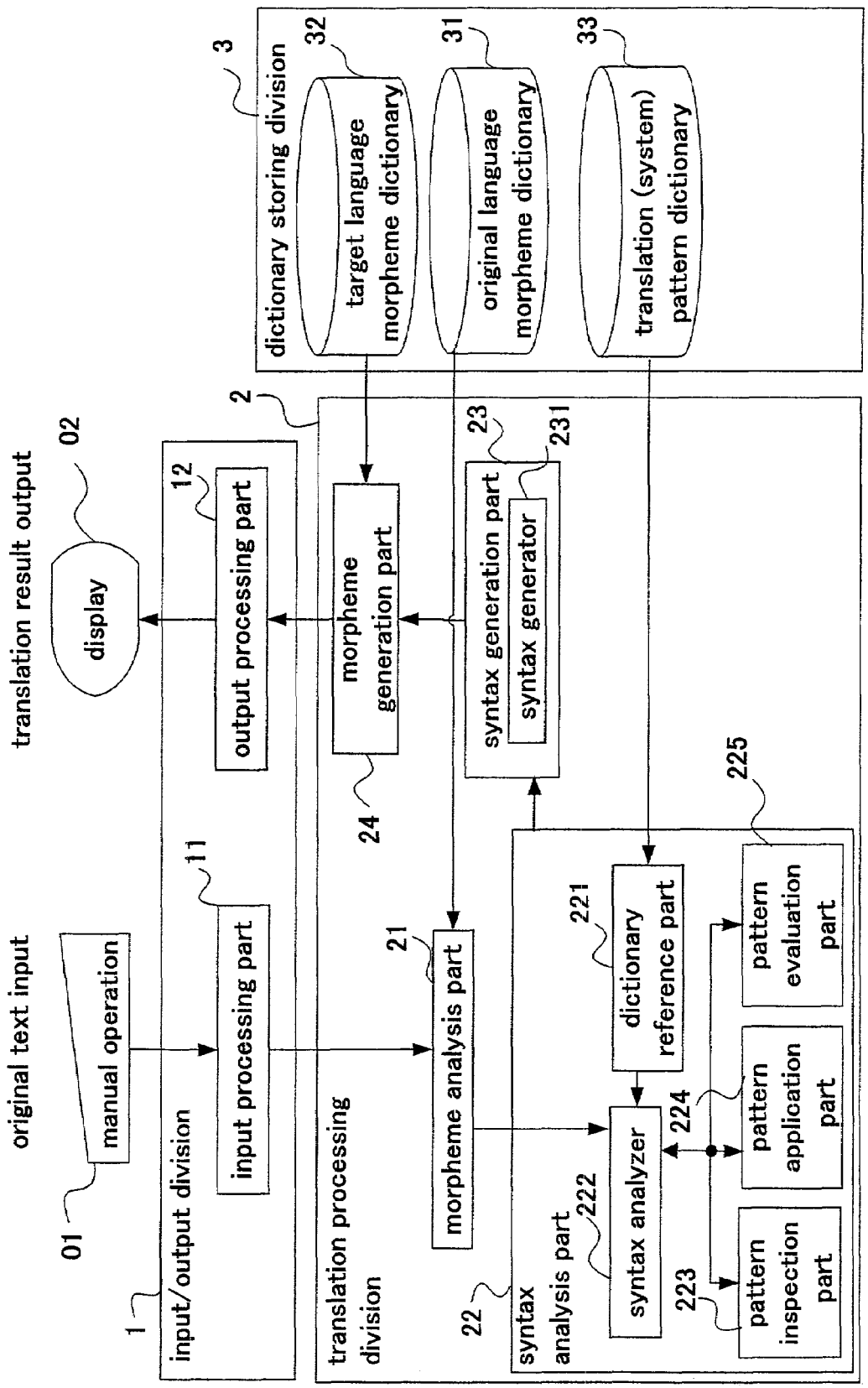
FIG. 10 is a block diagram showing a functional configuration of a machine translation apparatus of second embodiment.

FIG. 10 is a block diagram showing a functional configuration of a machine translation apparatus of second embodiment. It is to be noted that same numerals are attached to the parts identical or corresponding to those of FIG. 1 in the first embodiment.

The machine translation apparatus of second embodiment is configured by a pattern evaluation part 225 in the syntax analysis part 22 in addition to the configuration of first embodiment.

The pattern evaluation part 225 evaluates plural tree structures with plural applicable patterns applied and narrows down the tree structures when plural applicable tree structures exist.

It is to be noted that the translation patterns stored in the translation pattern dictionary 33 are different from those in the first embodiment, which will be detailed in a section on process.

(B-2) Process of Second Embodiment

In this embodiment, the flow of translation is shown in FIG. 2. The process is executed in sequence of original language input, morpheme analysis, syntax analysis, syntax generation, morpheme generation and translation result output.

In this embodiment, syntax analysis is different from that in the first embodiment.

Figure 11:
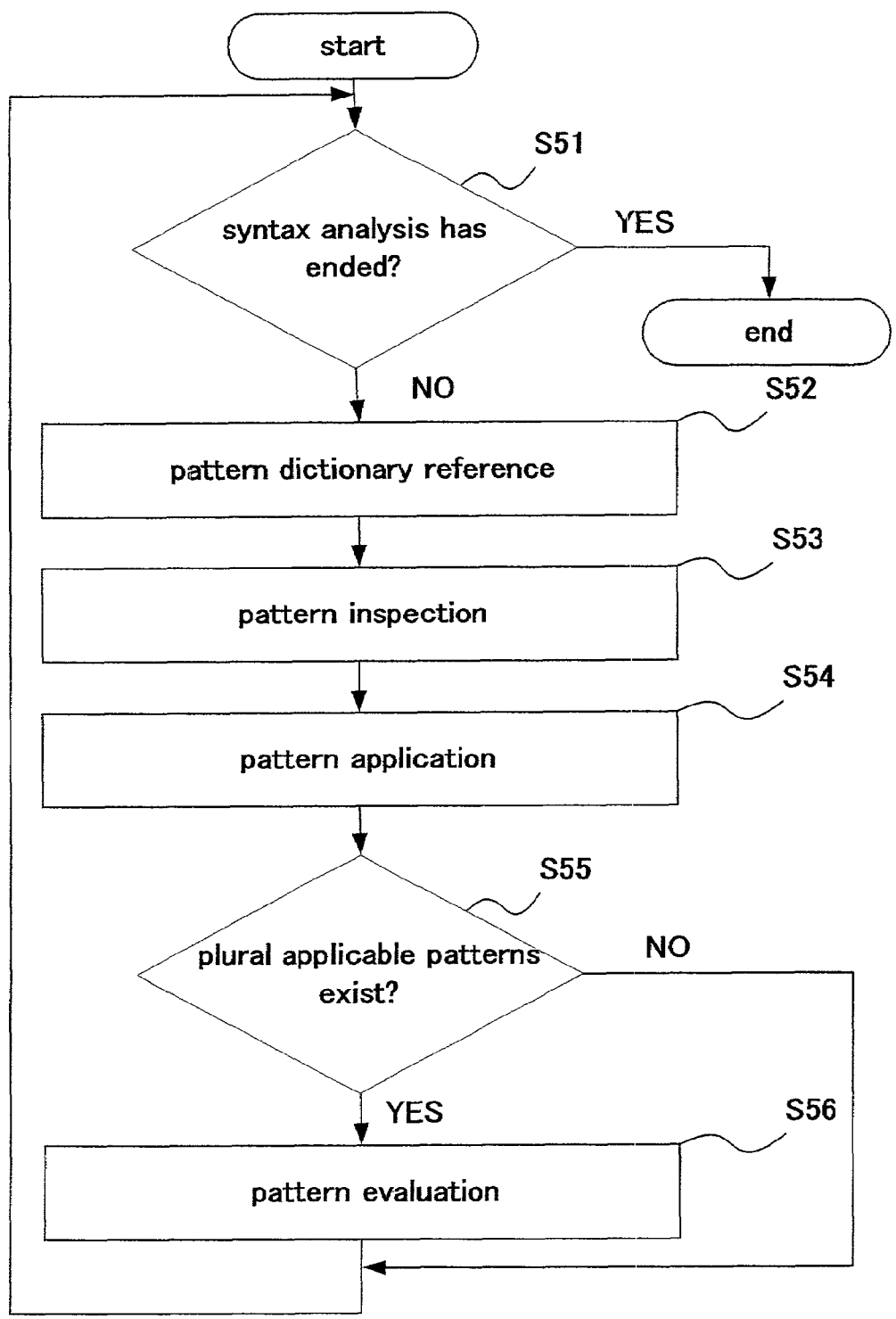
FIG. 11 is a flow chart showing a syntax analysis detail of second embodiment.

FIG. 11 is a flow chart showing a syntax analysis of second embodiment. It is to be noted that same numerals are attached to the processing steps identical or corresponding to those of FIG. 5 in the first embodiment described above.

In this embodiment, after pattern dictionary reference (step S52), pattern inspection (step S53) and pattern application (step S54) are progressed, whether plural applicable patterns exist or not corresponding to the tree structure node under construction is judged (step S55) and pattern evaluation is progressed when plural applicable patterns exist (step S56).

Before explaining the concrete process of the newly added pattern evaluation, the translation patterns stored in the translation pattern dictionary 33 in the second embodiment are explained in reference to FIG. 12.

In the second embodiment, there are translation pattern 12-9 with "!" attached on top of the pattern and translation pattern 12-12 with "*" attached on top of the pattern, in addition to the patterns identical to those of the first embodiment with "[" and "]" put. "!" and "*" are special numerals for representing the pattern priority.

FIG. 13 is an example of file defining the pattern priority, which is stored in the translation pattern dictionary 33 or the pattern evaluation part 22. Herein the priority is high from the top of the file. In addition, [ ] is the rank in the case of no numerals attached. Consequently, there are provided in this example; the pattern with "!" as the highest priority, the pattern with no numerals as the second highest one, and the pattern with "*" as the lowest priority.

In FIG. 12, in the case of the morpheme line in which a definite article is followed by a word capable of forming as both a noun and an adjective and further followed by a noun, the pattern 12-9 is applied when the second word is set as an adjective while the pattern 12-10 is applied when the second word is set as a noun. As shown in FIG. 12, when both of the patterns are applicable, the pattern 12-9 is applied since the pattern 12-9 is higher than the pattern 12-10 in priority. The process will be detailed later.

Also in FIG. 12, patterns 12-11 and 12-12 are the ones with regard to a sentence (S), in which the priority of the pattern 12-12 with no meaning condition given and with general-purpose is low. When the pattern 12-11 with meaning condition given is not applied, the general-purpose pattern 12-12 is applied. The process will be detailed later.

In the pattern evaluation (step S56), plural tree structures are evaluated with the plural patterns applied by using the pattern priority.

Figure 14:
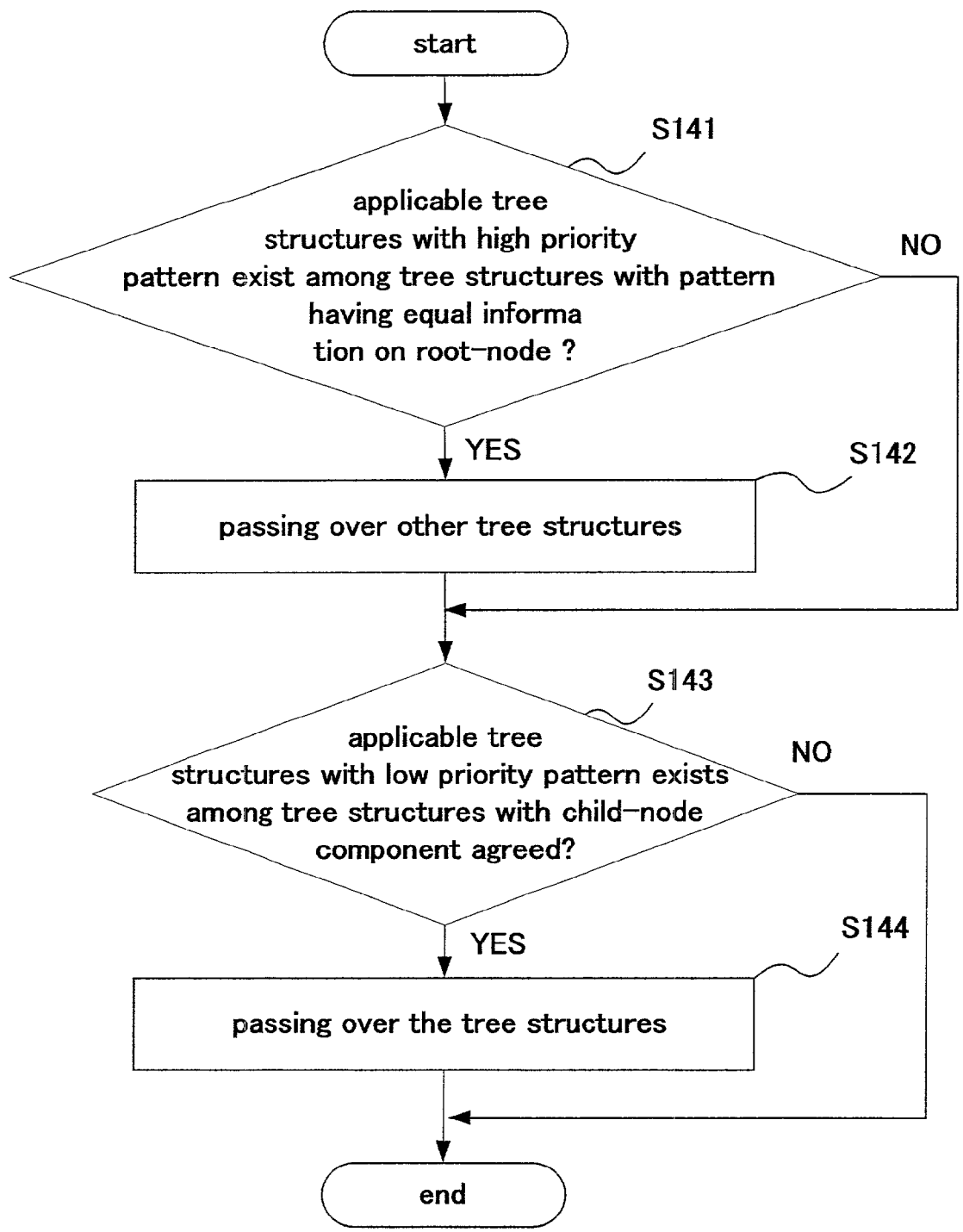
FIG. 14 is a flow chart showing a pattern evaluation detail of second embodiment.

FIG. 14 is a flow chart showing a pattern evaluation detail. The pattern evaluation part 225 judges whether plural tree structure with detailed information on root node (detailed information on pattern name) agreed exist and whether tree structures with high priority on root-node exist when existing (step S141). Herein high priority means relatively high priority among the applicable patterns. Consequently, the high priority pattern is not necessarily restricted to the one with "!". Then, when the tree structures with high priority exist, other tree structures are passed over (step S142). Also, the pattern evaluation part 225 judges whether plural tree structure with child-node component agreed exist and whether tree structures with low priority on child-node exist when existing (step S143). Herein low priority means relatively low priority among the applicable patterns. Consequently, the low priority pattern is not necessarily restricted to the one with "*". Then, when the tree structures with low priority exist, the tree structures are passed over (step S144).

Next, the syntax analysis, especially the pattern evaluation of second embodiment, will be described by referring an example in which a sentence "He arrests the present deterioration" is input. The translation patterns shown in FIG. 12 are appropriately used in the analysis of this input text.

FIGS. 15(a) and (b) show the applicable (evaluation subject) tree structures constructed by applying the patterns 12-9 and 12-10 in FIG. 12 to the part "the present deterioration" in the input text. The numeral "!" attached to the translation pattern 12-9 is attached to the tree structure shown in FIG. 15(a). After the pattern application, when tree structures with same root-nodes and with same words configuring the tree structures as shown in FIGS. 15(a) and (b) exist, these tree structures are forwarded to the pattern evaluation.

In the pattern evaluation, the pattern application is evaluated according to the contents of the priority numeral file shown in FIG. 13 read in advance. If tree structures with numerals desired to be evaluated higher than those with no numerals exist, the only pattern with the numeral of the highest priority is applied only when each detailed information of the root-nodes is same, and the other tree structures are passed over from the applicable tree structures under construction.

Figure 15:
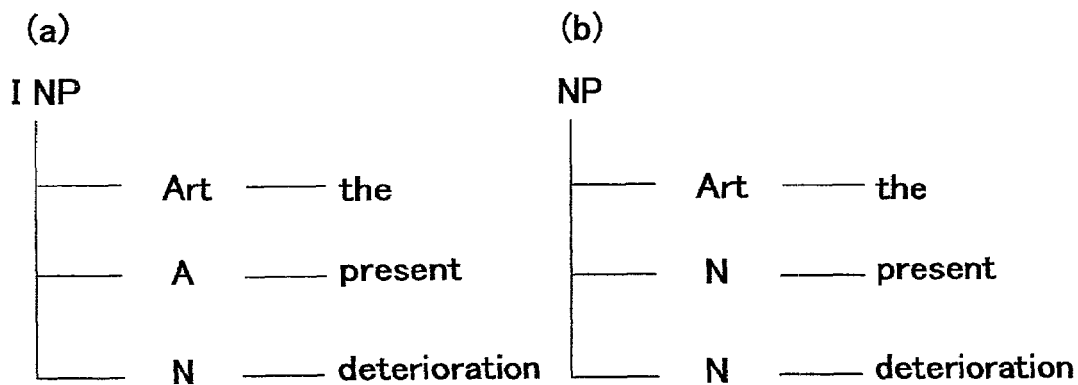
FIG. 15 is an explanatory diagram (1) showing tree structures applicable for the pattern evaluation of second embodiment.

In the example of FIG. 15, since the detailed information on the tree structure of FIG. 15(a) and the one of FIG. 15(b) are same and since the tree structure of FIG. 15(b) with no numerals is lower in priority than the tree structure of FIG. 15(a) with the numeral for setting the priority high, the tree structure of FIG. 15(b) is passed over.

Figure 16:
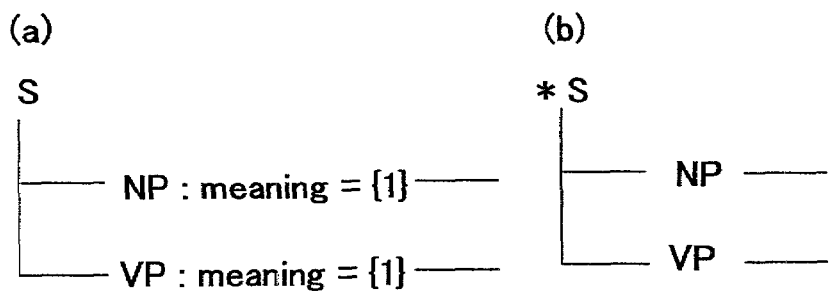
FIG. 16 is an explanatory diagram (2) showing tree structures applicable for the pattern evaluation of second embodiment.

On the other hand, FIG. 16 is an example that tree structures with the numeral "*" for setting the priority lower than that of the pattern with no numerals exist among plural applicable patterns. The numeral for setting the priority low is evaluated under the condition that the child-node components of the tree structures are same. FIG. 16(a) shows a tree structure with no numerals to which the pattern 12-11 is applied while FIG. 16(b) shows a tree structure with the numeral "*" to which the pattern 12-12 is applied. These tree structures have the same child-node components "NP" and "VP" and since the numeral "*" is attached to the tree structure in FIG. 16(b), which is passed over.

Figure 17:
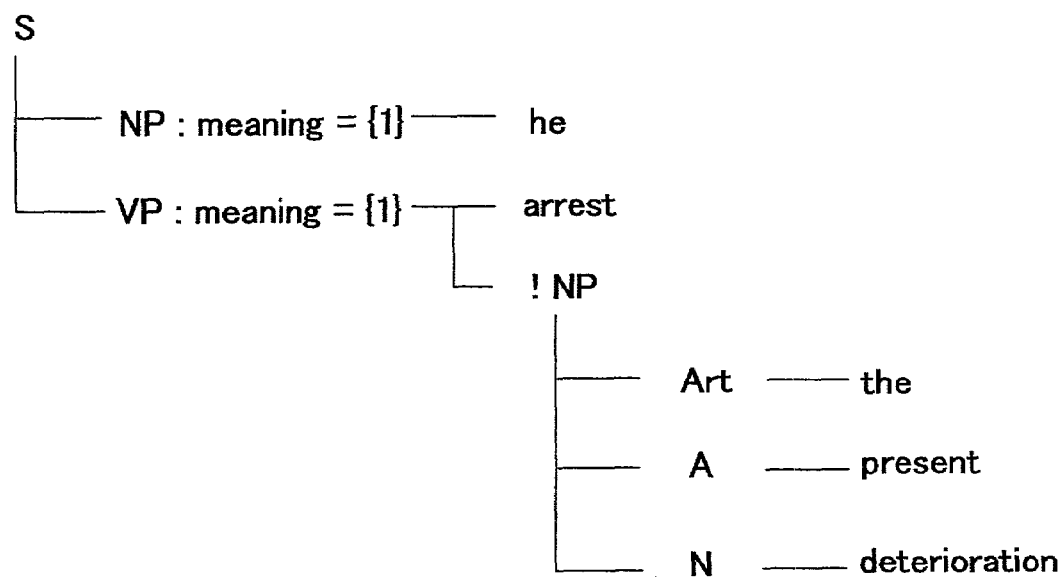
FIG. 17 is an explanatory diagram showing an example of a syntax analysis result of second embodiment.

FIG. 17 shows a final syntax analysis result of the input text "He arrests the present deterioration".

After the syntax generation in which the tree structure in Japanese corresponding to the syntax analysis result is generated and the morpheme generation, the input text described above is translated into "kare ha genzai no akka wo sosisuru".

(B-3) Effect of Second Embodiment

According to the machine translation apparatus and method of second embodiment, following effects can be achieved as well as that of first embodiment.

(a) For example, a translation is desired to be achieved by giving priority application of one of the plural applicable tree structures which are syntactically correct. This object can be achieved in second embodiment by attaching the numeral "!" for setting the priority high to the patterns desired to have priority application.

(b) When plural patterns with same pattern condition and with different priority exist in mid course of the tree structure analysis, the number of application and the time of processing for the syntax analysis and the syntax generation can be reduced by passing over the pattern.

(c) By registering the pattern with the numeral for setting the priority low and with no meaning condition, only the pattern with the meaning condition is applied in the case of the meaning condition applied while the pattern with the numeral for setting the priority low and with no meaning condition is applied only in the case of the meaning condition not applied. Hereby a needless analysis of always applying the pattern with no meaning condition can be eliminated, and the time of processing for the analysis can be reduced. Further, when the meaning condition is not applied, the failure of the syntax analysis can be avoided to achieve the probable (general-purpose) translation.

(d) When the pattern with no meaning condition is applied, the translation can be achieved not by special translation words with strict conditions but by translation words of general-purpose by attaching the numeral for setting the priority high to the patterns corresponding to the probable (general-purpose) translation.

(B-4) Changed Form of Second Embodiment

In second embodiment, the numeral showing priority can be any kinds of numerals (not only a simple numeral, but also numbers, parentheses, character strings and the like). Also, another form of information can be adopted to the embodiment instead of numerals.

Further, plural priorities can be prepared in sequence, for example, "!" and "+" are set as the numeral for setting the priority high and the former has the priority.

(C) Third Embodiment

Next, third embodiment, in which apparatus and method for natural language processing of the present invention are applied to a machine translation apparatus and a machine translation method, will be described in reference to the accompanying drawings.

(C-1) Structure of Third Embodiment

Figure 18:
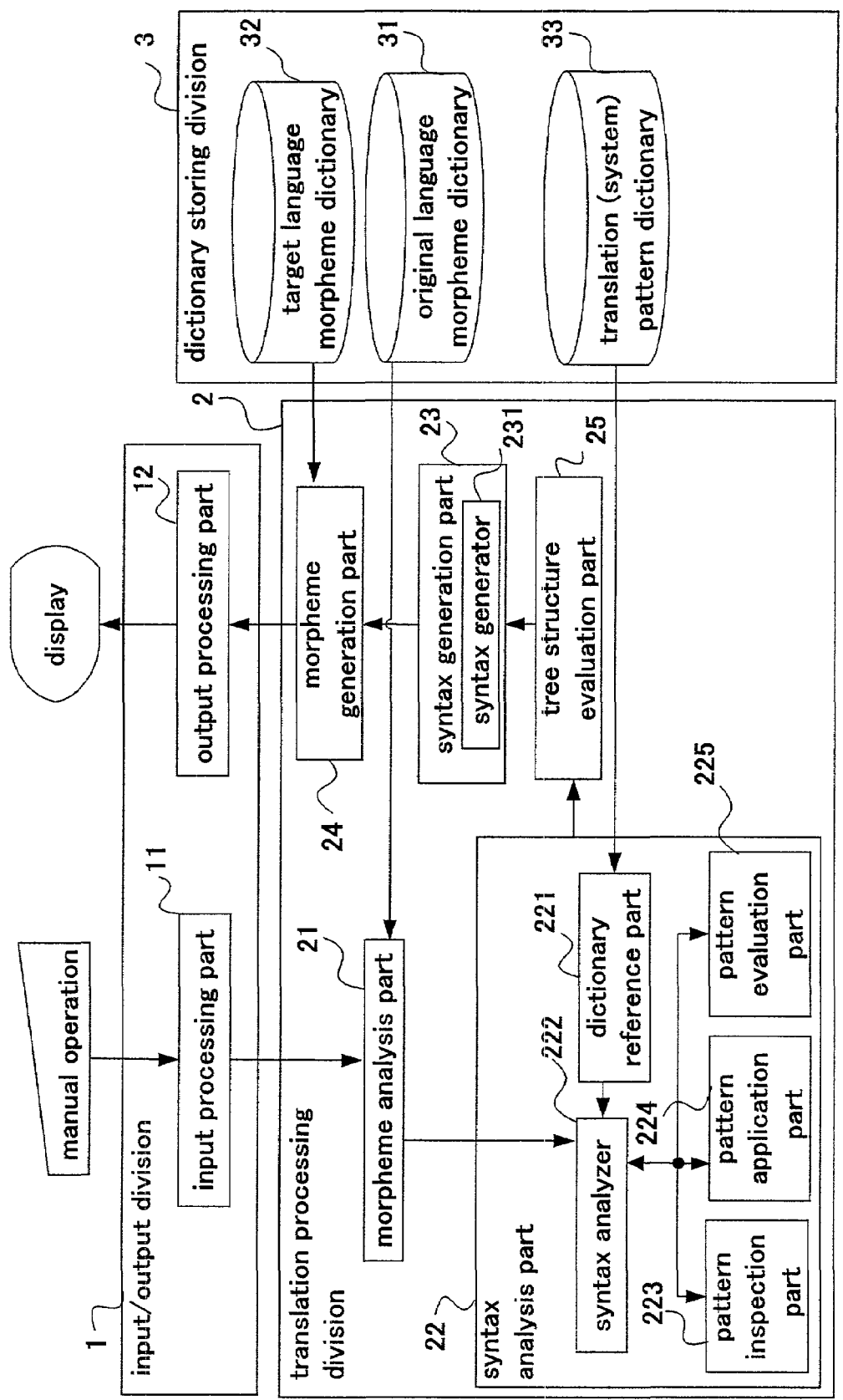
FIG. 18 is a block diagram showing a functional configuration of a machine translation apparatus of third embodiment.

FIG. 18 is a block diagram showing a functional configuration of a machine translation apparatus of third embodiment. It is to be noted that same numerals are attached to the parts identical or corresponding to those of FIG. 10 in the second embodiment.

The machine translation apparatus of third embodiment is configured by a tree structure evaluation part 25 in addition to the configuration of second embodiment.

The tree structure evaluation part 25 evaluates (calculates score) which tree structure is the most appropriate according to the information on pattern and select the most appropriate tree structure to forward to the syntax generation part 23, or change the order of plural applicable tree structures from the high evaluation value to forward to the syntax generation part 23 when plural applicable tree structures exist as syntax analysis result on the original language completed by syntax analysis.

(C-2) Process of Third Embodiment

Figure 19:
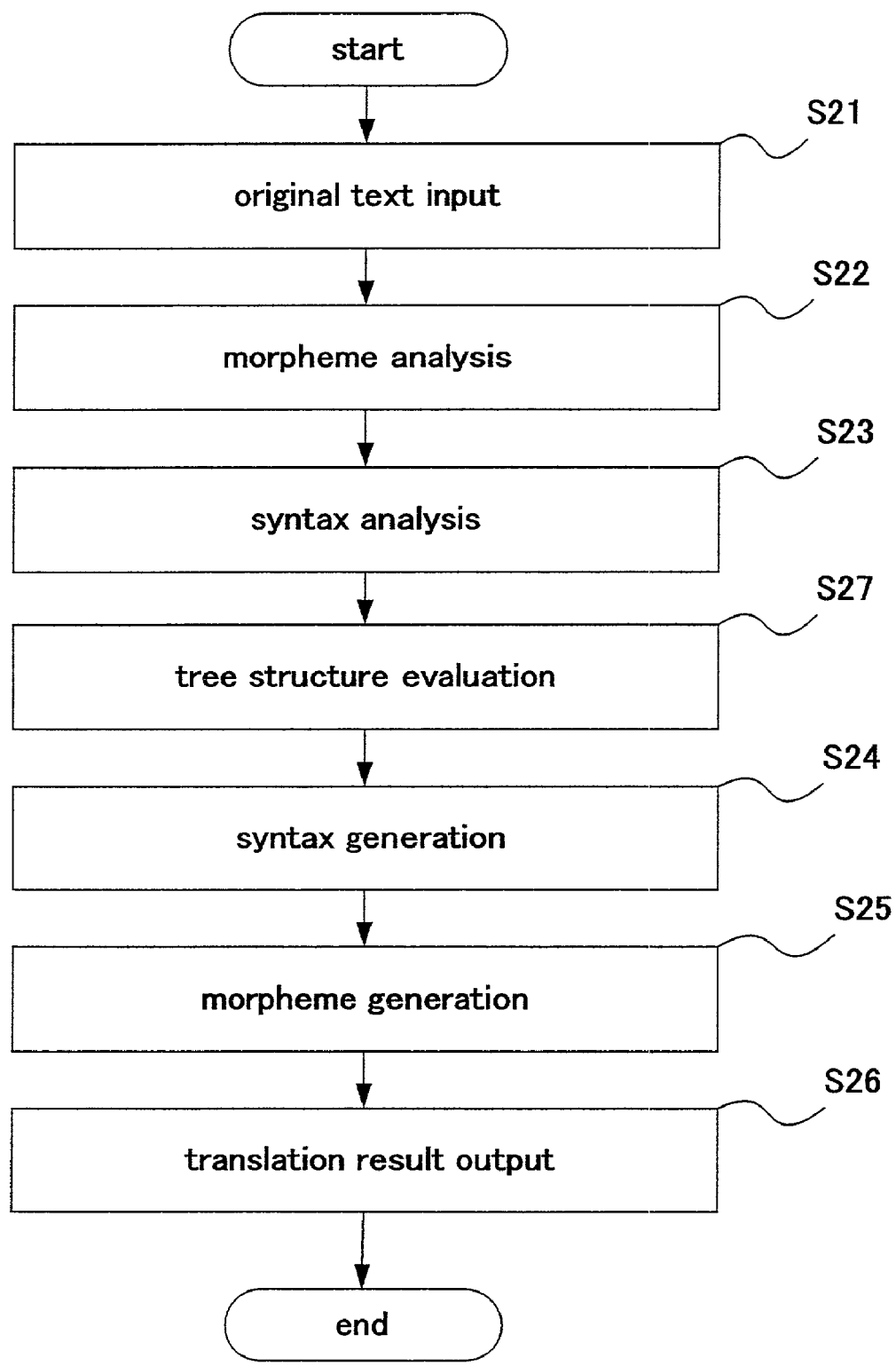
FIG. 19 is a flow chart showing a translation process of a machine translation apparatus of third embodiment.

FIG. 19 is a flow chart showing a translation process of a machine translation apparatus of third embodiment. Same numerals are attached to the processes identical or corresponding to FIG. 5 in first embodiment.

In this embodiment, original text input (step S21), morpheme analysis (step S22), syntax analysis (step S23), tree structure evaluation (step S27), syntax generation (step S24), morpheme generation (step S25) and translation result output (step S26) are executed in this sequence. In other words, the tree structure evaluation (step S27) is added to the processes of first and second embodiments.

Figure 20:
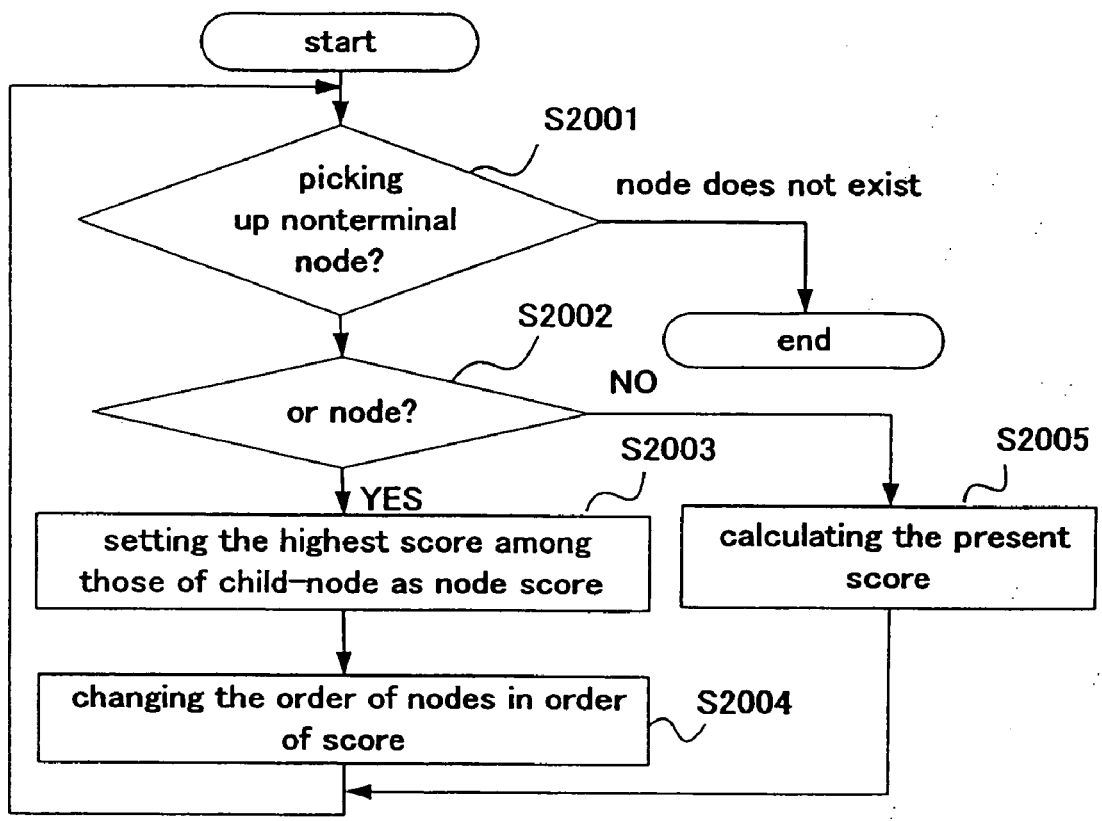
FIG. 20 is a flow chart showing a tree structure evaluation of third embodiment.

FIG. 20 is a flow chart showing a tree structure evaluation of third embodiment. The tree structure evaluation part 25 receives the syntax analysis result and processes from the bottom to calculate score. The tree structure evaluation part 25 picks up nonterminal numeral (step S2001), judges the nonterminal numeral is or-node (step S2002), calculates the score of present node if the nonterminal numeral is not or-node (step S2005), sets the highest score among those of child-node as node score (step S2003) and changes the order of nodes in order of score if the nonterminal numeral is or-node. This process is repeated until the nonterminal numeral, the score of which is not calculated, does not exist. It is to be noted that the concrete method for calculation will be detailed later.

Hereafter, the tree structure evaluation will be described by referring an example in which a sentence "It arrests an attention" is input.

Figure 21:
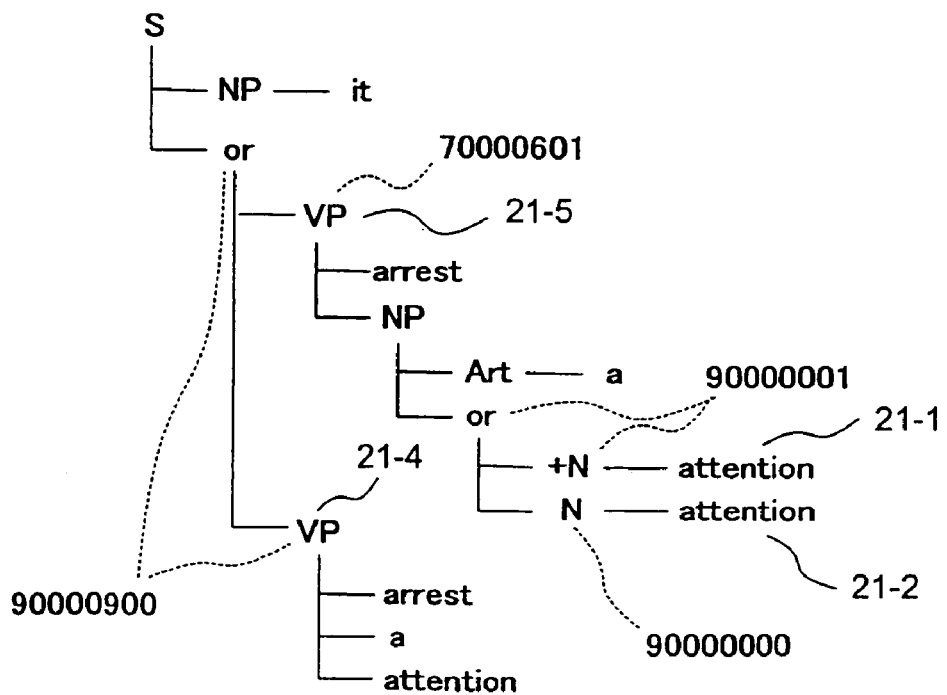
FIG. 21 is an explanatory diagram showing an example of syntax analysis result on a tree structure evaluation of third embodiment.

FIG. 21 is the syntax analysis result on the input text. FIG. 21 includes four pieces of applicable syntax analysis result (showing four tree structures together) since two pieces of or-node exist. In FIG. 21, a number with a dotted line shows a value calculated in the tree structure evaluation and is not included in the syntax analysis result. It is to be noted that the translation pattern dictionary 33 used in the syntax analysis is identical to that in second embodiment (FIG. 12). However, There are two kinds of numerals, "!" and "+" as a numeral for setting priority high, and the former shows the numeral for setting priority high by two levels and the latter by one level.

Figures 22, 23:
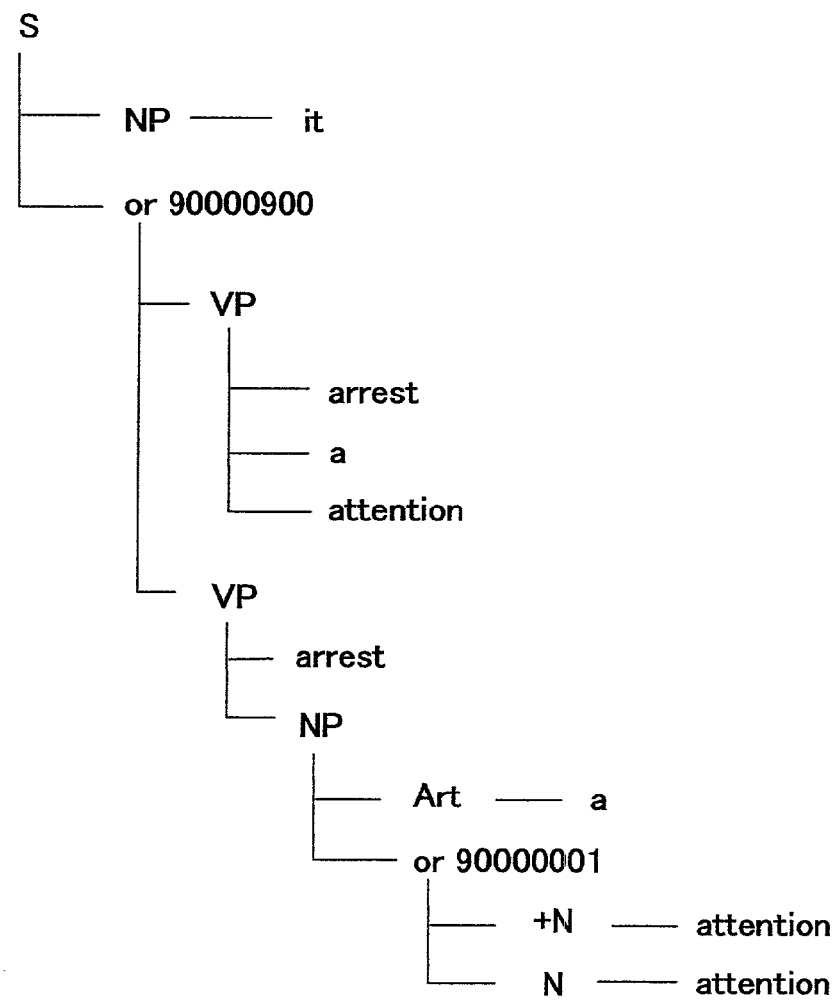
FIG. 22 is an explanatory diagram showing a file for defining evaluation score calculation means of tree structure of third embodiment.
FIG. 23 is an explanatory diagram showing a syntax analysis result on a tree structure evaluation word of third embodiment.

FIG. 22 shows a file for defining evaluation score calculation means. The evaluation score calculation means definition file is stored in, for example, the tree structure evaluation part 25.

The evaluation score calculation means definition file comprises an evaluation item name field 221, an evaluation part field 222 and an evaluation score field 223.

In the evaluation item name field 221, not only such numerals for setting priority of patterns high and low as "!", "+", "*" and "node" (general priority node), but also such evaluation item names as "terminal" meaning the number of terminal numeral of tree structure and "user" meaning what relates to user registration (for example, registration in the morpheme dictionary and the pattern dictionary), are described.

In the evaluation part field 222, such evaluation parts as "total" meaning that all branches under a self node (for example, or-node) are the evaluation parts and as "child" meaning that a child-node right under a self node (for example, or-node) is the evaluation part are described.

In the evaluation score field 223, the evaluation score is described. The evaluation score, in which the evaluation part is "total", is described with the expression (for example, 1000–100N) according to the number (for example, N) of the corresponding evaluation item (for example, numeral). It is to be noted that "1000–100N" means "1000–100×N" mathematically. With regard to the evaluation score, in which the evaluation part is "child", a fixed evaluation score is described.

The evaluation score calculation means definition file in FIG. 22 evaluates the matter of user registration best, the number of terminal numerals and the priority of patterns. It is to be noted that the highest priority numeral "!" is also evaluated according greatly to whether it is attached to the node right under or-node or not.

In the tree structure evaluation in FIG. 20, the score in the step S2005 calculated in accordance to the prescribed context of the evaluation score calculation means definition file.

The concrete means for calculation will be detailed in reference to FIG. 21.

Since the numeral "+" is attached to +N in the node 21-1 and since the number of nonterminal numeral is only one, "attention", the evaluation score becomes 90000001 by applying the records 225 and 230 in the definition file in FIG. 22. On the other hand, since the numeral "+" is not attached to the node 21-2 and since the number of nonterminal numeral is only one, "attention", the evaluation score becomes 90000000 by applying the record 225 in the definition file in FIG. 22. As a result, the higher evaluation score of the node 21-1 is applied to the next or-node 21-3.

Since the "arrests an attention" is formed in one piece as the VP in the node 21-4 and since the number of terminal numeral (the number of terminal numeral) corresponds to the number of child-node, only one, the evaluation score becomes 90000900 by applying the records 225 and 228 in the definition file. On the other hand, since the VP in the node 21-5 is configured by three terminal numerals (terminal numerals), four child-nodes and one numeral "+" at the end of branch, the evaluation score becomes 7000601 by applying the records 225, 228 and 2210 in the definition file. As a result, the evaluation score of the node 21-4 is applied to the next or-node 21-6.

After the calculation of evaluation score ends, the order of node is changed in order of score. The tree structure after the order changed will shown in FIG. 23.

The syntax generation generates the tree structure in Japanese (target language) corresponding to the above tree structure. If the tree structure in English has or-node, only the Japanese node corresponding to the English node at the top of the child-node of or-node is selected to generate. Next, the morpheme generation is executed to input the translation result, "sore ha kyoumi wo hiku".

If a user wants plural applicable translation result to be input, the syntax generation and the morpheme generation are executed by using the Japanese tree structures corresponding to all the child-node of or-node. The translation result is input as "sore ha (kyoumi wo hikultyuui wo sosisuru)". In this case, the former has higher score in the system.

(C-3) Effect of Third Embodiment

According to the machine translation apparatus and method of third embodiment, following effects can be achieved as well as those of first and second embodiments.

(a) More detailed translation and an appropriate translation which is related to syntax analysis can be achieved by evaluating with various kinds of priority numerals attached to patterns and with detailed information on patterns.

(b) In this embodiment, the translation result according to the priority can be expected and becomes easy to be anticipated by deciding the priority of various kinds of priority numerals and detailed information on patterns.

(c) Such conditions other than priority numerals as the number of terminal pattern can be evaluated the same expression at the same time.

(d) For example, in the result of syntax analysis of "today", when the applicable part of speech is only noun, the word is desired to be translated into as a noun, while when the applicable part of speech are noun and adverb, the word is desired to be translated into as an adverb. In this case, plural parts of speech can be prioritized by attaching the numeral for setting the priority of preferred part of speech (in this case, adverb) high.

(C-4) Changed Form of Third Embodiment

The priority numerals for controlling means for calculating evaluation score used in third embodiment can be used with the ones in second embodiment or used separately. In the former case, two-level prioritizing can be achieved with one numeral, wherein the applicable patterns can be narrowed down in the pattern evaluation by attaching numerals and the rest of patterns can be prioritized by calculating score. The above explanation has been provided in view of this case.

Any number and kind of the numeral for deciding means for calculating evaluation score can be adopted, or plural kinds of numerals can be attached at the same time.

Any expression for score calculation and any score allotment on each evaluation item can be adopted or can be easy to be changed. The score calculation considering the level of tree structure, wherein the priority of numeral attached to the node right under or-node is set higher than that of number of numerals in entire tree structure, can be achieved.

The priority can be decided according not only to the number of terminal numeral but also to the characteristics of another tree structure and patterns. A certain principle can be set on the output of translation result, wherein the stricter pattern is always translated by priority even when plural patterns meet the condition by attaching numerals, for example, the smaller the number of meaning of noun phrase in the object of first embodiment becomes, the higher the priority becomes.

(D) Fourth Embodiment

Next, fourth embodiment, in which apparatus and method for natural language processing of the present invention are applied to a machine translation apparatus and a machine translation method, will be described in reference to the accompanying drawings.

(D-1) Structure of Fourth Embodiment

Figure 24:
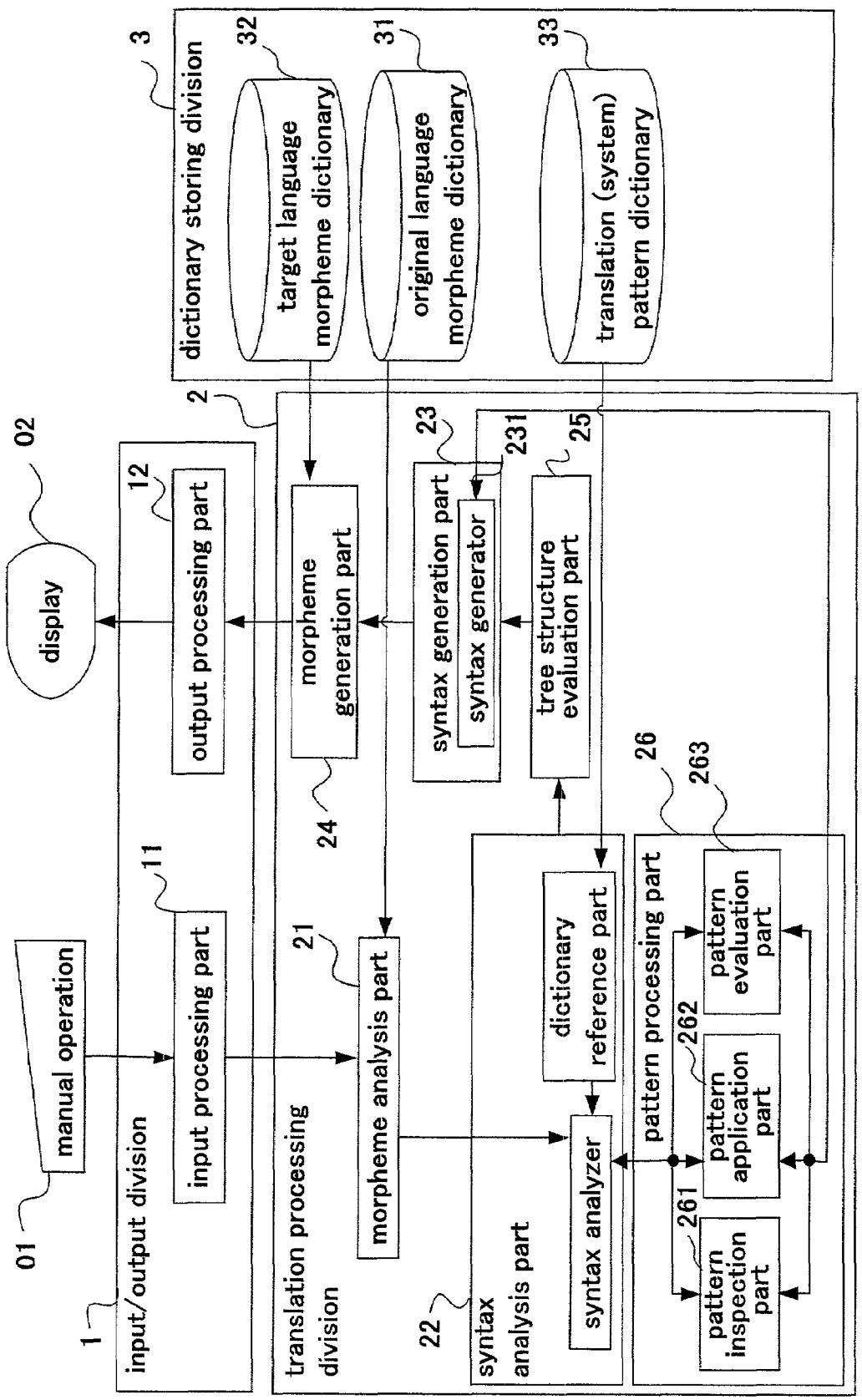
FIG. 24 is a block diagram showing a functional configuration of a machine translation apparatus of fourth embodiment.

FIG. 24 is a block diagram showing a functional configuration of a machine translation apparatus of fourth embodiment. It is to be noted that same numerals are attached to the parts identical or corresponding to those of FIG. 18 in the third embodiment.

The machine translation apparatus of fourth embodiment is configured by a pattern inspection part 261, pattern application part 262 and a pattern evaluation part 263 as a pattern processing part 26 which is independent on and externalized from the syntax analysis part 22, and which can be used by a syntax generator 231 in the syntax generation part 23.

In other words, the pattern inspection, application and evaluation can be executed not only in the syntax analysis but also in the syntax generation.

Plural target language patterns correspond to the same original language pattern as the translation pattern in some cases. Also, the pattern application condition can be justifiably given to the target language patterns, although not shown in FIG. 4. This condition is considered in fourth embodiment.

(D-2) Process of Fourth Embodiment

The different process from that in the embodiments described above is a syntax generation. Hereafter, the typical process in the syntax generation in this embodiment will be described in reference to a flow chart of FIG. 25.

In the prior method, since English (original language) tree structure and Japanese (target language) tree structure are constructed almost at the same time (replacement of tree structures by using a simple pattern), a specific syntax generation is not executed. Consequently, the deviance from pattern application condition cannot be detected in the Japanese tree structure.

Figure 25:
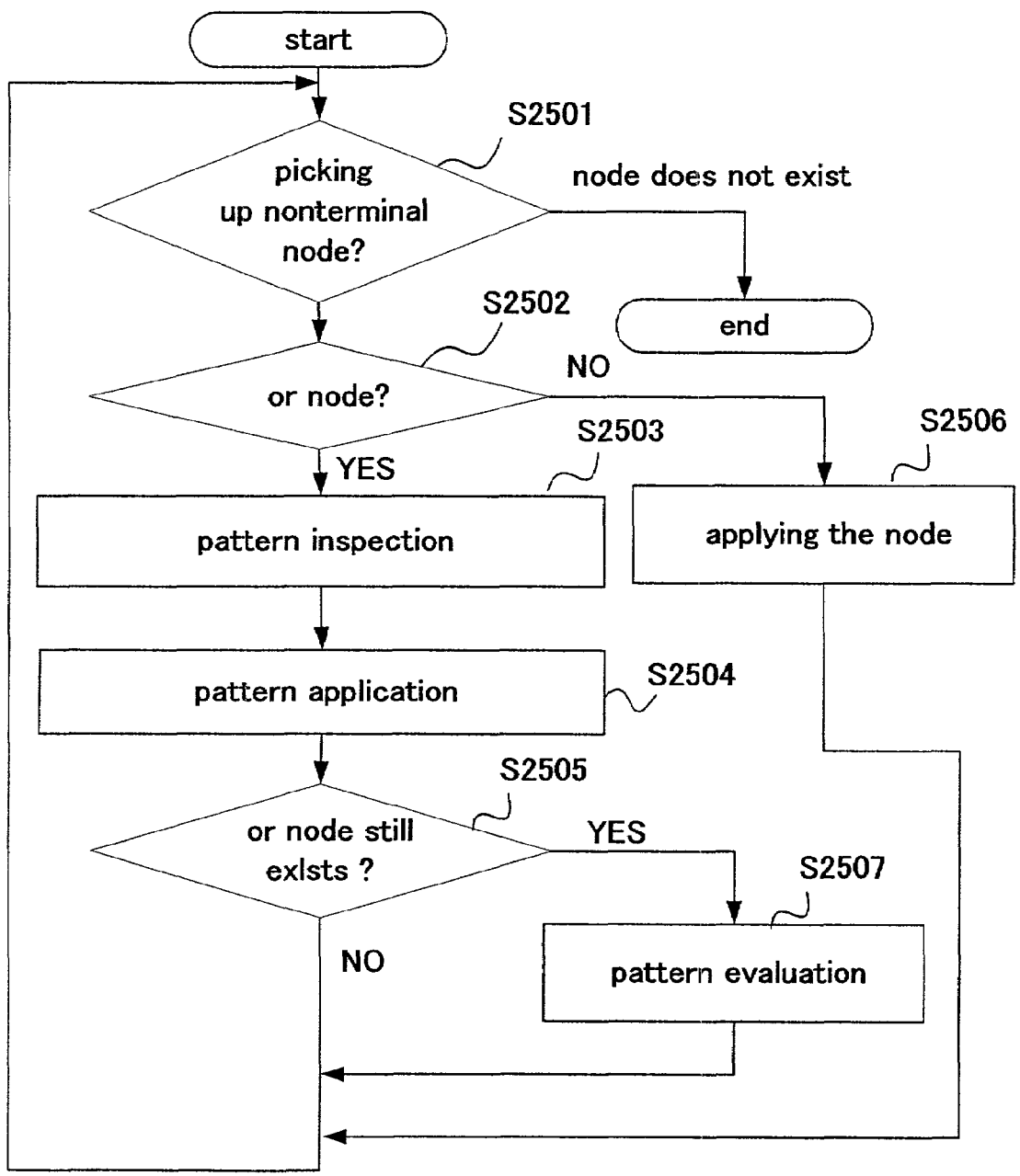
FIG. 25 is a flow chart showing a typical process of syntax generation of fourth embodiment.

An object of fourth embodiment is to cancel plural applicable nodes by executing the pattern inspection, the pattern application and the pattern evaluation when the plural applicable nodes are generated in the Japanese tree structure constructed almost in parallel with the construction of the English tree structure. The process of FIG. 25 is executed on the provisional Japanese (target language) tree structure achieved by, for example, a conventional syntax generation from the English tree structure (a simple replacement by using pattern).

The syntax generator 231 picks up one nonterminal numeral from the root-node, that is, top-down in the provisional tree structure (step S2501) and judges whether it is or-node or not (step S2502).

If it is or-node, the parent tree structure including the pattern of child-node in or-node and or-node itself is forwarded to the pattern inspection part 223 to execute the pattern inspection and the pattern application (step S2503). After the pattern inspection, the pattern application is executed by the pattern application part 224 according to the inspection result (step S2504). Next, the pattern application judges whether or-node still exists or not (step S2505). If it is still exists, the pattern evaluation part 225 executes the pattern evaluation (step S2507).

If the picked nonterminal numeral is not or-node, the node is applied (step S2506).

These processes are repeated until the nonterminal numeral cannot be picked up to complete (generate) the Japanese (target language) tree structure.

It is to be noted that the pattern inspection, the pattern application and the pattern evaluation are almost same processes as those in the embodiments described above.

Hereafter, the syntax generation in fourth embodiment will be described by referring an example in which a sentence "the intellectual woman" is input.

Figure 26:
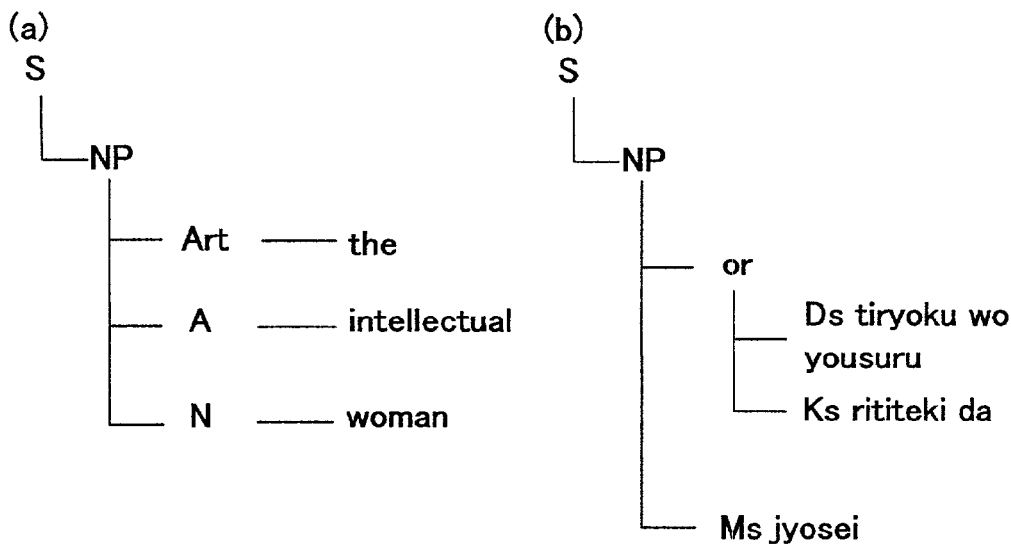
FIG. 26 is an explanatory diagram showing a tree structure before processing a syntax generation of fourth embodiment.

FIG. 26(*a*) shows the syntax analysis result (tree structure in English) on this input text. FIG. 26(*b*) shows the corresponding tree structure in Japanese, which is provisional and constructed by the correspondence result on the English tree structure, and on which the process in FIG. 25 is executed.

The tree structure in FIG. 26(*b*) includes or-node to execute the pattern inspection and the pattern application.

Figure 27:
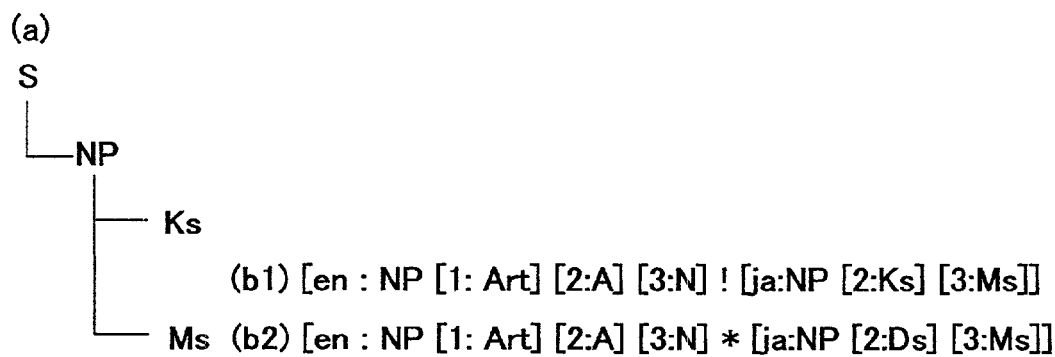
FIG. 27 is an explanatory diagram showing pattern inspection and pattern application of fourth embodiment.

When the translation pattern shown in FIG. 27(*b*1) is described and when FIG. 27(*a*) shows the parent tree structure for executing the pattern inspection and the pattern application, the pattern meets in the pattern inspection to apply the Japanese pattern in FIG. 27(*b*1). As a result, or-node is canceled to go on to the next node.

However, the pattern evaluation is executed on even the translation pattern in FIG. 27(*b*2), when two Japanese patterns corresponding to one English pattern are described and both of them are applicable.

The priority numerals are attached to the two Japanese patterns, which are narrowed down to one or prioritized.

Figure 28:
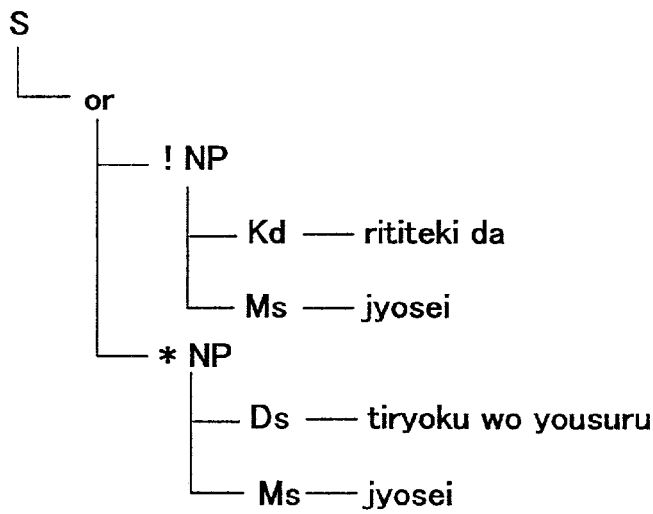
FIG. 28 is an explanatory diagram showing an example of a syntax generation result of fourth embodiment.

FIG. 28 shows the syntax generation result when the input text is prioritized. The result is forwarded to the morpheme generation part to be translated into "rititeki na jyosei" or "rititeki na jyoseitiryoku wo yuusuru jyosei".

(D-3) Effect of Fourth Embodiment

According to the machine translation apparatus and method of fourth embodiment, following effects can be achieved as well as those of the embodiments described above.

(a) An appropriate translation can be achieved not only by the information on original language but also by the information on target language.

(b) When a two-way translation is achieved by the translation pattern dictionary, priorities are given to both the original language pattern and the target language pattern to be reused on the analysis and generation side.

(D-4) Changed Form of Fourth Embodiment

Although the method similar to that in second embodiment, in which the plural patterns are reduced in the pattern generation, has been described, the method similar to that in third embodiment, in which all the applicable patterns are achieved by the syntax analyzer and the scores of syntax generation trees are calculated, can be adopted. In addition, both methods can be adopted at the same time.

In a translation of the target language into the original language, the priority given to the target language pattern can be used in the analysis. In this case, the priority given to the original language pattern can be used in the generation.

(E) Fifth Embodiment

Next, fifth embodiment, in which apparatus and method for natural language processing of the present invention are applied to a machine translation apparatus and a machine translation method, will be described in reference to the accompanying drawings.

(E-1) Structure of Fifth Embodiment

Figure 29:
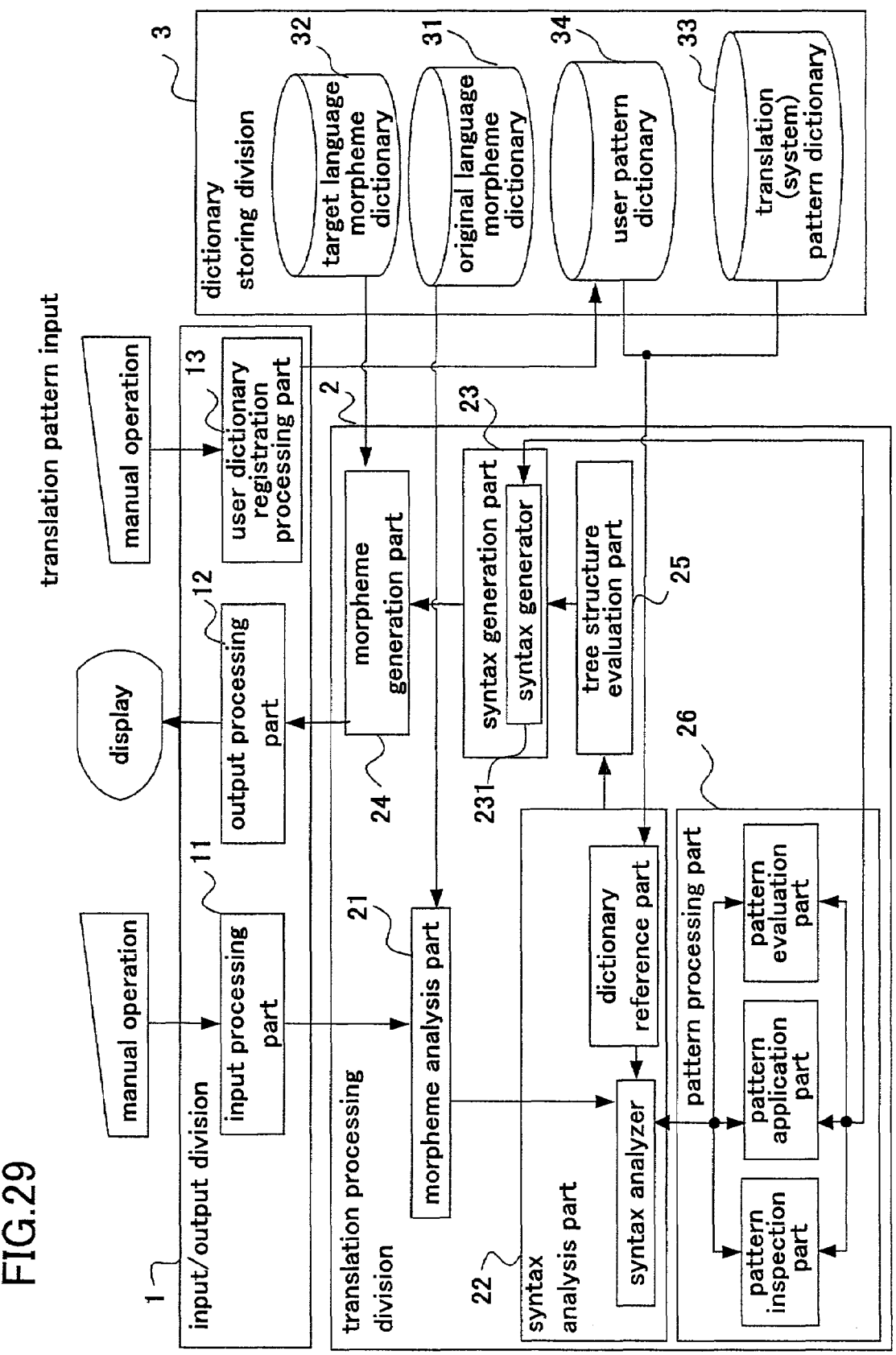
FIG. 29 is a block diagram showing a functional configuration of a machine translation apparatus of fifth embodiment.

FIG. 29 is a block diagram showing a functional configuration of a machine translation apparatus of fifth embodiment. It is to be noted that same numerals are attached to the parts identical or corresponding to those of FIG. 24 in the fourth embodiment.

The machine translation apparatus of fifth embodiment is configured by an user dictionary registration processing part 13 for receiving a translation pattern input by an user, and an user pattern dictionary 34 for storing the translation pattern in the dictionary storing division 3, in other words, configured by an user registration (deletion) function.

Consequently, the syntax analysis part 22 refers to both the system pattern dictionary 33 and the user pattern dictionary 34.

(E-2) Process of Fifth Embodiment

Since the translation pattern relates to the user registration, special knowledge is necessary to register directly such detailed information as condition. However, the registration can be achieved through the same process as that for registration of words (morpheme) and the like by including a user interface and the like. It is to be noted that following points are different.

Hereafter, the case in which an user registers "Following is [NP]." as "[NP] wo tsugi ni simesimasu."

In this case, the translation result is as follows;

[en:S[following is [1:NP].]

(ja:S[1:NP] wo tsugi ni simesimasu.]

If this pattern is desired to be applied only when the word in noun phrase means other than person, the registration is achieved with a description of meaning condition as follows;

[en:S [following is [1:NP:meaning!=preson].]

(ja:S [1:NP] wo tsugi ni simesimasu.]

In this case, the condition can be downloaded not only by waiting for random input of the user but also by the user dictionary registration processing part 13 displaying a message inquiring whether the condition is set or not in the case of NP and displaying examples of setting condition.

In this embodiment, numerals for setting priority high is always given to the patterns related to user registration.

Further, the evaluation item name record 221, "user" has the highest score in the evaluation score calculation means definition file in FIG. 22 in third embodiment. In evaluating tree structure, the evaluation item name record related to the pattern in the user pattern dictionary has the highest priority to achieve the translation result.

"User" means a user pattern, and "child" means right under child-node. Record 22-1 means that the highest score (100000000) is given to the user pattern right under or-node. Hereby the user pattern has the highest priority of all applicable patterns, and the pattern registered by the user is always reflected in the translation result.

(E-3) Effect of Fifth Embodiment

According to the machine translation apparatus and method of fifth embodiment, following effects can be achieved as well as those of the embodiments described above.

(a) Such conditions as meaning can be given to variables in the translation pattern dictionary created by the user.

Hereby the registration can be achieved by the generalized patterns and the number of patterns to be registered can be reduced.

(b) The priority numerals can be attached to each user patterns, and the translations of word and text can be controlled by the user.

(c) Since the evaluation score related to the user pattern is calculated by the same means as the ones for another patterns, the change of the priority of user pattern dictionary can be responded easily.

(d) Both translation results in which the user pattern is used and is not used can be achieved at the same time by outputting all the applicable translation words.

(E-4) Changed Form of Fifth Embodiment

Although the user pattern dictionary has the highest priority in fifth embodiment, the priority can be appropriately changed. For example, the least number of nodes has the highest priority, and the user pattern has the second highest priority.

Plural user pattern dictionaries can be created and be set the priority each.

The numerals for setting the priority high and low can be attached in the user pattern dictionary. In this case, the priority is decided in the user dictionary. The user pattern dictionary can be easily created in the user pattern dictionary input processing part not by inputting directly such a translation pattern as [en:][ja: ] but by setting up an user interface for inputting pattern names, words and variables easily.

In fifth embodiment, the translation is achieved by the user pattern dictionary as the priority through the evaluation of user pattern in the tree structure evaluation part. However, the translation can be also achieved by the means, in which when the user pattern and another applicable patterns exist in the pattern evaluation part, the former one is applied and the latter ones are not applied (see second embodiment).

(F) Sixth Embodiment

Next, sixth embodiment, in which apparatus and method for natural language processing, and apparatus and method for creating a natural language pattern dictionary, of the present invention are applied to a machine translation apparatus and a machine translation method, will be described in reference to the accompanying drawings.

(F-1) Structure of Sixth Embodiment

Figure 30:
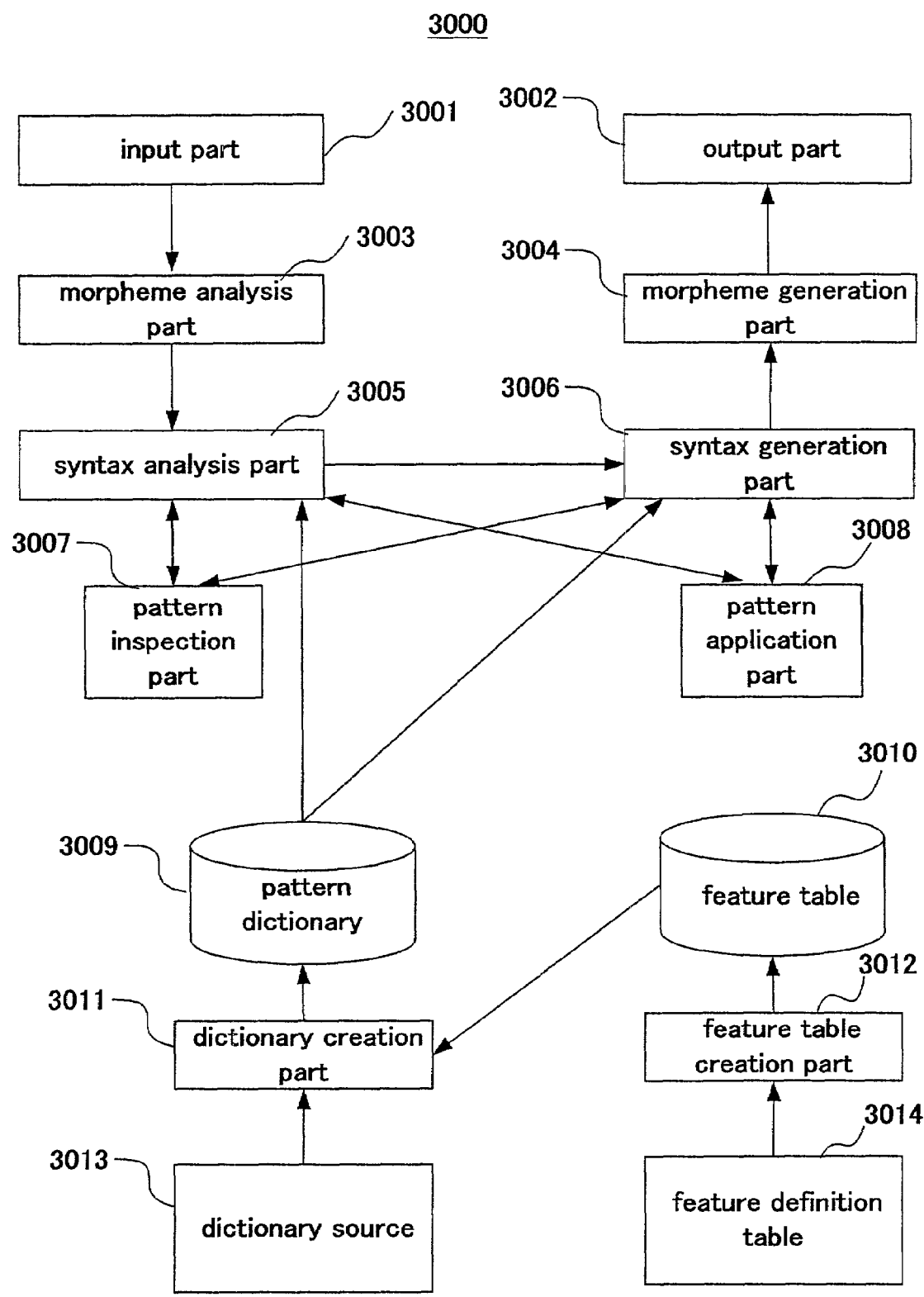
FIG. 30 is a block diagram showing a functional configuration of a machine translation apparatus of sixth embodiment.

FIG. 30 is a block diagram showing a functional configuration of a machine translation apparatus of sixth embodiment. It is to be noted that the machine translation apparatus in sixth embodiment is actually constructed by, for example, that a processing program and a fixed data are downloaded on such an information processor as a personal computer.

In FIG. 30, a machine translation apparatus 3000 in sixth embodiment is configured by an input part 3001, an output part 3002, a morpheme analysis part 3003, a morpheme generation part 3004, a syntax analysis part 3005, a syntax generation part 3006, a pattern inspection part 3007, a pattern application part 3008, a pattern dictionary 3009, a feature table 3010, a dictionary creation part 3011, a feature table creation part 3012, a dictionary source 3013 and a feature definition table 3014.

In addition, the main part of machine translation apparatus is configured by the input part 3001, the output part 3002, the morpheme analysis part 3003, the morpheme generation part 3004, the syntax analysis part 3005, the syntax generation part 3006, the pattern inspection part 3007, the pattern application part 3008 and the pattern dictionary 3009, in the above components.

The input part 3001 is a part for inputting the text (original language text) to be translated and corresponds not only to keyboards but also the structure of reading out from sentence file. The morpheme analysis part 3003 is a part for separating the input text by morpheme (for example, word). It is to be noted that the input part 3001 and the morpheme analysis part 3003 are the same as those in the prior art. In addition, the morpheme dictionary for the morpheme analysis is not shown as a figure.

The syntax analysis part 3005 is a part for analyzing syntax by referring to the pattern dictionary 3009 and by using the pattern inspection part 3007 and the pattern application part 3008 appropriately, based on the morpheme analysis result on the morpheme analysis part 3003. On the other hand, the syntax generation part 3006 is a part for generating syntax in the target language by referring to the pattern dictionary 3009 and by using the pattern inspection part 3007 and the pattern application part 3008 appropriately, based on the syntax analysis result on the original language text forwarded from the syntax analysis part 3005. The functions of the syntax analysis part 3005 and the syntax generation part 3006 will be detailed in a section on process.

The morpheme generation part 3004 is a part for achieving the translation result by applying the morpheme to the corresponding syntax in the target language generated by the syntax generation part 3006. The output part 3002 is a part for outputting the translation result not only by display means and printing means but also by storing means. Also, the number of applicable translation results may be specified by the user. It is to be noted that the morpheme generation part 3004 and the output part 3002 are the same as those in the prior art. In addition, the morpheme dictionary for the morpheme generation is not shown as a figure.

The pattern dictionary 3009 is a dictionary with the translation pattern (a pair of original language pattern and target language pattern) for the syntax analysis and the syntax generation stored. In some cases of this embodiment, a feature restriction is added to each of the original language pattern and the target language pattern.

The pattern inspection part 3007 is a part for inspecting whether the syntax tree of the syntax analysis result or the syntax tree to be generated meets the feature restriction of the pattern achieved by the dictionary reference. On the other hand, the pattern application part 3008 is a part for changing the pattern meeting restriction to the syntax tree with the pattern applied when the tree meets restriction.

In addition, the translation pattern dictionary creation apparatus creating the translation pattern to be stored in the pattern dictionary 3009 is configured by the feature table 3010, the dictionary creation part 3011, the feature table creation part 3012, the dictionary source 3013 and the feature definition table 3014, in the above components. The function of each component will be detailed in a section on process. However, the brief is as follows.

The feature definition table 3014 stores the data (see FIG. 34 detailed later) defining the feature available for the restriction. The feature table 3010 stores feature restriction data with the form capable of adding to the translation pattern as the restriction. The feature table creation part 3012 creates the feature restriction data to store in the feature table 3010 among the feature definition data stored in the feature definition table 3014.

It is to be noted that the feature table 3010, the feature table creation part 3012 and the feature definition table 3014 function in each of the original language and the original language.

The dictionary source 3013 stores original translation patterns. The dictionary creation part 3011 stores the original language patterns stored in the dictionary source 3013, which are appropriately converted to the data of translation pattern easy to be processed by the pattern inspection part 3007 and the pattern application part 3008, based on the feature restriction data stored in the feature table 3010.

(F-2) Process of Sixth Embodiment (F-2-1) Creation Process of Translation Pattern Dictionary with Feature Restriction Prior to the description of creation process of translation pattern dictionary with feature restriction, the translation pattern will be described.

The translation pattern is formed in a pair of patterns in plural languages as shown in FIG. 31. It is to be noted that the translation pattern is formed in a pair of two languages in the machine translation apparatus for one-way or two-way translation. The pattern in each language is according to context-free grammar and is described by language name for specifying the kind of language, left side representing the syntax category (pattern name), right side (pattern component) configuring the list of another syntax category configuring the syntax category.

For example, in the syntax analysis, if the right side (the nonterminal and terminal numerals hereof matches the last syntax analysis result and the last morpheme analysis result, it is passed along to the left side (the nonterminal numeral hereof). On the other hand, for example, in the syntax generation, the left side (the nonterminal numeral hereof) is replaced by the right side (the nonterminal numeral hereof).

FIG. 32 shows an example of a translation pattern to which a feature restriction is not added. It is to be noted that FIG. 32 also shows an example of storing in the dictionary source 3013.

In FIG. 32, en represents English, ja represents Japanese and S following:represents the nonterminal numeral name (syntax category name) on left side, in this example, the nonterminal numeral name representing sentence. Also, NP (noun phrase) and VP (verb phrase) represent the nonterminal numeral name (syntax category name) configuring right side. 1 and 2 attached to these nonterminal numeral name shows that the nonterminal numerals with the same number are corresponding to each other in both patterns. Each syntax category (pattern component) configuring the right side is separated by brackets.

FIG. 33 shows an example of a translation pattern to which a feature restriction is added. It is to be noted the restriction is added not to the Japanese pattern but to the English pattern in the example of FIG. 33. FIG. 33 also shows an example of storing in the dictionary source 3013.

Herein the feature means such typical information in various kinds of information used in translation as morpheme information, syntax information and meaning information.

In FIG. 33, num and pos represent feature name, and the former is the name representing number (numerical quantity) while the latter is the name representing part of speech.=sg and=n which are following the feature name represent feature value, and the former shows that the number is singular while the latter that the part of speech is noun. Also, * in (VP:*) of FIG. 33 shows that the element (syntax category) with this numeral attached on the right side shows the central element on the right side. The central element is a pattern component holding central element information. In the syntax analysis shown in FIG. 33, all the features in the central element are copied to the node in the syntax trees corresponding to those on the left side. For example, the feature name of "2:VP" and the corresponding feature value (num=sg) are copied as the feature name and feature value of S (i.e. the parent node) of the left side member. After the copy, the features (in this example, type=normal) themselves written on the left side are set.

The process of creating the translation pattern with feature restriction data for storing in the pattern dictionary 3009 will be detailed.

It is to be noted that the translation pattern to be stored in the pattern dictionary 3009 is configured by the addition of the feature restriction data (for example, bit array data) for facilitating the process in the pattern inspection described above to the main parts of the translation patterns in FIGS. 32 and 33.

The process of the feature table creation part 3012 will be described in reference to a flow chart of FIG. 34.

The feature table creation part 3012 reads in the storage contents (feature definition) of the feature table 3014 (step S3401).

Figures 34, 35:
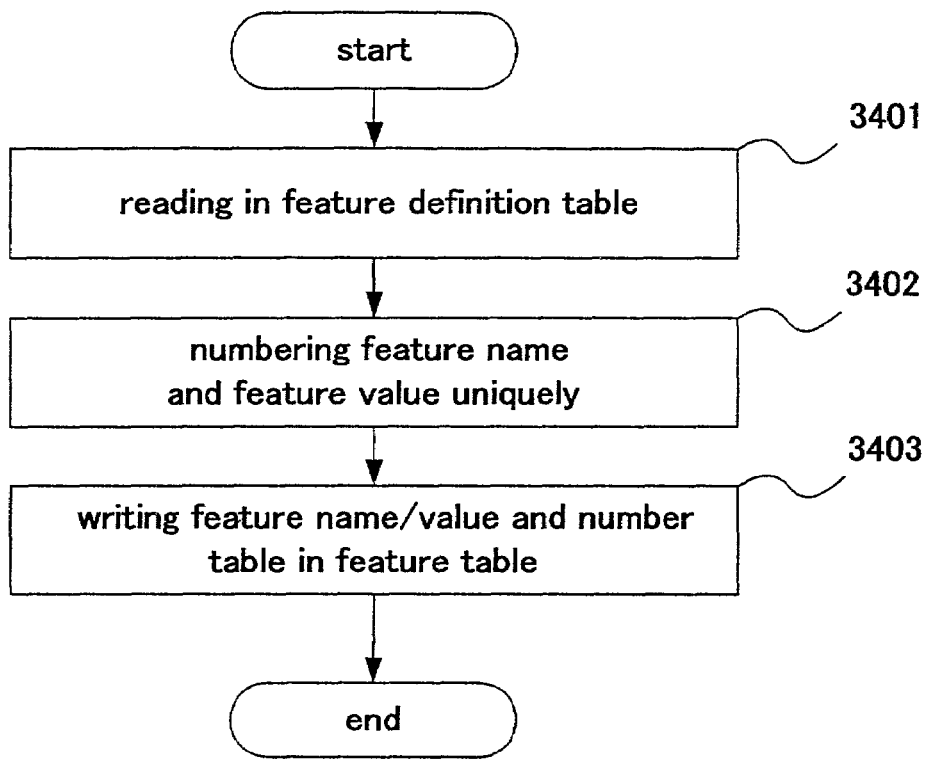
FIG. 34 is a flow chart showing a process of feature table creation part 3012 of sixth embodiment.
FIG. 35 is an explanatory diagram showing an example of feature definition of sixth embodiment.

FIG. 35 shows an example of feature definition data on the feature table 3014 wherein the number of the feature definition object is one, and shows that the part between two pieces of * is a comment on data and that the second line shows the feature with string form, the name of which is decided as a base form (baseForm). In addition, FIG. 35 shows that the fourth line shows the feature with word form, and defines that the feature value of the feature name with part of speech (pos) is n (noun) and adj (adjective). Further, FIG. 35 shows that the sixth line shows the feature with word form, and defines that the feature value of the feature name with number (numerical quantity) is sg (singular) or pl (plural).

As described above, there are two kinds of feature name definition; one is the definition with string (string value), the other with a predetermined value.

It is to be noted that the feature definition can be formed as the existing one which has been already set as data, as shown in FIG. 35.

The feature table creation part 3012 attaches unique numbers (identification number N1–N4 for deciding the pair) to the feature definition judged to have a predetermined value per pair of feature name and feature value (step S3402), after reading the feature definition from the feature definition table 3014. Next, the feature table creation part 3012 writes the pair of feature name and feature value and the table of the number attached to the pair (hereafter, referred to as feature value/number table, or bit array data) in the feature table 3010 (step S3403).

These numbers are used when the pattern inspection part 3007 inspects the pattern restriction, as described later, and hereby the pattern inspection part 3007 can inspect fast.

FIG. 36 shows an example of: the feature value n (noun) of part of speech feature pos with number N1 attached; the feature value adj (adjective) of part of speech feature pos with number N2 attached; the feature value sg of number feature num with number N3 attached; and the feature value pl of number feature num with number N4 attached. However, FIG. 36 is only one example, and the kind of feature and the number of feature value in each kind of feature are not restricted to this example.

The feature restriction on the pattern consists of four kinds as shown in FIG. 37.

The first kind of restriction is the one setting restriction with the feature value described on a certain feature (feature name). An expression "num=sg" on the second term of right side in the pattern for English in FIG. 33, is an example of the first kind of restriction, in other words, an example that the number feature is singular. The second kind of restriction is the one setting restriction with other feature value than the one described on a certain feature (feature name). An expression "num!=sg" is an example of the second kind of restriction, in other words, an example that the number feature is not singular. The third kind of restriction is the one setting restriction with the plural feature values described on a certain feature (feature name). An expression "pos=nladj" is an example of the third kind of restriction, in other words, an example that the part of speech feature is noun or adjective. The fourth kind of restriction is the one setting restriction with other feature values than the plural feature values described on a certain feature (feature name). An expression "pos=nladj" is an example of the fourth kind of restriction, in other words, an example that the part of speech feature is neither noun nor adjective.

In addition, the feature restriction on one syntax element (syntax category) can be added to plural features. An expression "num=sg:pos=n" on the first term of right side in the pattern for English in FIG. 33, is an example of plural feature restrictions, in other words, the restriction that the number feature is singular and that the part of speech feature is noun, is added. As described above, : represents the feature difference.

The dictionary source 3013, in which the translation patterns are described, includes the translation patterns with feature restriction added (see FIG. 33) and the translation patterns with no feature restriction added (see FIG. 32).

Next, the process in which the dictionary creation part 3011 creating translation pattern (translation pattern with feature restriction data) for registering in the pattern dictionary 3009, referring to the storage contents of the feature table 3010 from the storage contents of dictionary source 3013 (the main part of translation pattern).

The dictionary creation part 3011 reads the storage contents of the dictionary source 3013 (translation pattern) (step S3801). Next, the dictionary creation part 3011 writes number data (bit array data) with which the feature restriction replaces (or with the feature restriction added) in the pattern dictionary 3009, referring to feature value/number table on the feature table 3010 (step S3802). After this step, the bit array data is determined according to the kind of restriction in FIG. 36 and to whether the restriction is added to left side or right side, and is written in the pattern dictionary 3009.

Figure 39:
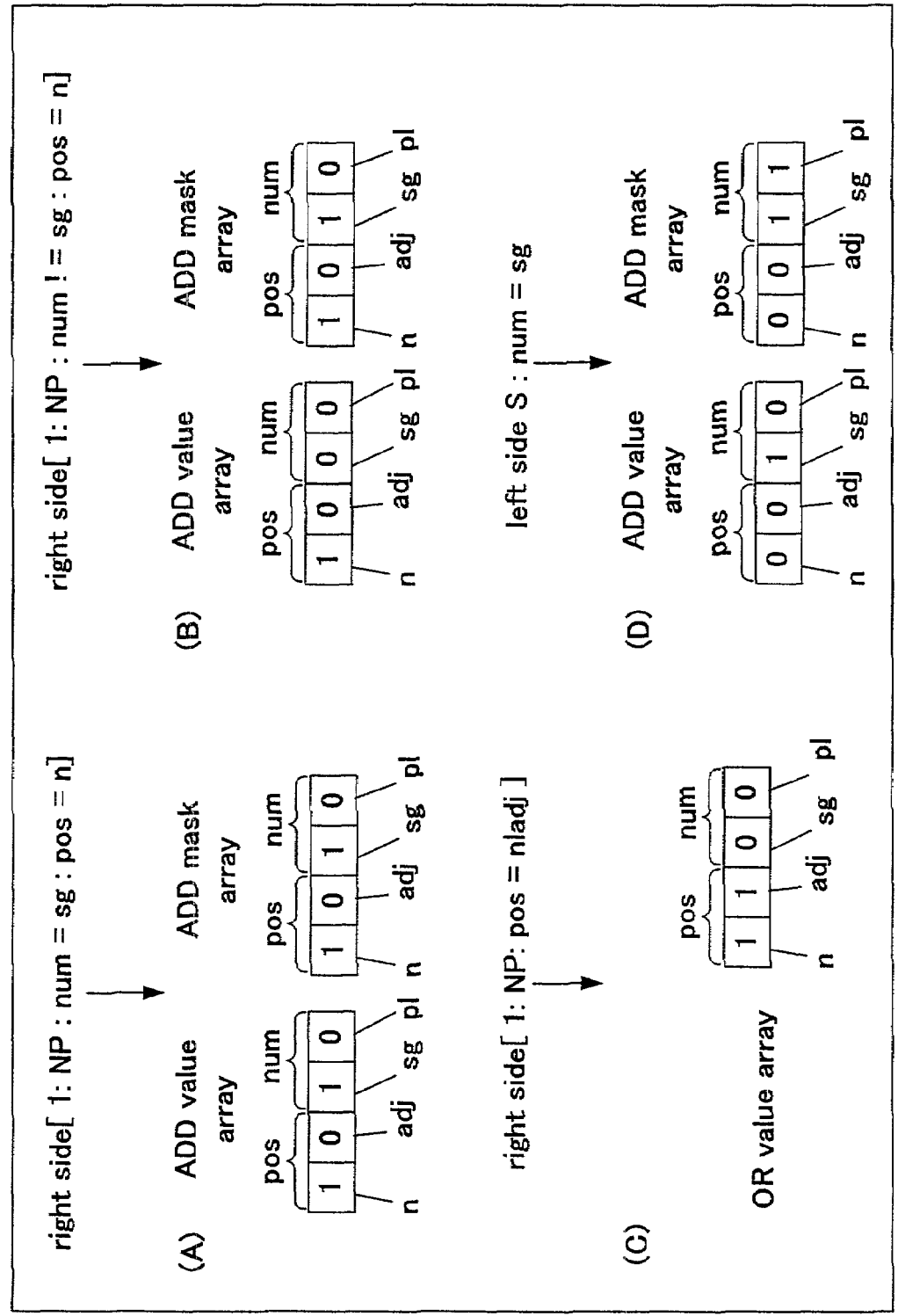
FIG. 39 is an explanatory diagram showing an example of bit array data of feature restriction of sixth embodiment.

FIG. 39 shows an example of bit array data (number data) of feature restriction on the pattern (original language pattern or target language pattern).

FIG. 39(A) shows the bit array data corresponding to the feature restriction "num=sg:pos=n" on the right side. In this case, the bit array data consists of AND (logical product) value array data and AND mask array data. Since the feature value/number table corresponds to the one shown in FIG. 36, the AND value array data comes to 1010 while the AND mask array data showing the bit part significant on the AND value array data come to 1010.

FIG. 39(B) shows the bit array data corresponding to the feature restriction "num!=sg:pos=n" on the right side. Also in this case, the bit array data consists of AND value array data and AND mask array data. Since the feature value/number table corresponds to the one shown in FIG. 36, the AND value array data come to 1000 while the AND mask array data showing the bit part significant on the AND value array data comes to 1010. In other words, since the third bit in the AND mask array data is 1, the third bit 0 in the AND value array data shows that the number feature is not singular.

FIG. 39(C) shows the bit array data corresponding to the feature restriction "pos=nladj" on the right side. In this case, the bit array data consists of OR (logical sum) value array data. The OR value array data come to 1100. The OR mask corresponding to the OR value array data are not generated, since the OR value array data themselves have the information on the valid part.

FIG. 39(D) shows the bit array data corresponding to the feature restriction "num=sg" on the left side. In this case, the bit array data consists of ADD value array data and ADD mask array data. Since the feature restriction on the right side is transmitted to the left side in some cases (see seventh embodiment), the ADD value array data are adopted to come to 0010 while the ADD mask array data come to 0011 to receive another feature transmission. The ADD form in FIG. 39(D) is adopted by the process in the pattern application part 3008 (see FIG. 45 described later).

The feature restriction can be expressed by either one of the three forms shown in FIG. 39, that is, AND array form, OR array form and ADD array form even if the expressions shown in FIG. 37 are combined.

In addition, since the bit array data, with which the feature restriction replaced by using the dictionary creation part 3011, tend to be arranged with 1 or 0, the data can be compressed to enhance the memory space efficiency and the processing efficiency, for example, in the case of a large number of kind of feature related to restriction and a large number of kind of feature value.

(F-2-2) Translation Process

The translation process with the translation pattern in the machine translation apparatus of sixth embodiment will be described.

A series of processes from the process in which the input part 3001 captures the original language text and forwards to the morpheme analysis part 3003 to the process in which the morpheme analysis part 3003 analyzes the morpheme are same as conventional ones.

Figure 40:
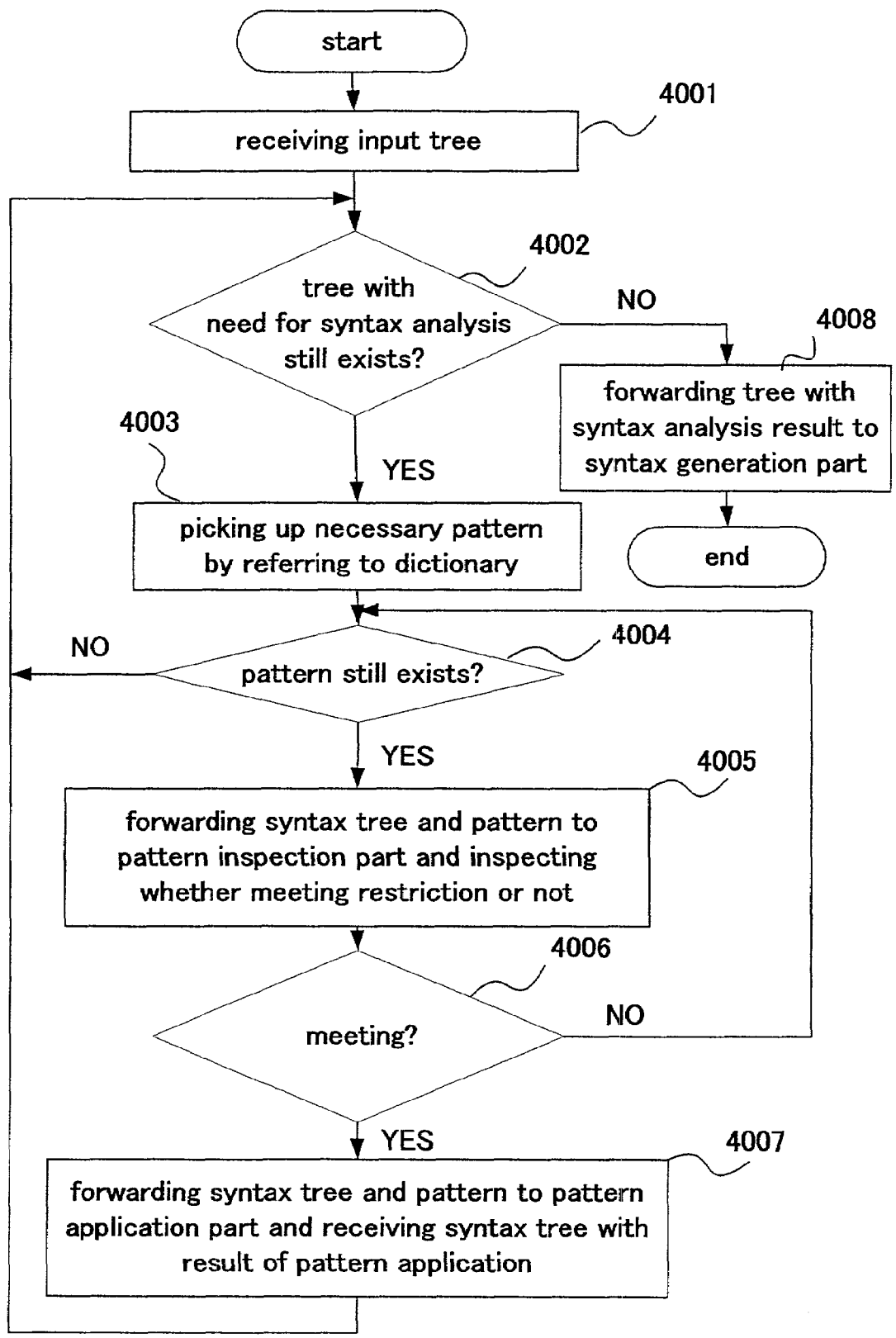
FIG. 40 is a flow chart showing a process of syntax analysis part 3005 of sixth embodiment.

Hereafter, the process of the syntax analysis part 3005 will be described in reference to a flow chart of FIG. 40. It is to be noted that the syntax analysis part 3005 executes not only the process described in the conventional machine translation method according to patterns but also the process related to the feature restriction added to the patterns.

The syntax analysis part 3005 receives the syntax tree the morpheme of which has already been analyzed from the morpheme analysis part 3003 (step S4001). Then, confirming that the tree with need for syntax analysis still exists (step S4002), the necessary pattern (pattern for original language) are picked up by referring to the pattern dictionary 3009 (step S4003). In some cases, plural patterns are picked up.

The syntax analysis part 3005 judges whether the unprocessed pattern, in which a step S4005 described later is not executed and in which the pattern to be applied is not decided, exists or not (step S4004). In the case of not existing, the process returns to the step S4002. In the case of existing, the syntax analysis part 3005 forwards the syntax tree and the unprocessed pattern to the pattern inspection part 3007, which inspects whether meeting restriction or not (step S4005), and the syntax analysis part 3005 judges the inspection result after receiving it (step S4006).

In addition, the pattern is not inspected since there is no feature restriction conventionally. However, the pattern inspection of the step S4005 is executed since the restriction is added to the pattern in this embodiment.

In the inspection result of the target pattern not meeting restriction, the process returns to the step S4004. On the other hand, in the inspection result of meeting restriction, the syntax tree and the pattern are forwarded to the pattern application part 3008, the syntax tree with the result of pattern application thereto is received (step S4007), and the process returns to the step S4002.

After the process loop with steps S4002–S4007 is repeatedly executed, and after the syntax analysis have finished, the tree of syntax analysis result is created and forwarded to the syntax generation part 3006 (step S4008).

Figure 41:
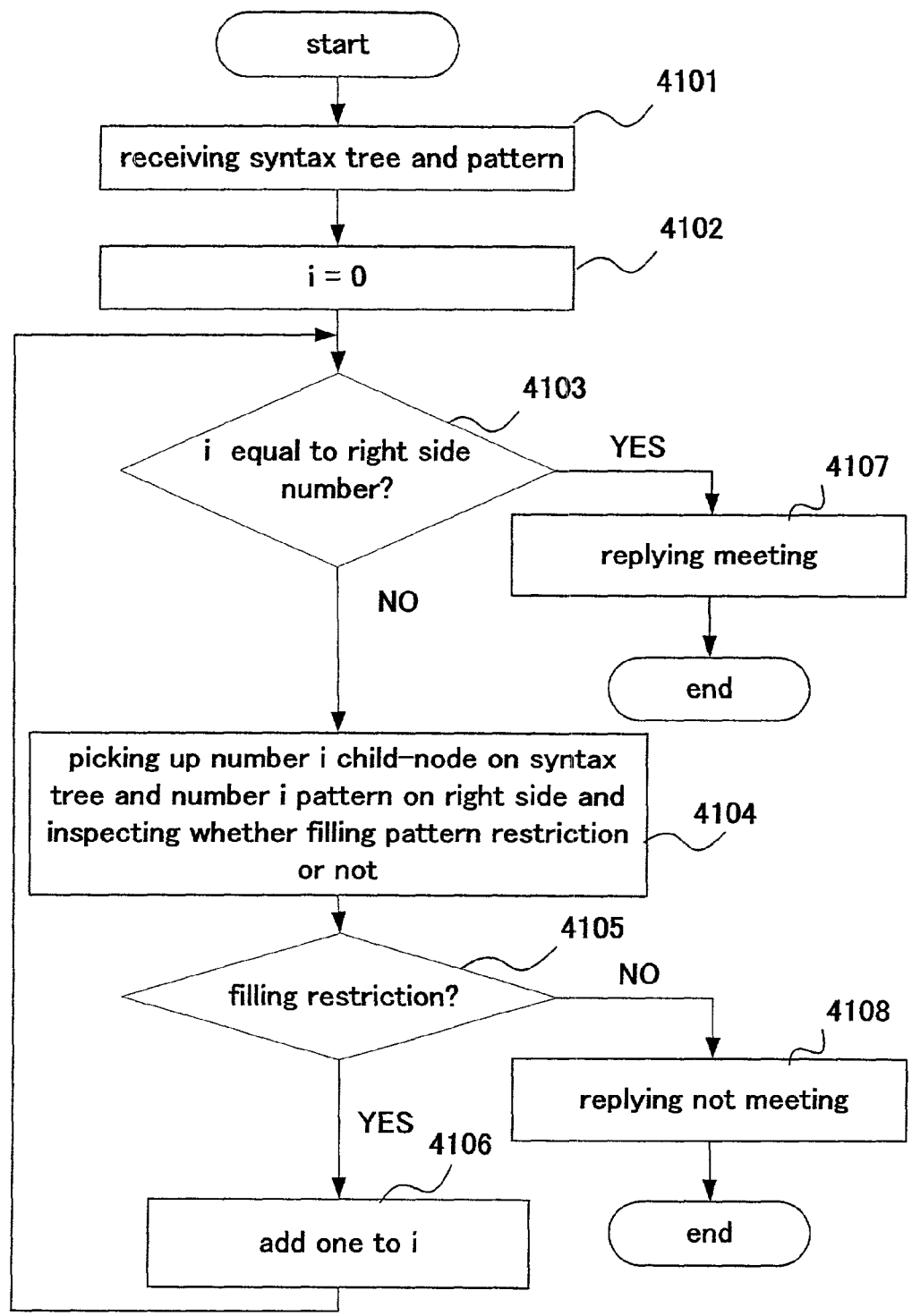
FIG. 41 is a flow chart showing a process of pattern inspection part 3007 of sixth embodiment.

FIG. 41 is a flow chart showing a process of pattern inspection part 3007 in response to the request for inspection from the syntax analysis part 3005. The process by the pattern inspection part 3007 shown in FIG. 41 corresponds to the request for inspection in the step S4005.

The pattern inspection part 3007 receives a syntax tree and pattern (step S4101) and sets the initial value of number parameter i on right side at 0 (step S4102).

Then, confirming that the parameter i does not reach the number of pattern on right side (step S4103), picking up number i+1 child-node on syntax tree and number i+1 pattern on right side, inspecting whether filling pattern restriction or not and the inspection result is confirmed (steps S4104 and S4105). It is to be noted that when the number i+1 pattern on right side does not have restriction the child-node is regarded as filling pattern restriction.

When the number i+1 child-node on syntax tree does not fill the restriction on number i+1 pattern on right side, the pattern inspection part 3007 replies to the syntax analysis part 3005 that the child-node does not meet the pattern (step S4108).

On the other hand, when the number i+1 child-node on syntax tree fills the restriction on number i+1 pattern on right side, the parameter i is incremented by one and the process returns to step S4103 (step S4106). In step S4103, to achieve the inspection result that the parameter i reaches the number of pattern on right side, it is necessary for all the child-nodes on the syntax tree to fill the restriction of each element on right side to which each pattern corresponds. In this case, the pattern inspection part 3007 replies to the syntax analysis part 3005 that the child-node meets the pattern (step S4107).

The inspection of feature restriction usually needs large amount of time, process and cost. In this embodiment, however, since the feature and its restriction are kept in bit array data the inspection can be achieved by comparing the bit array data in sequence to reduce the time, process and cost.

Figure 42:
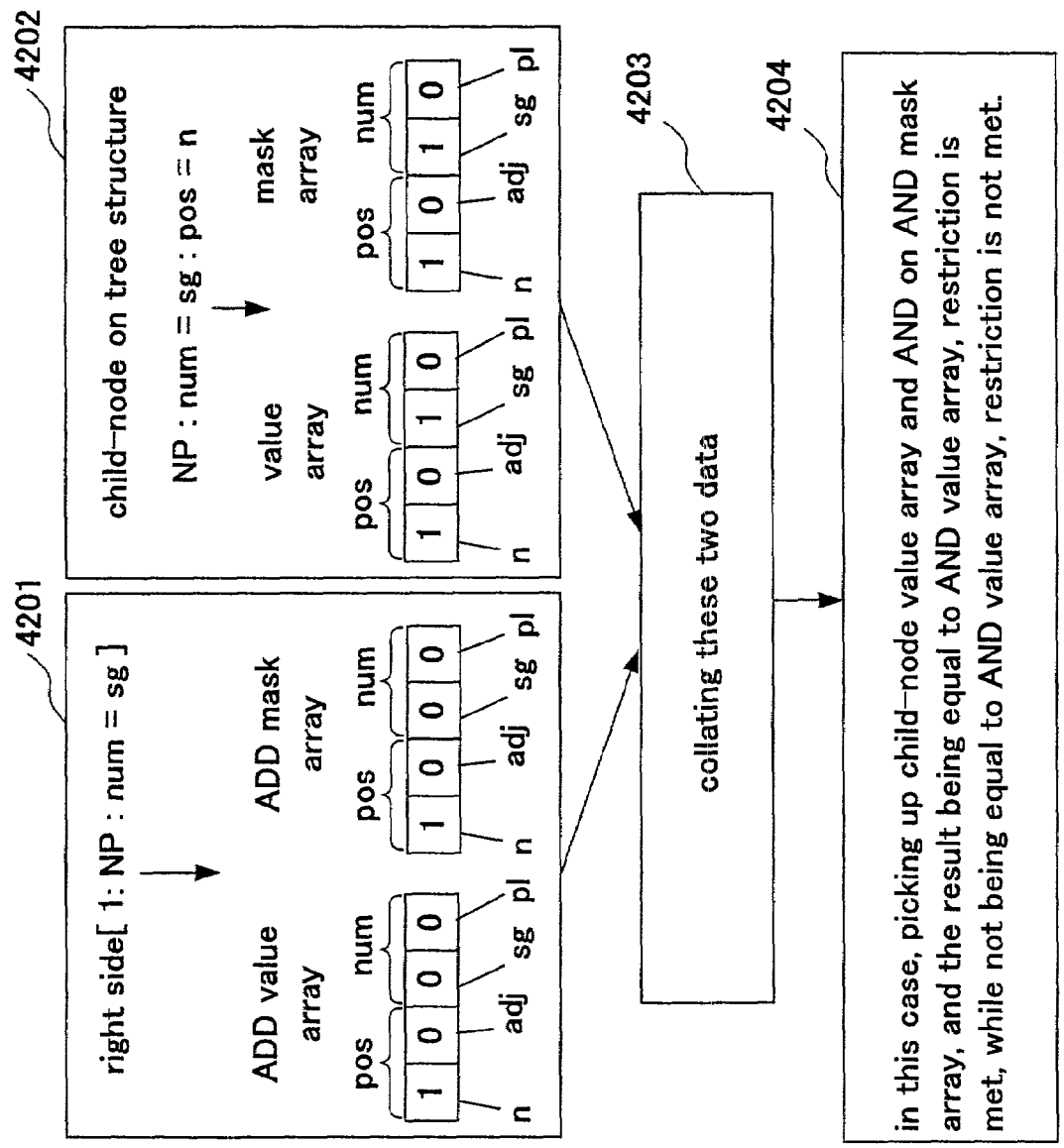
FIG. 42 is an explanatory diagram (1) showing means for inspecting whether meeting restriction by using bit array data of sixth embodiment.
Figure 43:
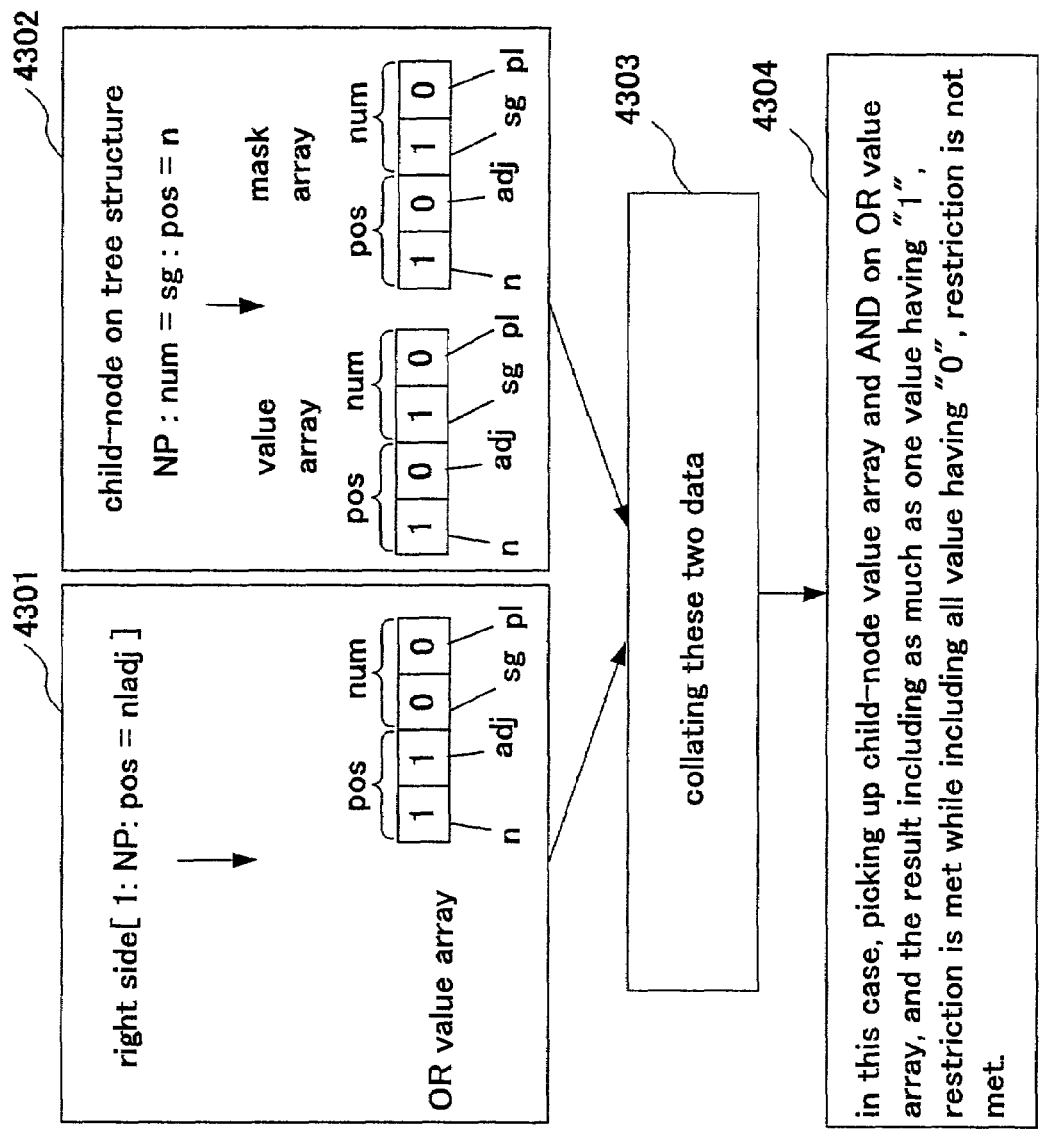
FIG. 43 is an explanatory diagram (2) showing means for inspecting whether meeting restriction by using bit array data of sixth embodiment.

Hereafter, the means for inspecting whether meeting restriction by using bit array data in reference to FIGS. 42 and 43.

FIG. 42 shows the case that the feature restriction forms in AND operation as shown in FIG. 39(A) and (B). Numeral 4201 represents the bit array data (AND value array data and AND mask array data) corresponding to a certain element on right side. Numeral 4202 represents the bit array data of the child-node on syntax tree corresponding to the element on right side. The bit array data of child-node are formed by the feature information on child-node in inspecting whether meeting restriction. It is to be noted that the bit array data of the child-node can be formed by reference of the morpheme analysis part 3003 to the storage contents of the feature table 3010.

The bit array data corresponding to the element on right side and the bit array data of child-node are collated (numeral 4203).

In the AND operation shown in FIG. 42, to be concrete, child-node value array data and AND on AND mask array data bit by bit, and the only part to be collated is made to stand out from the child-node value array data. If the result is completely equal to the AND value array data, it is judged to meet restriction. If the result is different from the AND value array data even by a bit, it is judged not to meet restriction (numeral 4204).

In FIG. 42, the bit array data of child-node on syntax tree structure (numeral 4202) meet the restriction represented by the bit array data (numeral 4201) corresponding to element on right side of the pattern.

As shown in FIG. 42, the problem is whether the child-node value array data on syntax tree meet the restriction represented by the bit array data corresponding to element on right side of the pattern, even if the child-node value array data on tree structure relate to plural features.

FIG. 43 shows the case that the feature restriction forms in OR operation as shown in FIG. 39(C). Numeral 4301 represents the bit array data (OR value array data) corresponding to a certain element on right side of the pattern. Numeral 4302 represents the bit array data of the child-node on syntax tree corresponding to the element on right side.

Also in OR array, the bit array data corresponding to the element on right side and the bit array data of child-node are collated (numeral 4303).

In the OR operation shown in FIG. 43, to be concrete, child-node value array data and AND on OR value array data bit by bit. If even one bit having 1 is included in the result, it is judged to meet restriction. If all the bits have 0, it is not judged to meet restriction (numeral 4304).

In FIG. 43, the bit array data of child-node on tree structure (numeral 4302) meet the restriction represented by the bit array data (numeral 4301) corresponding to element on right side of the pattern.

As shown in FIG. 43, in OR operation, it is necessary for a large number of feature value to which restriction should be added to be included and for the child-node value array data on syntax tree to be added restriction even if the data relate to only one of the feature values.

Figure 44:
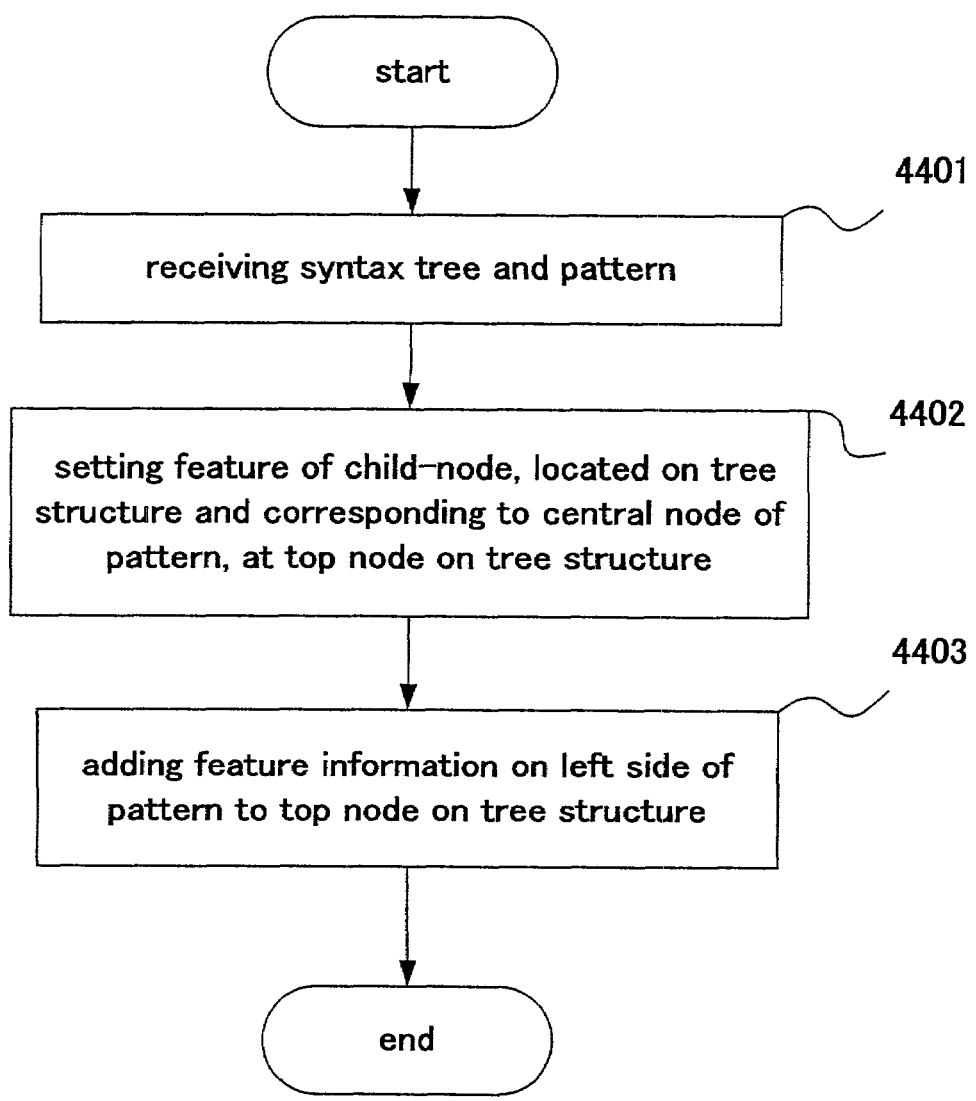
FIG. 44 is a flow chart showing a process of pattern application part 3008 of sixth embodiment.

FIG. 44 is a flow chart showing a process of pattern application part 3008 in syntax analysis. The process by the pattern application part 3008 corresponds to the process in the step S4007 (see FIG. 40). It is to be noted that FIG. 44 is drawn from the point of view of feature transmission.

The pattern application part 3008 receives the syntax tree and the pattern (step S4401), and sets feature of child-node on the syntax tree corresponding to central node of pattern at the top node on tree structure (step S4402). These steps are called feature transmission. Next, the pattern application part 3008 adds the feature information on left side of pattern to the top node on syntax tree (step S4403).

In addition, the process of pattern application 3008 is executed on the pattern in which the tree structure meets the restriction after the inspection in the pattern inspection part 3007. The feature information with the restriction met is transmitted to the upper node through the process of pattern application part 300E,.

Figure 45:
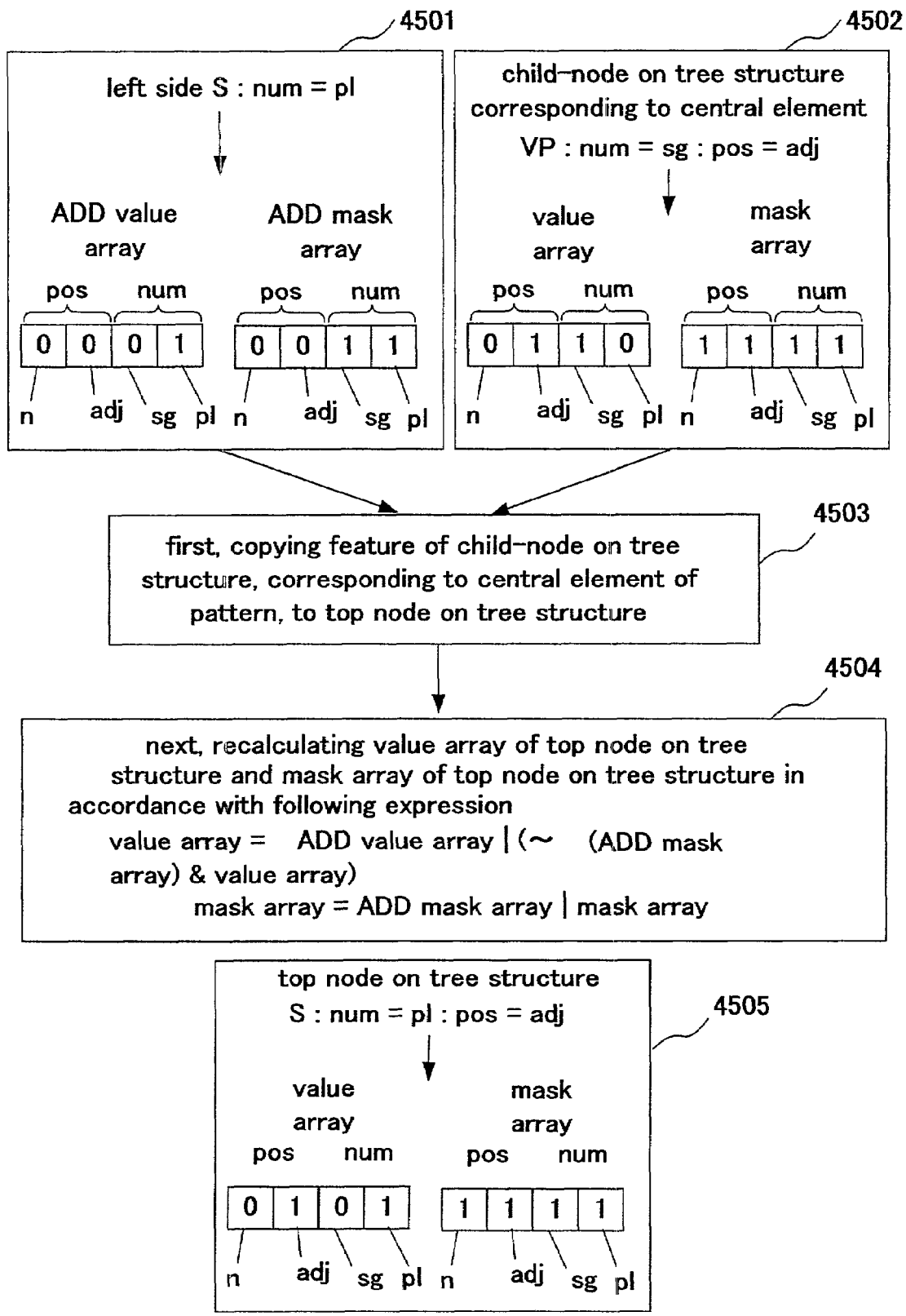
FIG. 45 is a flow chart showing means for concrete process of pattern application part 3008 of sixth embodiment.

FIG. 45 shows means for executing the process of pattern application part 3008 by the operation on bit array data.

In FIG. 45, numeral 4501 represents the bit array data (ADD value array data and ADD mask array data) corresponding to the element on left side of the pattern meeting restriction. Numeral 4502 represents the bit array data of the child-node on syntax tree corresponding to the central element on right side of the pattern.

First, the pattern application part 3008 copies the bit array data (feature) of the child-node represented by numeral 4502 to the top node on syntax tree (numeral 4503). Next, the pattern application part 3008 reflects the pattern restriction on the feature of top node (value array data and mask array data). These processes can be shown by following expressions (1) and (2) (numeral 4504).

$$\text{Value array=ADD value array}|(\sim(\text{ADD mask array}) \& \text{value array}) \quad (1)$$

$$\text{Mask array=ADD mask array}|\text{mask array} \quad (2)$$

It is to be noted that | represents OR (logical sum) on each bit, that ~represents NOT (logical negation) on each bit and that & represents AND (logical product) on each bit. In addition, the data terms in the array data are omitted.

The expression (1) shows that the feature on top node is made by combining the feature value (ADD value array) of the feature having pattern restriction with the feature value (~(ADD mask array) & value array) of other features taken over from the child-node. The mask array for determining the location of bit which is effective in value array is made by combination of two kinds of mask array in accordance with the increase of kind of feature as shown in expression (2).

Numeral 4505 shows the bit array data (value array data and mask array data; feature) on top node after processing when numeral 4501 represents the bit array data corresponding to element on left side of the pattern meeting restriction and when numeral 4502 represents the bit array data corresponding to the central element on right side of the pattern.

The syntax analysis result achieved by the appropriate request for process from the syntax analysis part 3005 to the pattern inspection part 3007 and the pattern application part 3008 is forwarded to the syntax generation part 3006 to generate the syntax tree information in the target language.

Figure 46:
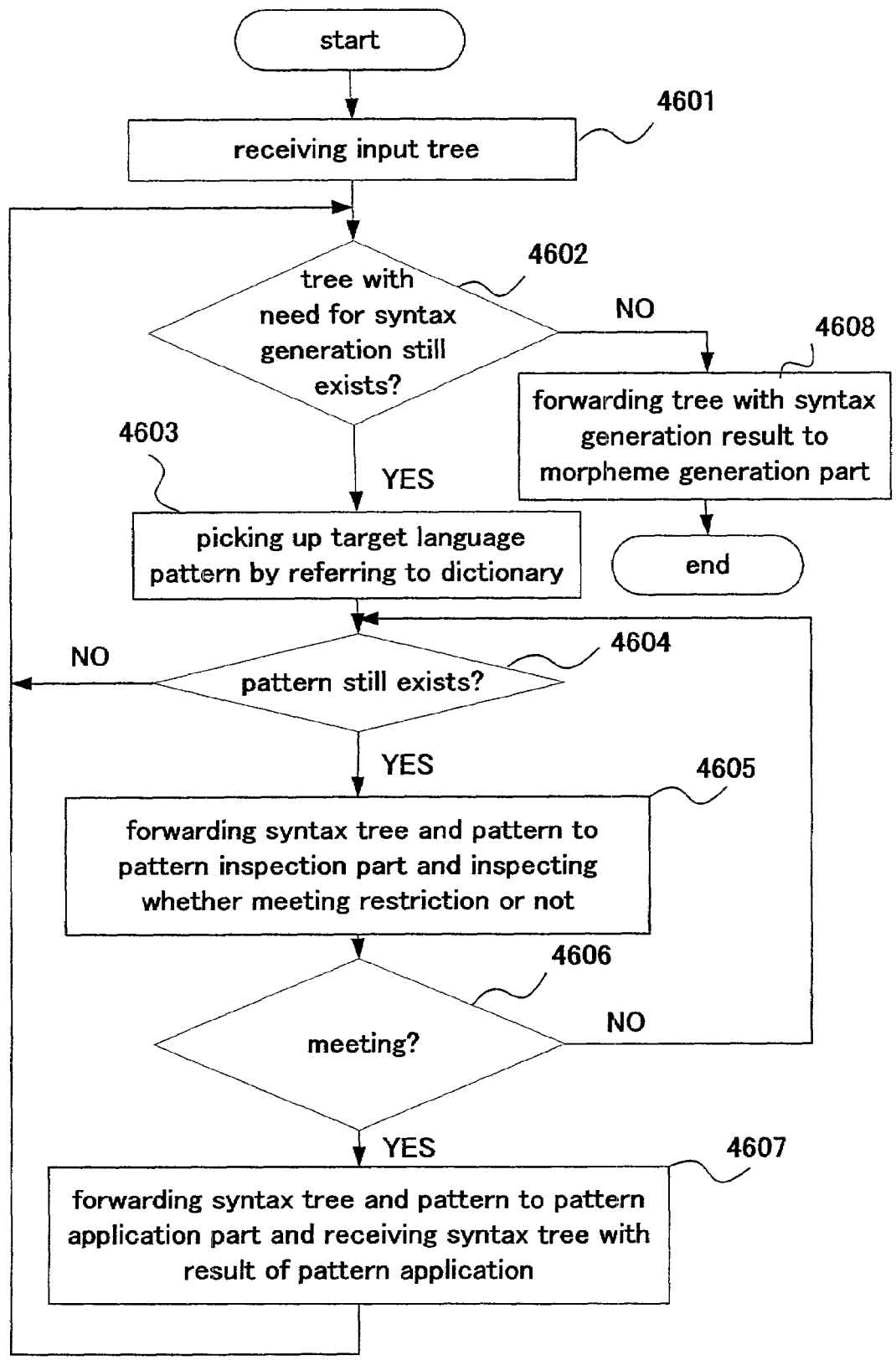
FIG. 46 is a flow chart showing a process of syntax generation part 3006 of sixth embodiment.

Hereafter, the process of syntax generation part 3006 will be described in reference to a flow chart of FIG. 46. In addition, the syntax generation part 3006 executes not only the process described in conventional machine translation method based on patterns but also the process related to the features added to patterns.

Further, an example that the feature restriction is not added in the target language (Japanese) is shown in FIGS. 32 and 33. However, the feature restriction can be justifiably added, and plural target language patterns can correspond to a single original language pattern.

The syntax generation part 3006 receives the syntax tree the syntax of which has already been analyzed from the syntax analysis part 3005 (step S4601). Then, confirming that the tree (tree part) with need for syntax generation still exists (step S4602), the necessary pattern (pattern for target language) are picked up by referring to the pattern dictionary 3009 (step S4603). In some cases, plural patterns are picked up.

The syntax generation part 3006 judges whether the unprocessed pattern, in which a step S4605 described later is not executed and in which the pattern to be applied is not decided, exists or not (step S4604). In the case of not existing, the process returns to the step S4602. In the case of existing, the syntax analysis part 3005 forwards the syntax tree and the unprocessed pattern to the pattern inspection part 3007, which inspects whether meeting restriction or not (step S4605), and the syntax generation part 3006 judges the inspection result after receiving it (step S4606).

In addition, the pattern is not inspected since there is no feature restriction conventionally. However, the pattern inspection of the step S4605 is executed since the restriction is added to the pattern in this embodiment. The syntax generation is executed from the top in the pattern inspection of syntax generation, showing the flow chart is omitted in the pattern inspection part 3007, which inspects whether the top node on syntax tree and the pattern on right side meet restriction in feature.

In the inspection result of the target pattern not meeting restriction, the process returns to the step S4604. On the other hand, in the inspection result of meeting restriction, the syntax tree and the pattern are forwarded to the pattern application part 3008, the syntax tree with the result of pattern application thereto is received (step S4607), and the process returns to the step S4602.

In this case, the pattern application part 3008 applies each child-node on syntax tree and each element on right side of the pattern, which is not shown as a flow chart (see FIGS. 42 and 43). The feature information on top node on syntax tree is set at the child-node on syntax tree corresponding to the central element on right side of the pattern. This process is a feature transmission from top node to central node.

After the process loop with steps S4602-S4607 is repeatedly executed, and after the syntax generation have finished, the tree of syntax generation result is created and forwarded to the morpheme generation part 3004 (step S4608).

The morpheme generation part 3004 applies the morpheme in the target language to the syntax tree generated by the syntax generation part 3006, reflecting the feature and the like, to achieve the translation result, which is output by the output part 3002.

(F-3) Effect of Sixth Embodiment

According to the machine translation apparatus and method of sixth embodiment, following effects can be achieved.

(a) In a machine translation based on conventional pattern, since there are not the feature restriction and the feature transmission, it is necessary to prepare the nonterminal numeral and the terminal numeral according to differences of restriction and to write them on patterns, in order to include various kinds of restrictions (meaning restriction, numeral or sex restriction and syntax information restriction). Therefore, the number of patterns become numerous.

In this embodiment, since the restriction can be described in the patterns in a succinct form as additional information on the nonterminal numeral and the terminal numeral, the number of patterns can be reduced. Also, since the restriction is introduced in the patterns as additional information on the nonterminal numeral and the terminal numeral, it is not necessary to increase the number of kind of the nonterminal numeral and the terminal numeral and a general notation of feature can be applied to the additional information. As a result, the patterns can be easy to understand and the cost for maintenance of patterns (processing time, storage capacity, or the like) can be dramatically reduced.

(b) Conventionally, since a process for restriction is not included, another translation means must be combined. By adopting the process for restriction, however, all the translation, including detailed translation, can be achieved by translation means based on patterns. As a result, a translation engine essentially capable of learning can be created.

(c) Since the pattern restriction information is registered in the dictionary in a form of bit array data, such process as a pattern inspection whether meeting restriction or not, as a modification of syntax tree according to applicable pattern and the like can be executed fast.

(F-4) Changed Form of Sixth Embodiment

As described above, although FIG. 31 is shown as means for pattern expression and FIG. 34 is shown as a feature table, another form of expression can be adopted if the same amount of information is included.

Also as described above, bit array data are used to express feature, considering facility of collation and combination. However, another form of expression can be adopted if the results of collation and combination can be same.

Further as described above, the machine translation apparatus includes components 3010–3014 forming the contents for registering in the pattern dictionary 3009. However, these components can be included in separate machine translation apparatuses and the pattern dictionary 3009 with the contents registered can be ported to the machine translation apparatuses.

Still further, as described above, the feature table 3010 and the pattern dictionary 3009 are included independently of each other. However, the feature table can be stored in the pattern dictionary 3009.

(G) Seventh Embodiment

Next, seventh embodiment, in which apparatus and method for natural language processing, and apparatus and method for creating a natural language pattern dictionary, of the present invention are applied to a machine translation apparatus and a machine translation method, will be described in reference to the accompanying drawings.

(G-1) Structure of Seventh Embodiment

Figure 47:
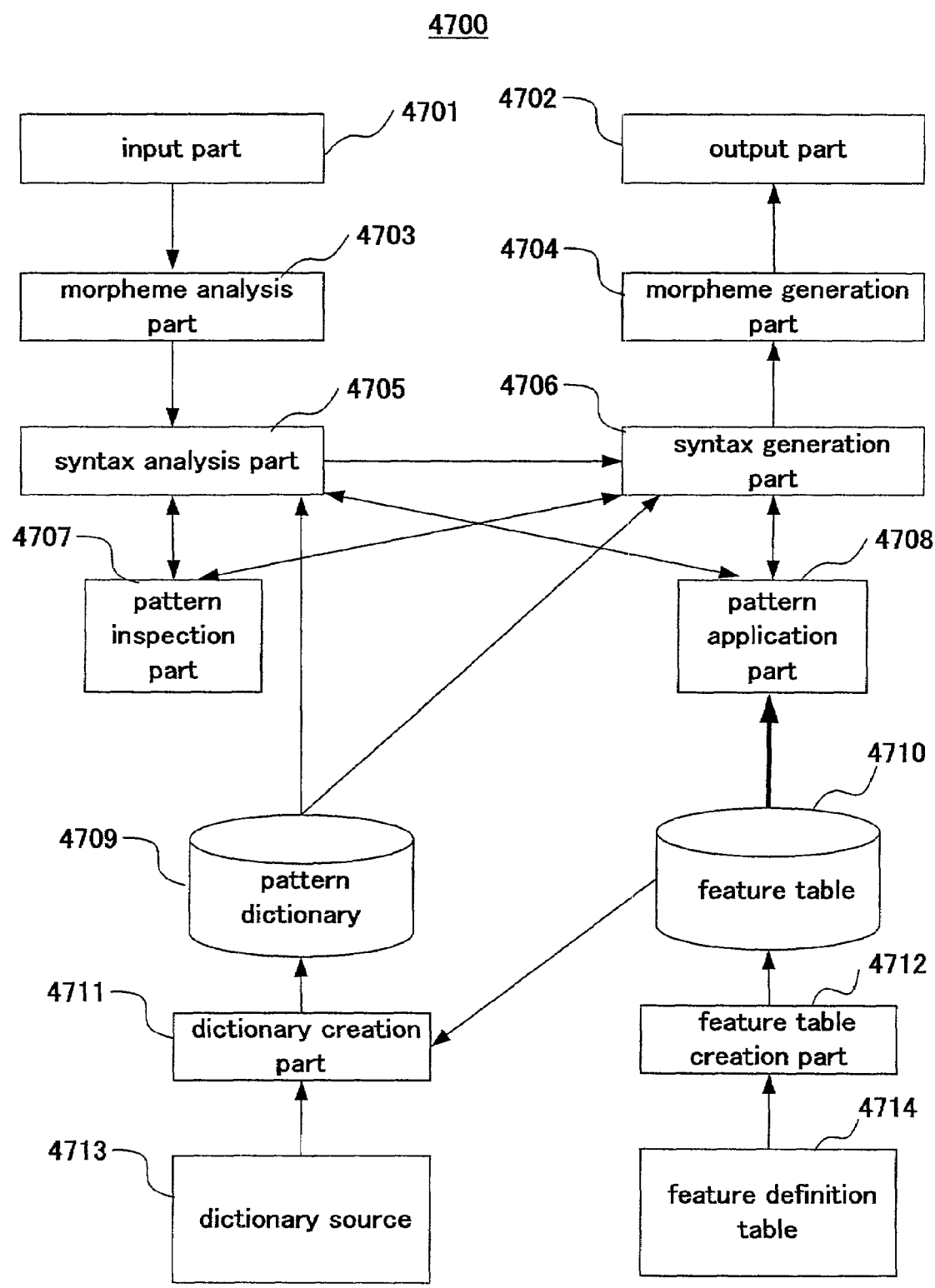
FIG. 47 is a block diagram showing a functional configuration of a machine translation apparatus of seventh embodiment.

FIG. 47 is a block diagram showing a functional configuration of a machine translation apparatus of seventh embodiment.

In FIG. 47, a machine translation apparatus 4700 in seventh embodiment is configured by an input part 4701, an output part 4702, a morpheme analysis part 4703, a morpheme generation part 4704, a syntax analysis part 4705, a syntax generation part 4706, a pattern inspection part 4707, a pattern application part 4708, a pattern dictionary 4709, a feature table 4710, a dictionary creation part 4711, a feature table creation part 4712, a dictionary source 4713 and a feature definition table 4714.

In addition, in the above components, the input part 4701, the output part 4702, the morpheme analysis part 4703, the morpheme generation part 4704, the syntax analysis part 4705, the syntax generation part 4706, the pattern inspection part 4707, the pattern dictionary 4709, the dictionary creation part 4711 and the dictionary source 4713 are the same components corresponding to those of sixth embodiment.

In seventh embodiment, in the above components, the pattern application part 4708, the feature table 4710, the feature table creation part 4712 and the feature definition table 4714 are different from those of sixth embodiment.

The feature definition in the feature definition table 4714 is different from that of six embodiment, by which the feature table 4710 created by the feature table creation part 4712 is different from that of six embodiment, detailed in a section on process. One more different point in this embodiment is that the pattern application part 4708 refers to the feature table 4710.

(G-2) Process of Seventh Embodiment

The process of forming the contents for storing in the feature table 4710 will be described.

Figures 48, 49:
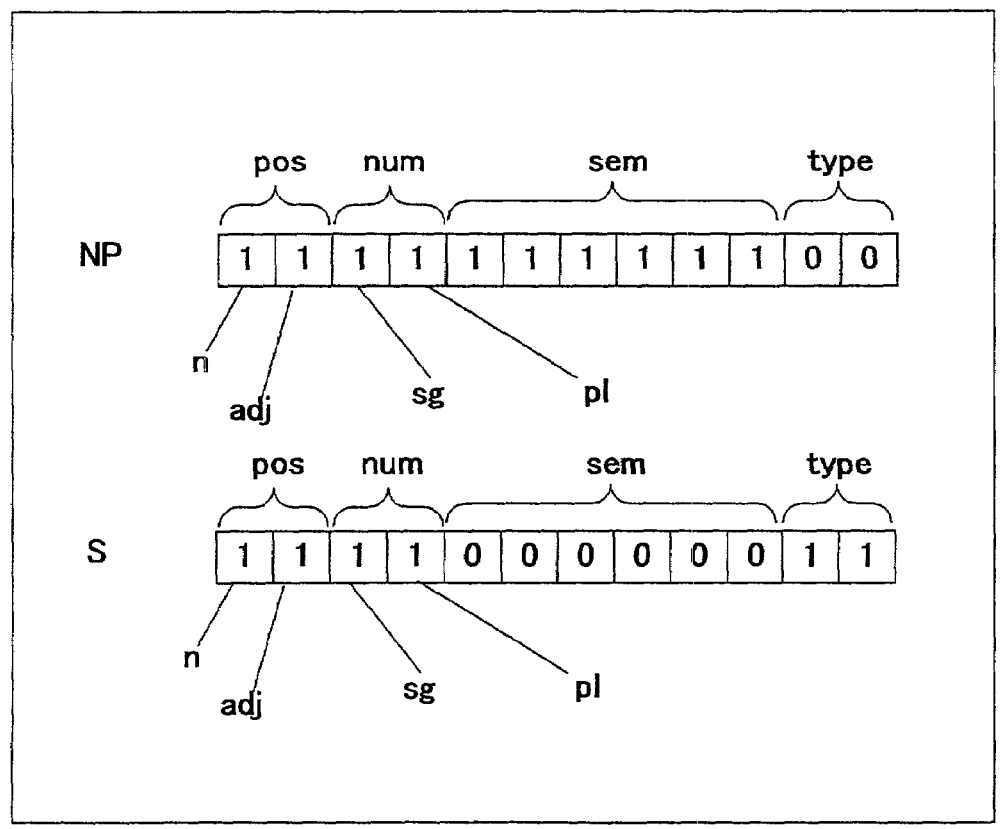
FIG. 48 is an explanatory diagram showing an example of feature definition of seventh embodiment.
FIG. 49 is an explanatory diagram showing an example of feature mask of seventh embodiment.

In the feature definition table, the feature definition is created by adding the definition part shown in FIG. 48 to the definition part shown in FIG. 35. It is to be noted that the comment is omitted in FIG. 48.

The definition of nonterminal numeral and the terminal numeral (syntax category; syntax tree element; category), and the definition of possible feature names are shown in FIG. 48.

A line * is the definition line of the possible feature names of all nonterminal numeral and terminal numeral, and the feature name determines base form, surface form and part of speech.

A line " " is the possible feature name of terminal numeral and represents conjugation.

A line NP defines the possible feature names of nonterminal numeral name NP (noun phrase), and the feature names are number feature and meaning feature. A line VP defines the possible feature names of nonterminal numeral name VP (verb phrase), and the feature names are number feature and meaning feature. A line S defines the possible feature names of nonterminal numeral name S (sentence), and the feature names are number feature and sentence pattern feature.

In this embodiment as described above, the feature name which can be restricted is defined according to kinds of nonterminal numeral and terminal numeral.

The line NP has the definition for transmitting only the possible feature of nonterminal numeral and terminal numeral where the feature reaches, in the feature transmission. Only the specified feature is transmitted to prevent the transmission of unnecessary feature, to put only necessary information on the syntax tree, to help understand and to cut waste. When there are a number of applicable syntax analysis tree to be analyzed in the process of syntax analysis, the syntax analysis trees having the top node with the same feature can be merged to reduce the cost of syntax analysis significantly. However, the transmission of unnecessary feature often prevents from merging. This problem can be solved by the restriction of feature transmission, which enhances the processing efficiency.

The feature table creation part 4712 creates the feature mask (bit array data) of each nonterminal numeral and terminal numeral on the definition part of FIG. 48, as shown in FIG. 49 and stores the feature mask in the feature table 4710. In addition, the feature table creation part 4712 creates the table shown in FIG. 36 of six embodiment (in this seventh embodiment, the box in which bit values can be inserted similar to that shown in FIG. 49) and stores the table in the feature table 4710.

FIG. 49 shows the feature mask transmitted to each nonterminal numeral and terminal numeral. In the transmission, the feature data are masked by the feature mask to transmit only the necessary features.

In FIG. 49, the feature mask (bit array data) of NP is set to transmit part of speech feature (see the first line of FIG. 48), number feature (see the third line of FIG. 48) and meaning feature, which take the value in NP according to the feature definition in FIG. 48. It is to be noted that the number value of meaning element is six. The feature mask (bit array data) of S is set to transmit part of speech feature, number feature and meaning feature, which take the value in S according to the feature definition in FIG. 48. It is to be noted that the number value of meaning element is two. The feature mask of VP, which is not shown as a figure, has the same structure as that of NP.

Figure 50:
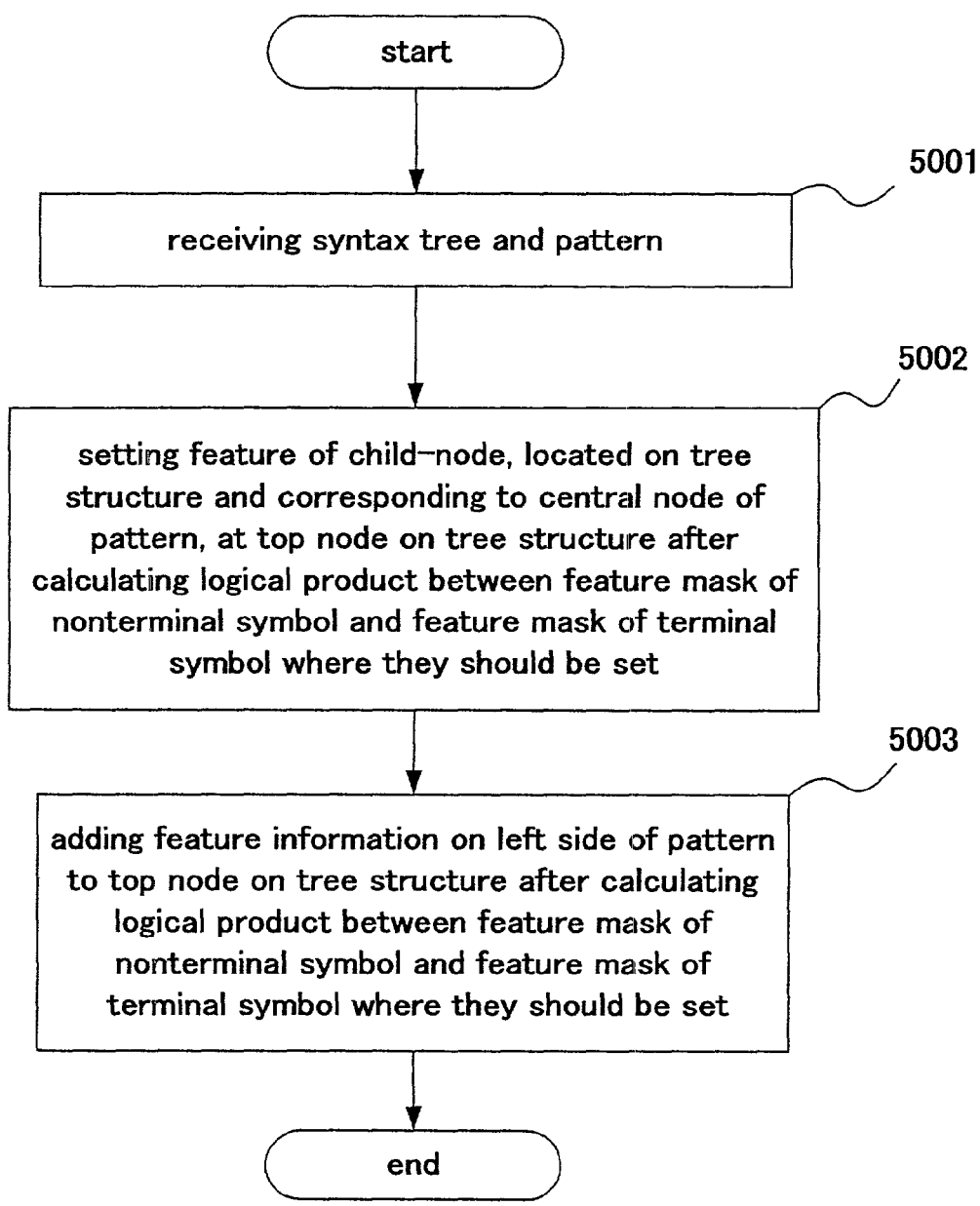
FIG. 50 is a flow chart showing a process of pattern application part 4708 of seventh embodiment.

FIG. 50 is a flow chart showing a process of pattern application part 4708 in syntax analysis of seventh embodiment. The process by the pattern application part 4708 corresponds to the process in the step S4007 (see FIG. 40).

The pattern application part 4708 receives the syntax tree and the pattern (step S5001), and sets feature of child-node on the syntax tree corresponding to central node of pattern at the top node on tree structure (step S5002). The feature masks of nonterminal numeral and terminal numeral (FIG. 49) where they are set from the feature table 4710, and the feature of child-node is transmitted after masked by the feature masks. Similarly, the feature information on pattern on left side is added to the top node on the syntax tree, after masked by the feature masks (step S5003).

It is to be noted that the mask processes in steps S5002 and S5003 can be executed at the same time and that the feature mask can be built in the pattern application part 4708.

Although the flow chart is not shown, the pattern application part 3008 applies each child node on the syntax tree and each element on right side of the pattern. Also, the feature information on top node on the syntax tree is set at the child-node on the syntax tree corresponding to the central element on right side of the pattern. Also in this case, the feature mask shown in FIG. 49 determines the application range per the nonterminal numeral and terminal numeral.

(G-3) Effect of Seventh Embodiment

Also according to the machine translation apparatus and method of seventh embodiment, the effects (a)–(c) identical to those of sixth embodiment. Further according to seventh embodiment, following effects can be achieved.

(d) Only the specified feature is transmitted to prevent the transmission of unnecessary feature, to put only necessary information on the syntax tree, to help understand and to cut waste.

(e) When there are a number of applicable syntax analysis trees to be analyzed in the process of syntax analysis, the syntax analysis trees having the top node with the same feature can be merged to reduce the cost of syntax analysis significantly. However, the transmission of unnecessary feature often prevents from merging. This problem can be solved by the restriction of feature transmission, which enhances the processing efficiency.

(G-4) Changed Form of Seventh Embodiment

The dictionary creation part 4711 may confirm whether an inappropriate feature is attached or not to the nonterminal numeral and the terminal numeral by using the feature mask information in the feature table 4710, and may display the inappropriate feature as an error to urge the dictionary creator to correct the error when the inappropriate feature is attached.

Also, the dictionary creation part 4711 may detect that an undefined nonterminal numeral is used by using the feature mask information in the feature table 4710 and may urge the dictionary creator to correct the error to prevent the spelling error of the nonterminal numeral.

As described above, although FIG. 48 is shown as a feature table, another form of expression can be adopted if the same amount of information is included. Also as described above, the expression of feature mask is not restricted to the bit array data shown in FIG. 49. However, another form of expression can be adopted if the results of process can be same.

Still further, means for transmitting and controlling only the feature name which is defined per the nonterminal numeral and terminal numeral and which can be restricted can be achieved by other than using a feature mask.

(H) Eighth Embodiment

Next, eighth embodiment, in which apparatus and method for natural language processing, and apparatus and method for creating a natural language pattern dictionary, of the present invention are applied to a machine translation apparatus and a machine translation method, will be described in reference to the accompanying drawings.

(H-1) Structure of Eighth Embodiment

Figure 51:
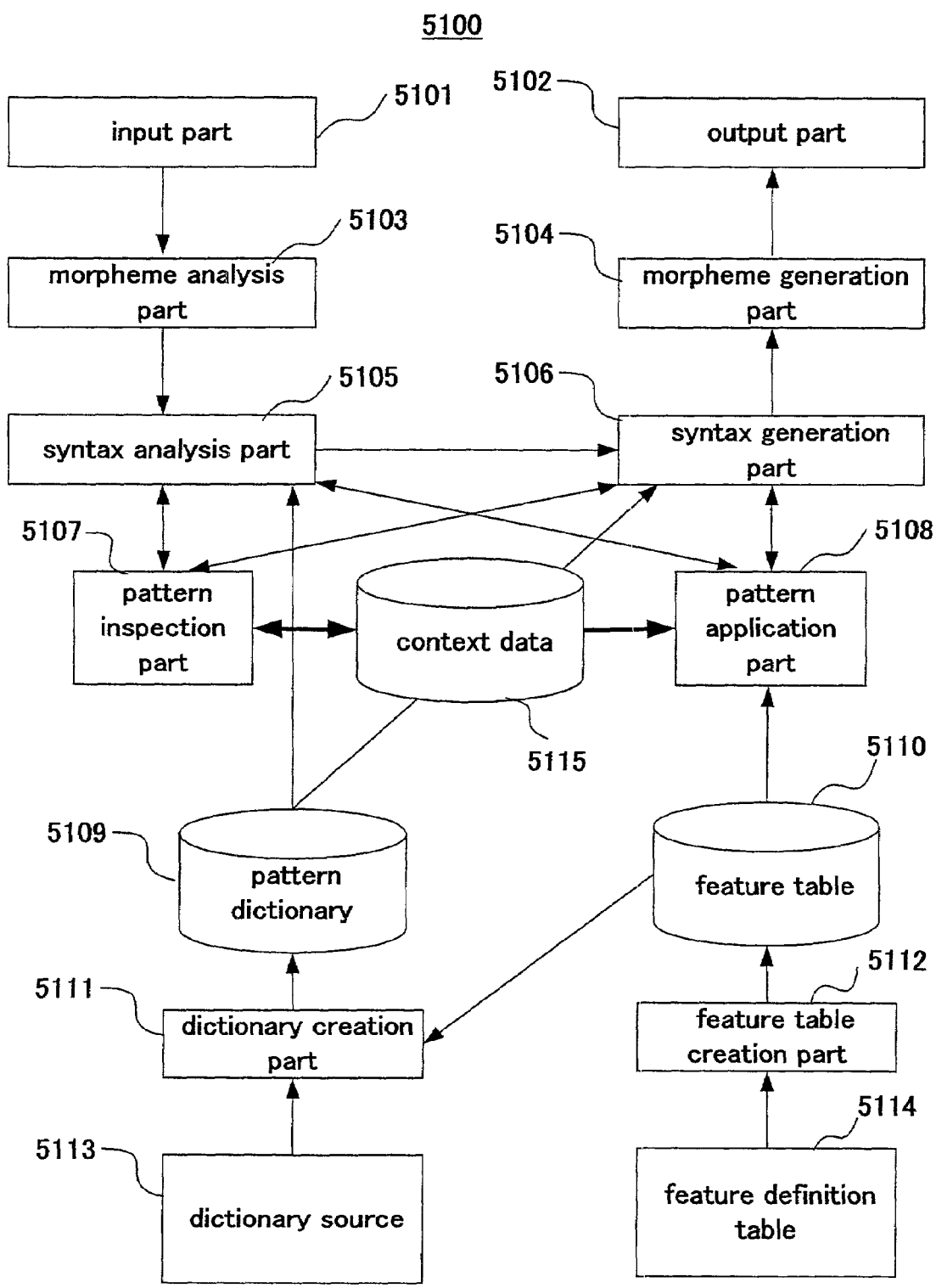
FIG. 51 is a block diagram showing a functional configuration of a machine translation apparatus of eighth embodiment.

FIG. 51 is a block diagram showing a functional configuration of a machine translation apparatus of eighth embodiment.

In FIG. 51, a machine translation apparatus 5100 in eighth embodiment is configured by an input part 5101, an output part 5102, a morpheme analysis part 5103, a morpheme generation part 5104, a syntax analysis part 5105, a syntax generation part 5106, a pattern inspection part 5107, a pattern application part 5108, a pattern dictionary 5109, a feature table 5110, a dictionary creation part 5111, a feature table creation part 5112, a dictionary source 5113, a feature definition table 5114 and a context data storage part 5115.

The context data storage part 5115 used by the pattern inspection part 5107 and the pattern application part 5108 is added to the components of the machine translation apparatus in seventh embodiment. In this embodiment, the pattern inspection part 5107, the pattern application part 5108, the feature table 5110, the feature table creation part 5112 and the feature definition table 5114 are slightly different in function from those of seventh embodiment. Other components are same as the ones corresponding to those of seventh embodiment.

(H-2) Process of Eighth Embodiment

Figures 52, 53, 54:
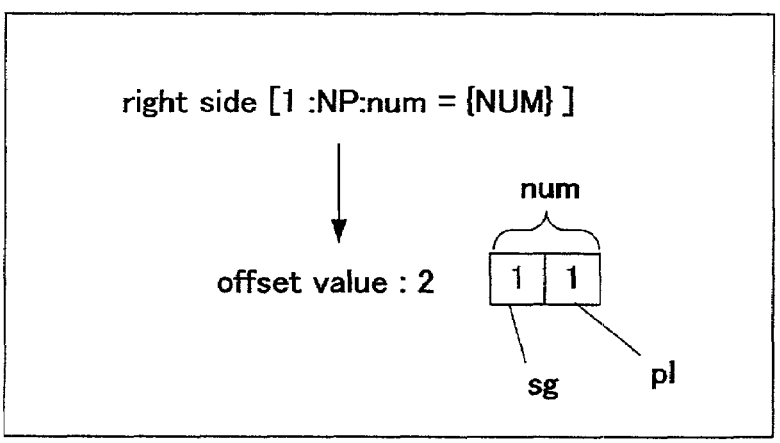
FIG. 52 is an explanatory diagram showing an example of a translation pattern including a feature variable of eighth embodiment.
FIG. 53 is an explanatory diagram showing a feature definition related to a feature variable of eighth embodiment.
FIG. 54 is an explanatory diagram showing bit array data related to a feature variable of eighth embodiment.

In some cases of this embodiment, the translation pattern has a feature value including a variable (hereafter, referred to as "feature variable"). FIG. 52 shows an example of a translation pattern including a feature variable. In FIG. 52, num={NUM} shows that a feature variable NUM is applied to the feature value of feature name num. By applying the feature variable NUM, the example of FIG. 52 means that the restriction of the feature name num being a common value is added to the right side elements NP and VP of the pattern. In addition, a specific feature value is inserted into the feature variable part, for example, in the syntax analysis, by the bottom-up feature transmission processed by the pattern application part 5108.

In the feature definition table 5114 may include the definition shown in FIG. 53, which is an addition of description of "number" shown in FIG. 35 of six embodiment and which is the definition of feature name in which the feature variable can be used. Since it is presumed that the points desired to be discriminated among a single feature are to increase, plural feature names are attached to a single feature. In other words, FIG. 53 shows that num, sNum and oNum take the same value and can be checked by the same feature variable which cannot be used among the features not connected with= in the feature definition table while which can be used among the features having the same name.

Reading the definition for feature variable, the feature table creation part 5112 writes the bit array data described on the bottom of FIG. 54. In this figure, the feature values are set "1" before recognizing which value (sg, pl) will be inserted. Also, an offset value represents the original location of the feature variable in the bit array data (for example, FIG. 36 of sixth embodiment). The dictionary creation part 5111 executes the replacement shown in FIG. 54 when there is a feature variable in the translation pattern from the dictionary source 5113.

Inspecting the feature restriction, the pattern inspection part 5107 stores the feature value in the context data storage part 5115 if the feature variable is used. In storing, if context data having the same variable name have already existed, AND (bit Logical product) is calculated with the variable value in the context data storage part 5115. If all the variables become 0, the result does not meet restriction. If even one of the variables remain 1, the result is stored in the context data storage part 5115 again.

The pattern application part 5108 picks up the feature name from the context data storage part 5115 data if the feature variable is used. And the pattern application part 5108 sets the context data with the size of the array in FIG. 54 on the location of offset in the value array of the node to be set as shown in FIG. 54.

(H-3) Effect of Eighth Embodiment

Also according to the machine translation apparatus and method of eighth embodiment, the effects (a)–(e) identical to those of sixth and seventh embodiments. Further according to eighth embodiment, following effects can be achieved.

(f) If a value of certain node on right side and a value of a certain feature in a certain node are desired to be same, it is necessary to prepare the same number of patterns as that of values the feature can take in the case without eighth embodiment. However, the number of patterns can be reduced to one by using the feature value, to enhance the speed of syntax analysis and to reduce the cost for maintenance greatly.

(H-4) Changed Form of Eighth Embodiment

As described above, although FIG. 52 is shown as a translation pattern, another form of expression can be adopted if the same amount of information is included. Also as described above, although FIG. 53 is shown as a feature table, another form of expression can be adopted if the same amount of information is included. Further as described above, the expression of feature valuable is not restricted to the bit array data shown in FIG. 54. However, another form of expression can be adopted if the results of process can be same.

Although the apparatus and method for natural language processing according to the preferred embodiment of the present invention has been described, the present invention is not restricted to such examples. It is evident to those skilled in the art that the present invention may be modified or changed within a technical philosophy thereof and it is understood that naturally these belong to the technical philosophy of the present invention.

In other words, the technical philosophy of the present invention can be adopted not only to the machine translation apparatus and method but also to an apparatus and a method for natural language processing in which a syntax analysis and a syntax generation are executed by using the natural language patterns.

In this case, the apparatus and method for natural language processing can be configured by that the syntax analysis is executed by using the natural language patterns while the syntax generation is executed by using other method than using the natural language patterns, or the apparatus and a method for natural language processing can be configured conversely. Also, the present invention can be adopted the apparatus in which only the syntax analysis needs to be executed while the syntax generation is not executed and the apparatus with the converse configuration.

In addition, the machine translation apparatus and method with the translation pattern used, to which the present invention adopted, has been described in the sixth-eighth embodiments, each of which is characterized in the syntax analysis and the syntax generation. Therefore, the technical philosophy of the embodiments can be adopted to other apparatuses and methods for natural language processing. For example, the technical philosophy of the embodiments can be adopted to a series of steps from the original text input to the step in which the answer sentence is analyzed in the process of the syntax analysis by using patterns (natural language patterns) in a Q & A apparatus. Also for example, the technical philosophy of the embodiments can be adopted to the step in which the syntax generation is executed from the syntax tree of the further question tree in response to the answer sentence.

Further, the technical philosophy of the embodiments can be adopted to an apparatus and a method for natural language processing with only a syntax analysis included or with only a syntax generation included.

The present invention, as described above, can realize an apparatus and method for natural language processing capable of providing an appropriate result of natural language processing.

Also the present invention can realize an apparatus and a method for natural language processing capable of restricting natural language pattern according to a grammatical rule, avoiding a dictionary to be mass storage even if the natural language patterns are restricted and achieving a syntax analysis, a syntax generation and the like by using the natural language patterns.

Further the present invention can realize an apparatus and a method for creating a natural language pattern dictionary preferable for the apparatus and a method for natural language processing.

What is claimed is:

1. A natural language processing apparatus for achieving a syntax analysis and/or a syntax generation by using natural language patterns with language name, syntax pattern name (left side) and pattern component (right side) list of an source language pattern and a target language pattern, the natural language processing apparatus comprising:

a pattern dictionary having stored therein natural language patterns in pairs that include the source language pattern and the target language pattern, each pair being formed in a string with, at least a language name, a pattern name given as a left side member and a pattern component given as a right side member, the source and target language patterns being stored in advance and having a feature indicated by feature information in various information used for a translation, which is present in the left side member and/or the right side member of a pattern, a feature restriction indicating a condition on information held in the feature and a central element information, appended to a central element, prescribing a central pattern element in a feature restriction or a feature propagation on the left and/or the right side;

a dictionary reference part that extracts at least one source language pattern and target language pattern from the pattern dictionary to be used in syntax analysis processing and syntax generation processing;

pattern inspection means for inspecting also the extracted source language pattern and target language pattern to determine whether or not the right side member of the source language pattern conforms to a tree structure of-net based upon the feature restriction during the syntax analysis processing and to determine whether or not the left side member of the target language pattern conforms to a tree structure based upon the feature restriction during the syntax generation processing; and pattern application means for applying the natural language patterns to the tree structure if the natural language patterns meet the tree structure, for propagating the feature information held by the central element in the right side member of the source language pattern to a node in the tree structure equivalent to the left side member and adding the feature information in the left side member as a node in the tree structure during syntax analysis processing when the right side member of the source language pattern conforms to the tree structure, and for adding the feature information present in the left side member of the target language pattern to a node in the tree structure equivalent to the central element in the right side member during syntax generation processing when the left side member of the target language pattern conforms to the tree structure.

2. A natural language processing apparatus according to claim 1 wherein the natural language patterns registered in the pattern dictionary hold the feature restriction information in the form that logical operation can be achieved.

3. A natural language processing apparatus according to claim 1, wherein: plural natural language patterns with different meaning information are prepared in plural natural language patterns with information on meaning conditions as one of the pattern application conditions; and
   a tree structure with appropriate meaning information is decided through the pattern inspection means and the pattern application means.

4. A natural language processing apparatus according to claim 1, wherein information on a priority of a application is attached to the natural language patterns prepared in a pattern dictionary in advance,
   the natural language processing apparatus further comprising pattern evaluation means for evaluating the natural language patterns applicable for a tree structure according to the priority information attached thereto.

5. A natural language processing apparatus according to claim 4, wherein: in pattern components, the priority of natural language pattern with meaning conditions is set high among the natural language patterns with only the difference whether having or not the meaning conditions; and
   in pattern name, the priority of natural language pattern without meaning conditions is set high among the natural language patterns with only the difference whether having or not the meaning conditions.

6. A natural language processing apparatus according to claim 4, wherein the pattern evaluation means pass over the applicable natural language patterns other than the applicable natural language pattern with the highest priority when plural natural language patterns with the same pattern name and the same pattern application condition and with different information on priority exist.

7. A natural language processing apparatus according to claim 4, wherein the pattern evaluation means pass over the applicable natural language patterns with the priority relatively lower than a normal priority when plural natural language patterns with the same pattern name and the same pattern application condition and with different information on priority exist.

8. A natural language processing apparatus according to claim 4, further comprising tree structure evaluation means for evaluating the priority between plural tree structures according to evaluation and allotment means capable of evaluating each tree structure when the tree structures achieved by the syntax analysis and/or the syntax generation are plural, the evaluation and allotment means in which the priority information in the natural language patterns is applied to the sectional tree different in the plural tree structures.

9. A natural language processing apparatus according to claim 8, wherein the tree structure evaluation means reflect the priority information in the natural language patterns applied to the tree structure and reflect a number of terminal numerals constructing the sectional tree different in the plural tree structures in the evaluation and allotment means.

10. A natural language processing apparatus according to claim 8, wherein the tree structure evaluation means reflect the priority information in the natural language patterns applied to the tree structure and reflect the location of node related to a specified priority in the evaluation and allotment means.

11. A natural language processing apparatus according to claim 1 comprising user registration means of natural language patterns.

12. A natural language processing apparatus according to claim 11, wherein the priority higher than that of the natural language patterns of system registration is set on the user registration of natural language patterns.

13. A natural language processing apparatus according to claim 11, further comprising tree structure evaluation means for setting the highest priority on the tree structure with the sectional tree to which the natural language pattern related to user registration is applied in the sectional tree different in the plural tree structures when the tree structures achieved by the syntax analysis and/or the syntax generation are plural.

14. A natural language processing apparatus according to claim 1 further comprising a feature definition table used to define feature information that can be restricted based upon the non-terminal/terminal numerals wherein the pattern application means restrict the feature to be transmitted according to the definition which is defined per the nonterminal numeral and terminal numeral in transmitting feature information;
   wherein the pattern application means propagates only a part of the feature information held at the central element included in the right side member of a source language pattern, the right side member thereof conforming to a tree structure, which is defined on the feature definition table in correspondence to a non-terminal numeral and a terminal numeral held at a node in the tree structure equivalent to the left side member thereof and adds only part of the feature information in the left side member, which is defined in the feature definition table in correspondence to a non-terminal numeral and a terminal numeral held at a node in the tree structure during syntax analysis processing: and
   wherein the pattern application means adds only part of the feature information in the left side member of a target language pattern, the left side member thereof conforming to a tree structure, which is defined in the feature definition table in correspondence to a non-terminal numeral and a terminal numeral held at a node in the tree structure equivalent to the central element in the right side member thereof during syntax generation processing.

15. A natural language processing apparatus according to claim 1 wherein the pattern inspection means and the pattern application means execute a pattern-meeting inspection on and a pattern application to feature variable applied as a feature restriction in natural language patterns.

16. A natural language processing method for achieving a syntax analysis and/or a syntax generation by using natural language patterns with language name, syntax pattern name (left side) and pattern component (right side) list,
   the natural language processing method comprising:
      providing a pattern dictionary having stored therein natural language patterns in pairs that include the source language pattern and the target language pattern, each pair being formed in a string with, at least a language name, a pattern name given as a left side member and a pattern component given as a right side member, the source and target language patterns being stored in advance and having a central element information prescribing a central pattern element in a feature restriction or a feature propagation on the left and/or the right side;

extracting at least one source language pattern and target language pattern from the pattern dictionary to be used in syntax analysis processing and syntax generation processing;

a pattern inspection step for inspecting the extracted source language pattern and target language pattern to determine whether or not the right side member of the source language pattern conforms to a tree structure based upon the feature restriction during the syntax analysis processing and to determine whether or not the left side member of the target language pattern conforms to a tree structure based upon the feature restriction during the syntax generation processing; and a pattern application step for applying the natural language patterns to the tree structure if the natural language patterns meet the tree structure and for propagating the feature restriction if the natural language patterns have the central element information.

17. A natural language processing method according to claim 16 wherein: plural natural language patterns with different meaning information are prepared in plural natural language patterns with information on meaning conditions as one of the pattern application conditions; and a tree structure with appropriate meaning information is decided through the pattern inspection step and the pattern application step.

18. A natural language processing method according to claim 16, wherein information on a priority of a application is attached to the natural language patterns prepared in a pattern dictionary in advance, the natural language processing method further comprising pattern evaluation step for evaluating the natural language patterns applicable for a tree structure according to the priority information attached thereto.

19. A natural language processing method according to claim 18, wherein: in pattern components, the priority of natural language pattern with meaning conditions is set high among the natural language patterns with only the difference whether having or not the meaning conditions; and in pattern name, the priority of natural language pattern without meaning conditions is set high among the natural language patterns with only the difference whether having or not the meaning conditions.

20. A natural language processing method according to claim 18, wherein the pattern evaluation step passes over the applicable natural language patterns other than the applicable natural language pattern with the highest priority when plural natural language patterns with the same pattern name and the same pattern application condition and with different information on priority exist.

21. A natural language processing method according to claim 18, wherein the pattern evaluation step passes over the applicable natural language patterns with the priority relatively lower than a normal priority when plural natural language patterns with the same pattern name and the same pattern application condition and with different information on priority exist.

22. A natural language processing method according to claim 18, further comprising a tree structure evaluation step for evaluating the priority between plural tree structures according to evaluation and allotment means capable of evaluating each tree structure when the tree structures achieved by the syntax analysis and/or the syntax generation are plural, the evaluation and allotment means in which the priority information in the natural language patterns is applied to the sectional tree different in the plural tree structures.

23. A natural language processing method according to claim 22, wherein the tree structure evaluation step reflects the priority information in the natural language patterns applied to the tree structure and reflect a number of terminal numerals constructing the sectional tree different in the plural tree structures in the evaluation and allotment means.

24. A natural language processing method according to claim 22, wherein the tree structure evaluation step reflects the priority information in the natural language patterns applied to the tree structure and reflect the location of node related to a specified priority in the evaluation and allotment means.

25. A natural language processing method according to claim 16 comprising user registration means of natural language patterns.

26. A natural language processing method according to claim 25, wherein the priority higher than that of the natural language patterns of system registration is set on the user registration of natural language patterns.

27. A natural language processing method according to claim 25, further comprising a tree structure evaluation step for setting the highest priority on the tree structure with the sectional tree to which the natural language pattern related to user registration is applied in the sectional tree different in the plural tree structures when the tree structures achieved by the syntax analysis and/or the syntax generation are plural.

28. A natural language processing method according to claim 16 wherein the pattern application step restricts the feature to be transmitted according to the definition which is defined per the nonterminal numeral and terminal numeral in transmitting feature information.

29. A natural language processing method according to claim 16 wherein the pattern inspection step and the pattern application step execute a pattern-meeting inspection on and a pattern application to feature variable applied as a feature restriction in natural language patterns.

30. A natural language processing method according to claim 16 wherein the natural language patterns registered in the pattern dictionary hold the feature restriction information in the form that logical operation can be easily executed.

* * * * *